(12) United States Patent
Oda et al.

(10) Patent No.: US 12,704,670 B2
(45) Date of Patent: Aug. 11, 2026

(54) FIBER CONNECTING BODY, OPTICAL COMMUNICATION SYSTEM, OPTICAL DEVICE, AND METHOD FOR MANUFACTURING FIBER CONNECTING BODY

(71) Applicant: FUJIKURA LTD., Tokyo (JP)

(72) Inventors: Takuya Oda, Chiba (JP); Osamu Kikuchi, Chiba (JP)

(73) Assignee: Fujikura Ltd., Tokyo (JP)

( * ) Notice: Subject to any disclaimer, the term of this patent is extended or adjusted under 35 U.S.C. 154(b) by 236 days.

(21) Appl. No.: 18/006,796

(22) PCT Filed: Dec. 6, 2021

(86) PCT No.: PCT/JP2021/044719

§ 371 (c)(1),
(2) Date: Jan. 25, 2023

(87) PCT Pub. No.: WO2022/118985

PCT Pub. Date: Jun. 9, 2022

(65) Prior Publication Data

US 2023/0266520 A1 Aug. 24, 2023

(30) Foreign Application Priority Data

Dec. 4, 2020 (JP) ................................ 2020-202250
Sep. 3, 2021 (JP) ................................ 2021-144241

(51) Int. Cl.
*G02B 6/02* (2006.01)
*G02B 6/028* (2006.01)
*G02B 6/44* (2006.01)

(52) U.S. Cl.
CPC ....... *G02B 6/02042* (2013.01); *G02B 6/0288* (2013.01); *G02B 6/4482* (2013.01)

(58) Field of Classification Search
CPC . G02B 6/02042; G02B 6/0288; G02B 6/4482
See application file for complete search history.

(56) References Cited

U.S. PATENT DOCUMENTS

2003/0198449 A1 10/2003 West et al.
2016/0347645 A1* 12/2016 Gonda ................. C03B 37/025
(Continued)

FOREIGN PATENT DOCUMENTS

AU 2020100756 A4 * 6/2020
CN 104238004 A * 12/2014
(Continued)

OTHER PUBLICATIONS

English translation of International Preliminary Report on Patentability issued in corresponding International Application No. PCT/JP2021/044719 dated May 30, 2023 (5 pages).
(Continued)

*Primary Examiner* — Thomas A Hollweg
*Assistant Examiner* — Marc E Manheim
(74) *Attorney, Agent, or Firm* — Osha Bergman Watanabe & Burton LLP

(57) ABSTRACT

A fiber connected body includes: a first multi-core fiber including a first cladding, first cores disposed in the first cladding, and a first marker disposed in the first cladding; and a second multi-core fiber including a second cladding, second cores disposed in the second cladding, and a second marker disposed in the second cladding. One end surface of the second multi-core fiber is connected to one end surface of the first multi-core fiber. Each of the second cores is connected to any one of the first cores, or each of the first cores is connected to any one of the second cores.

6 Claims, 19 Drawing Sheets

(56) References Cited

U.S. PATENT DOCUMENTS

| | | | | |
|---|---|---|---|---|
| 2016/0349448 | A1* | 12/2016 | Koonen | G02B 6/0288 |
| 2017/0160466 | A1* | 6/2017 | Imamura | G02B 6/0288 |
| 2017/0227716 | A1* | 8/2017 | Kopp | G02B 6/30 |
| 2020/0326472 | A1* | 10/2020 | Li | G02B 6/02042 |
| 2020/0379168 | A1 | 12/2020 | Mukasa | |
| 2021/0041622 | A1* | 2/2021 | Ono | C03C 25/106 |

FOREIGN PATENT DOCUMENTS

| | | | | | |
|---|---|---|---|---|---|
| CN | 111897046 | A | | 11/2020 | |
| JP | 2002-525645 | A | | 8/2002 | |
| JP | 2011-170099 | A | | 9/2011 | |
| JP | 2012168453 | A | | 9/2012 | |
| JP | 2012-203036 | A | | 10/2012 | |
| JP | 2014197094 | A | * | 10/2014 | G02B 6/02042 |
| JP | 2016-033627 | A | | 3/2016 | |
| JP | 2019-152866 | A | | 9/2019 | |
| WO | 2014156412 | A1 | | 10/2014 | |
| WO | WO-2016035883 | A1 | * | 3/2016 | C03B 37/01205 |

OTHER PUBLICATIONS

Written Opinion issued in corresponding International Application No. PCT/JP2021/044719 mailed Feb. 15, 2022 (5 pages).

International Search Report issued in corresponding International Application No. PCT/JP2021/044719 mailed Feb. 15, 2022 (2 pages).

* cited by examiner

FIBER CONNECTING BODY, OPTICAL COMMUNICATION SYSTEM, OPTICAL DEVICE, AND METHOD FOR MANUFACTURING FIBER CONNECTING BODY

BACKGROUND

Technical Field

The present invention relates to a fiber connected body including a plurality of multi-core fibers and a method for manufacturing the fiber connected body.

Description of the Related Art

In the field of optical communications, a multi-core fiber including cores is widely used. A document disclosing the multi-core fiber is, for example, Patent Literature 1. A multi-core fiber connected body including a plurality of multi-core fibers connected to each other is also widely used.

PATENT LITERATURE

Patent Literature 1: JP No. 2019-152866

The followings will be described.

A multi-core fiber includes cores and a cladding. The cladding is a cylindrical member. Each of the cores is a cylindrical-shape area that resides inside the cladding, that has a higher refractive index than that of the cladding, and that extends in a direction in which the cladding extends. In the multi-core fiber, a marker used to identify the cores may be formed. The marker is an area that resides inside the cladding, that has a different refractive index from that of the cladding, and that extends in a direction in which the cladding extends. The shape of the marker may be any shape, and may be a cylindrical shape or a triangular prism shape, for example. In a case where a fiber connected body is produced by connecting the plurality of multi-core fibers each having a marker formed therein, a connecting work is carried out so that a marker in one of the multi-core fibers and a marker in the other of the multi-core fibers are connected to each other. However, there has been room for improvement in the optical characteristics of the fiber connected body produced in this manner.

In a multi-core fiber, a marker used to identify a core may be formed. In a conventional fiber connected body including such multi-core fibers connected to each other, the connection between the multi-core fibers satisfies the following conditions, where an end surface of one of adjacent ones of the multi-core fibers is a first end surface and an end surface of the other is a second end surface.

(1) Cores in the first end surface overlap cores in the second end surface.

(2) A marker in the first end surface overlaps a marker in the second end surface.

Thus, in a case where, in both the end surfaces of the fiber connected body, the cores are identified in accordance with the distances from the markers to the cores, optically-coupled cores would be assigned the same identifier. Thus, for example, if each core is used for the purpose of input of an optical signal or for the purpose of output of an optical signal and cores assigned the same identifier are used for the same purpose, both ends of optically-coupled cores would be used for input or both ends of optically-coupled cores would be used for output. On this point, handling of the conventional fiber connected body is difficult.

SUMMARY

One or more embodiments may provide (i) a fiber connected body including at least two multi-core fibers each having a marker and having improved optical characteristics or (ii) a method for producing such a fiber connected body.

One or more embodiments may provide a fiber connected body that is easier to be handled than conventional ones.

A fiber connected body in accordance with one or more embodiments includes: a first multi-core fiber including (i) a cladding and (ii) cores and at least one first marker disposed inside the cladding; and a second multi-core fiber including (i) a cladding and (ii) cores and at least one second marker disposed inside the cladding, the second multi-core fiber having one end surface connected to one end surface of the first multi-core fiber, each of the cores in the second multi-core fiber being connected to any one of the cores in the first multi-core fiber or each of the cores in the first multi-core fiber being connected to any one of the cores in the second multi-core fiber, at least one of the at least one second marker in the second multi-core fiber being connected to a part of the first multi-core fiber which part is not the at least one first marker or at least one of the at least one first marker in the first multi-core fiber being connected to a part of the second multi-core fiber which part is not the at least one second marker.

A method in accordance with one or more embodiments for producing a fiber connected body is a method for producing a fiber connected body that includes: a first multi-core fiber including (i) a cladding and (ii) cores and at least one first marker disposed inside the cladding; and a second multi-core fiber including (i) a cladding and (ii) cores and at least one second marker disposed inside the cladding, the method including the step of connecting one end surface of the second multi-core fiber to one end surface of the first multi-core fiber so that each of the cores in the second multi-core fiber is connected to any one of the cores in the first multi-core fiber or each of the cores in the first multi-core fiber is connected to any one of the cores in the second multi-core fiber and at least one of the at least one second marker in the second multi-core fiber is connected to a part of the first multi-core fiber which part is not the at least one first marker or at least one of the at least one first marker in the first multi-core fiber is connected to a part of the second multi-core fiber which part is not the at least one second marker.

A fiber connected body in accordance with one or more embodiments is a fiber connected body including a plurality of multi-core fibers connected to each other, the plurality of multi-core fibers having the same core arrangement, each of the plurality of multi-core fibers having an end surface including a cladding, cores disposed inside the cladding so as to be axisymmetric to each other, and a marker, a center of the marker being positioned at a location that does not overlap a symmetry axis of the cores, the number of connected parts satisfying the following conditions (1) and (2) being an odd number, where an end surface of one of adjacent ones of the plurality of multi-core fibers is a first end surface and an end surface of the other is a second end surface: (1) cores in the first end surface overlap cores in the second end surface; and (2) a marker in the first end surface overlaps a position in the second end surface which position is axisymmetric with a marker in the second end surface with respect to the symmetry axis.

A method in accordance with one or more embodiments for producing a fiber connected body is a method for producing a fiber connected body that includes a plurality of multi-core fibers connected to each other, the plurality of multi-core fibers having the same core arrangement, each of the plurality of multi-core fibers having an end surface including a cladding, cores disposed inside the cladding so as to be axisymmetric to each other, and a marker disposed at a location that does not overlap a symmetry axis of the cores, the method including connecting the plurality of multi-core fibers to each other so that the number of connected parts satisfying the following conditions (1) and (2) is an odd number, where an end surface of one of adjacent ones of the plurality of multi-core fibers is a first end surface and an end surface of the other is a second end surface: (1) cores in the first end surface overlap cores in the second end surface; and (2) a marker in the first end surface overlaps a position in the second end surface which position is axisymmetric with a marker in the second end surface with respect to the symmetry axis.

One or more embodiments can provide the followings.

In accordance with an aspect of one or more embodiments, it is possible to provide a fiber connected body including at least two multi-core fibers each of which has a marker and has improved optical characteristics.

In accordance with one or more embodiments, it is possible to provide a fiber connected body that is easier to be handled than conventional ones. Further, in accordance with one or more embodiments, it is possible to provide an optical communication system or an optical device including such a fiber connected body.

BRIEF DESCRIPTION OF THE DRAWINGS

In FIG. 9, (a) is a side view of the multi-core fiber, (b) is a front view of one end surface of the multi-core fiber, and (c) is a front view of the other end surface of the multi-core fiber.

In FIG. 10, (a) to (f) show front views each illustrating one end surface of the multi-core fiber.

In FIG. 11, (a) is a side view of the two multi-core fibers, (b) is a front view of an end surface of one of the multi-core fibers, and (c) is a front view of an end surface of the other of the multi-core fibers.

In FIG. 12, (a) is a side view of the two multi-core fibers, (b) is a front view of an end surface of one of the multi-core fibers, and (c) is a front view of an end surface of the other of the multi-core fibers.

In FIG. 13, (a) is a side view of the two multi-core fibers, (b) is a front view of an end surface of one of the multi-core fibers, and (c) is a front view of an end surface of the other of the multi-core fibers.

In FIG. 14, (a) is a side view of the fiber connected body, (b) is a front view of one end surface of the fiber connected body, and (c) is a front view of the other end surface of the fiber connected body.

In FIG. 15, (a) is a front view of one end surface of the fiber connected body, and (b) is a front view of the other end surface of the multi-core fiber.

In FIG. 16, (a) is a side view of the fiber connected body, (b) is a front view of one end surface of the fiber connected body, and (c) is a front view of the other end surface of the fiber connected body.

In FIG. 17, (a) is a side view of the communication system, (b) is a front view of one end surface of the fiber connected body, (c) is a front view of the other end surface of the fiber connected body, (d) is a front view of an optical input-output element of one of the transceivers, and (e) is a front view of an optical input-output element of the other of the transceivers.

DESCRIPTION OF THE EMBODIMENTS

First Aspect

Example 1 of First Aspect (Configuration of Fiber Connected Body)

Figure 1:
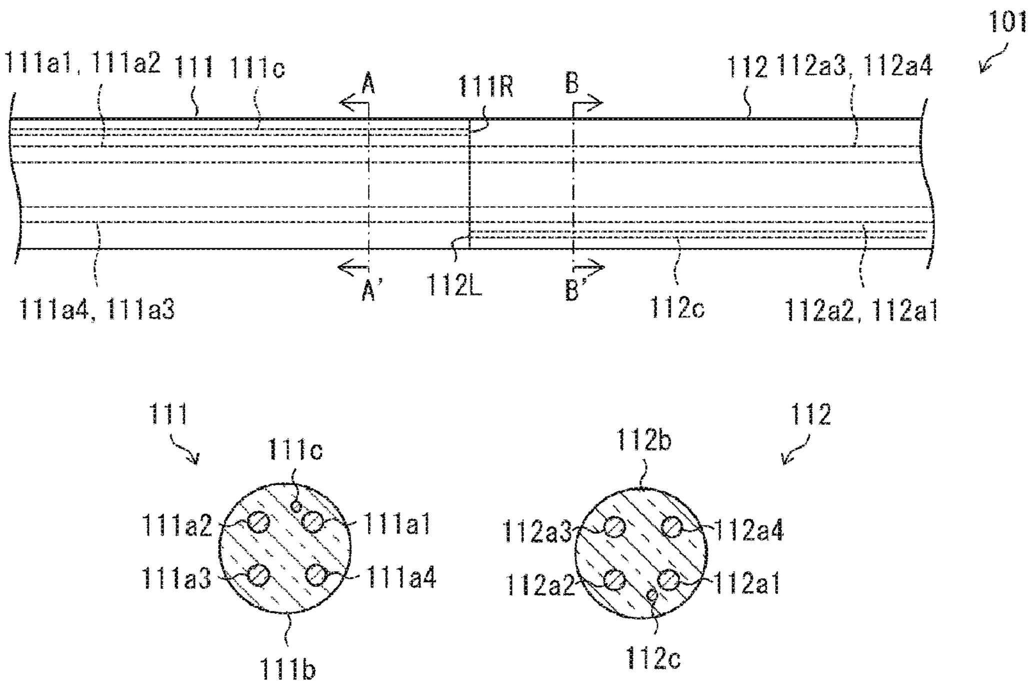
FIG. 1 shows a side view and cross-sectional views illustrating a configuration of a fiber connected body in accordance with one or more embodiments.

The following description will discuss, with reference to FIG. 1, a configuration of a fiber connected body 101 in accordance with Example 1 of the first aspect of one or more embodiments. FIG. 1 shows a side view and cross-sectional views illustrating a configuration of a fiber connected body 101.

As shown in FIG. 1, the fiber connected body 101 includes a first multi-core fiber 111 and a second multi-core fiber 112. The first multi-core fiber 111 has one end surface 111R connected (in Example 1, fusion-spliced) with one end surface 112L of the second multi-core fiber 112.

The first multi-core fiber 111 includes n (n is a natural number of not less than two) cores 111*a*1 to 111*an* and a cladding 111*b*. The cladding 111*b* is a cylindrical member. A cross-sectional shape of the cladding 111*b* is not limited to any particular one. For example, the cross-sectional shape of the cladding 111*b* may be a polygonal shape such as a quadrangular shape or a hexagonal shape or may be a barrel shape. The cladding 111*b* is made of silica glass, for example. Each core 111*ai* (i is a natural number of not less than one and not more than n) is a cylindrical-shape area that resides inside the cladding 111*b*, that has a higher refractive index than that of the cladding 111*b*, and that extends in a direction in which the cladding 111*b* extends. Each core 111*ai* is made of, for example, silica glass doped with an updopant such as germanium. Arrangement of the cores 111*a*1 to 111*an* is defined such that cross-sectional centers of the cores 111*a*1 to 111*an* are arranged at equal intervals on a circumference of a circle which has a radius R and which has a center at a center of the cladding 111*b*.

The first multi-core fiber 111 further includes a marker 111*c*. The marker 111*c* is an area that resides inside the cladding 111*b*, that has a different refractive index from that of the cladding 111*b*, and that extends in a direction in which the cladding 111*b* extends. The shape of the marker 111*c* may be any shape, and may be a cylindrical shape or a triangular prism shape, for example. The marker 111*c* is made of, for example, silica glass doped with a downdopant such as fluorine or boron. In this case, the marker 111*c* has a refractive index lower than that of the cladding 111*b*. Alternatively, the marker 111*c* is made of silica glass doped with an updopant such as germanium, aluminum, phosphorus, or chlorine. In this case, the marker 111*c* has a refractive index higher than that of the cladding 111*b*. The marker 111*c* may be formed by, for example, a drilling process or a stack-and-draw process.

Arrangement of the marker 111*c* in the first multi-core fiber 111 is defined such that d1, d2, . . . , do are all different from one another, where di is a distance from the marker 111*c* to the core 111*ai*. Arrangement of the marker 111*c* is defined in this manner in order to make it possible to easily identify the cores 111*a*1 to 111*an* in accordance with distances from the marker 111*c* to the cores. This makes it possible to more reliably identify the cores, thereby enabling measurement of properties of a certain core, for example. Ordinal numbers of the cores 111*a*1 to 111*an* in the first multi-core fiber 111 are defined as follows in accordance with positional relations between the cores and the marker 111*c*. That is, among the cores 111*a*1 to 111*an*, a core closest to the marker 111*c* is called a first core Mal. Among the cores 111*a*1 to 111*an*, a core second closest to the marker 111*c* next to the first core 111*a*1 is called a second core 111*a*2. Ordinal numbers of the remaining cores 111*a*3 to 111*an* are defined in accordance with an arrangement order of these cores on the above-described circumference of the circle having the radius R. For example, of two cores adjacent to the second core 111*a*2, a core that is not the first core 111*a*1 is called a third core 111*a*3. Meanwhile, of two cores adjacent to the third core 111*a*3, a core that is not the second core 111*a*2 is called a fourth core 111*a*4.

The second multi-core fiber 112 includes n cores 112*a*1 to 112*an* and a cladding 112*b*. The cladding 112*b* is a cylindrical member. The cladding 112*b* is made of silica glass, for example. Each core 112*ai* is a cylindrical-shape area that resides inside the cladding 112*b*, that has a higher refractive index than that of the cladding 112*b*, and that extends in a direction in which the cladding 112*b* extends. A cross-sectional shape of the cladding 112*b* is not limited to any particular one. For example, the cross-sectional shape of the cladding 112*b* may be a polygonal shape such as a quadrangular shape or a hexagonal shape or may be a barrel shape. Each core 112*ai* is made of, for example, silica glass doped with an updopant such as germanium. The number of cores 112*a*1 to 112*an* is identical to the number of cores 111*a*1 to 111*an* in the first multi-core fiber 111. A diameter of each of the cores 112*a*1 to 112*an* is identical to a diameter of each of the cores 111*a*1 to 111*an* in the first multi-core fiber 111. Similarly to the arrangement of the cores 111*a*1 to 111*an* in the first multi-core fiber 111, arrangement of the cores 112*a*1 to 112*an* is defined such that cross sections of the cores 112*a*1 to 112*an* are arranged at equal intervals on a circumference of a circle which has a radius R and which has a center at a center of the cladding 112*b*.

The second multi-core fiber 112 further includes a marker 112*c*. The marker 112*c* is an area that resides inside the cladding 112*b*, that has a different refractive index from that of the cladding 112*b*, and that extends in a direction in which the cladding 112*b* extends. The shape of the marker 112*c* may be any shape, and may be a cylindrical shape or a triangular prism shape, for example. The marker 112*c* is made of, for example, silica glass doped with a downdopant such as fluorine. In this case, the marker 112*c* has a refractive index lower than that of the cladding 112*b*. Alternatively, the marker 112*c* is made of silica glass doped with an updopant such as germanium, aluminum, phosphorus, or chlorine. In this case, the marker 112*c* has a refractive index higher than that of the cladding 112*b*. The marker 112*c* may be formed by, for example, a drilling process or a stack-and-draw process.

Arrangement of the marker 112*c* in the second multi-core fiber 112 is defined in a similar manner to that of the marker 111*c* in the first multi-core fiber 111. Ordinal numbers of the cores 112*a*1 to 112*an* in the second multi-core fiber 112 are defined in a similar manner to the ordinal numbers of the cores 111*a*1 to 111*an* in the first multi-core fiber 111.

An A-A' cross section of the first multi-core fiber 111 shown in FIG. 1 is viewed from the right side in FIG. 1. Meanwhile, a B-B' cross section of the second multi-core fiber 112 shown in FIG. 1 is viewed from the left side in FIG. 1. Thus, at a connected part between the one end surface 111R and the one end surface 112L, a right edge of the A-A' cross section of the first multi-core fiber 111 as viewed in FIG. 1 and a left edge of the B-B' cross section of the second multi-core fiber 112 as viewed in FIG. 1 are connected to each other, and a left edge of the A-A' cross section of the first multi-core fiber 111 as viewed in FIG. 1 and a right edge of the B-B' cross section of the second multi-core fiber 112 as viewed in FIG. 1 are connected to each other.

In the fiber connected body 101 in accordance with Example 1, the first multi-core fiber 111 and the second multi-core fiber 112 are connected to each other in such a manner as to satisfy the following conditions.

Condition 1: Each of the cores 112*ai* in the second multi-core fiber 112 is connected to any one of the cores 111*a*1 to 111*an* in the first multi-core fiber 111.

Condition 2: The marker 112*c* in the second multi-core fiber 112 is connected to a part of the first multi-core fiber 111 which part is not the marker 111*c*.

Further, the fiber connected body 101 in accordance with Example 1 satisfies the following condition.

Condition 3A: The first core 112*a*1, which is closest to the marker 112*c* in the second multi-core fiber 112, is connected to, among the cores 111*a*1 to 111*an* in the first multi-core fiber 111, a core (specifically, the third core 111*a*3) that is not the first core 111*a*1 closest to the marker 111*c*.

(Effects of Fiber Connected Body)

It is known that, in a multi-core fiber, a core closest to a marker is likely to be deteriorated in its optical waveguide characteristics. This is caused by various factors. Specifically, for example, a gap created between a marker material and a cladding material may occasionally be buried in a base material of a multi-core fiber, the multi-core fiber, and/or the like. For another example, at cooling of a base material of a multi-core fiber after drawing, the glass surrounding a marker may occasionally be deformed and/or be subjected to stress, due to a difference in linear expansion coefficient between the marker and the cladding. In such a case, a core closest to the marker may be subjected to the stress and/or be deformed, whereby the core closest to the marker may be deteriorated in its optical waveguide characteristics. The characteristics of the core closest to the marker that can be deteriorated may be, for example, polarization mode dispersion.

In a general fiber connected body, a core closest to a marker in a second multi-core fiber is connected to a core closest to a marker in a first multi-core fiber. Thus, signal light guided through the core closest to the marker in the first multi-core is likely to suffer from a deterioration caused by the marker in each of the first multi-core fiber and the second multi-core fiber. Therefore, an error may sometimes occur in communication carried out via the signal light guided through the core closest to the marker in the first multi-core fiber.

In order to address this, in the fiber connected body 101 in accordance with Example 1, the first core 112*a*1, which is closest to the marker 112*c* in the second multi-core fiber 112, is connected to, among the cores 111*a*1 to 111*an* in the first multi-core fiber 111, a core (specifically, the third core 111*a*3) that is not the first core Mal, which is closest to the marker 111*c*. Thus, it is possible to reduce a phenomenon that signal light guided through the core Mal, which is closest to the marker 111*c* in the first multi-core fiber 111, suffers from a deterioration caused by the marker 112*c* in the second multi-core fiber 112. Therefore, it is possible to reduce the possibility of occurrence of an error in communication carried out via the signal light guided through the first core Mal, which is closest to the marker 111*c* in the first multi-core fiber 111.

In the connection pattern shown in FIG. 1, the first core Mal, which is closest to the marker 111*c* in the first multi-core fiber 111, and the third core 112*a*3, which is farthest from the marker 112*c* in the second multi-core fiber 112, are connected to each other. The second core 111*a*2, which is second closest to the marker 111*c* next to the first core 111*a*1 in the first multi-core fiber 111, and the fourth core 112*a*4, which is second farthest from the marker 112*c* next to the third core 112*a*3 in the second multi-core fiber 112, are connected to each other. With this, deteriorations in beams of signal light guided through the cores 111*ai* in the first multi-core fiber 111 can be made more uniform. A reason why this can be achieved is that the first core Mal, which is most likely to be deteriorated in optical characteristics in the first multi-core fiber 111, and the third core 112*a*3, which is most difficult to be deteriorated in optical characteristics in the second multi-core fiber 112, are connected to each other. Another reason is that the second core 111*a*2, which is second most likely to be deteriorated in optical characteristics in the first multi-core fiber 111, and the fourth core 112*a*4, which is second most difficult to be deteriorated in optical characteristics in the second multi-core fiber 112, are connected to each other. Consequently, it is possible to further reduce the possibility of occurrence of an error in communication carried out via the beams of signal light guided through the cores 111*ai* in the first multi-core fiber 111.

(Variation of Connection Pattern)

Figure 2:
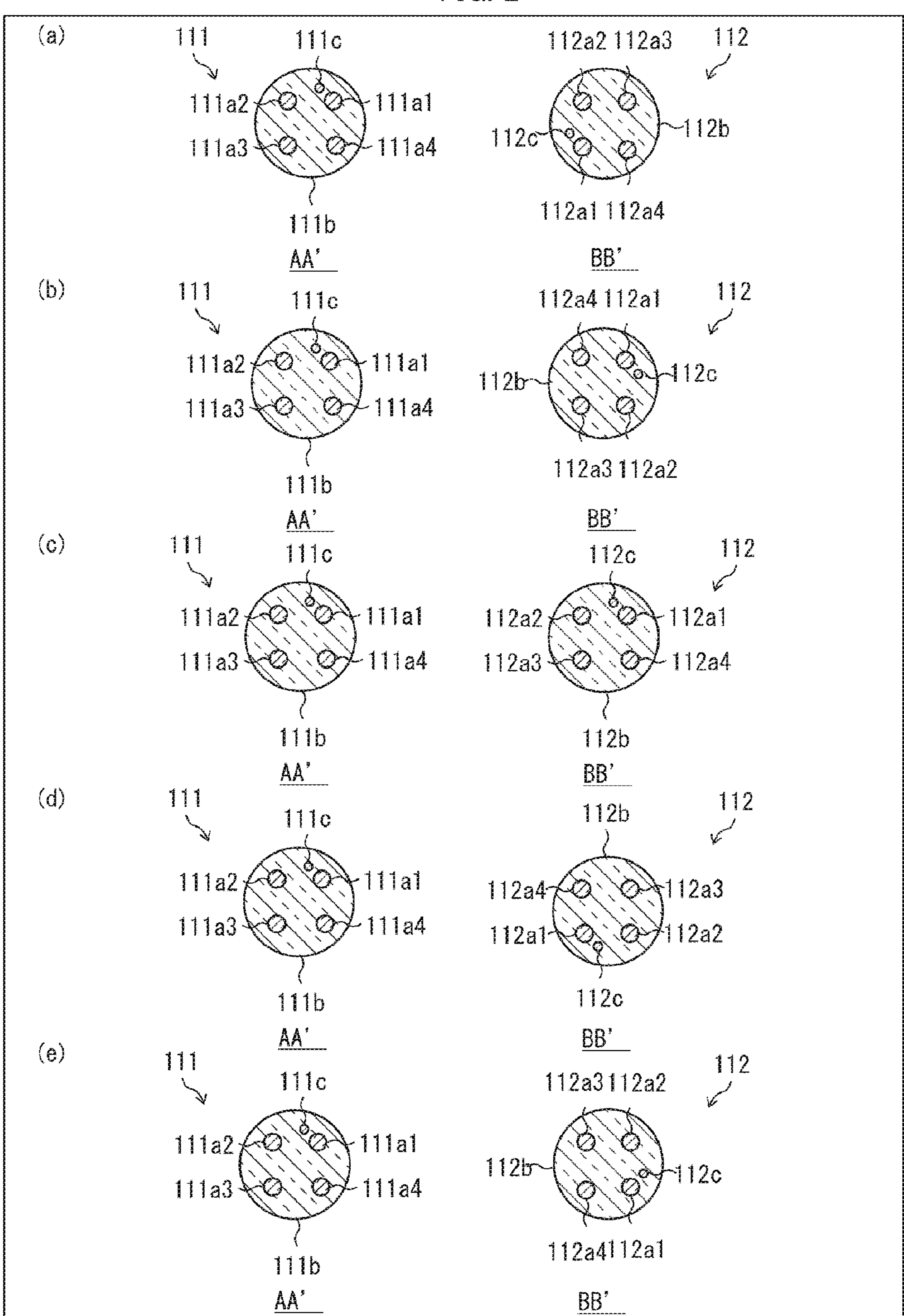
FIG. 2 shows cross-sectional views of the fiber connected body shown in FIG. 1 to indicate variations of a connection pattern.

The connection pattern satisfying the above-described conditions 1, 2, and 3A is not limited to the connection pattern shown in FIG. 1. FIG. 2 illustrates connection patterns that satisfy the above-described conditions 1, 2, and 3A and that are not the connection pattern shown in FIG. 1.

(a) of FIG. 2 illustrates a connection pattern in which the first core Mal, which is closest to the marker 111*c* in the first multi-core fiber 111, is connected to the second core 112*a*2 in the second multi-core fiber 112. The first core 112*a*1, which is closest to the marker 112*c* in the second multi-core fiber 112, is connected to the fourth core 111*a*4 in the first multi-core fiber 111.

(b) of FIG. 2 illustrates a connection pattern in which the first core Mal, which is closest to the marker 111*c* in the first multi-core fiber 111, is connected to the fourth core 112*a*4 in the second multi-core fiber 112. The first core 112*a*1, which is closest to the marker 112*c* in the second multi-core fiber 112, is connected to the second core 111*a*2 in the first multi-core fiber 111.

(c) of FIG. 2 illustrates a connection pattern in which the first core Mal, which is closest to the marker 111*c* in the first multi-core fiber 111, is connected to the second core 112*a*2 in the second multi-core fiber 112. The first core 112*a*1, which is closest to the marker 112*c* in the second multi-core fiber 112, is connected to the second core 111*a*2 in the first multi-core fiber 111.

(d) of FIG. 2 illustrates a connection pattern in which the first core Mal, which is closest to the marker 111*c* in the first multi-core fiber 111, is connected to the fourth core 112*a*4 in the second multi-core fiber 112. The first core 112*a*1, which is closest to the marker 112*c* in the second multi-core fiber 112, is connected to the fourth core 111*a*4 in the first multi-core fiber 111.

(e) of FIG. 2 illustrates a connection pattern in which the first core Mal, which is closest to the marker 111*c* in the first multi-core fiber 111, is connected to the third core 112*a*3 in the second multi-core fiber 112. The first core 112*a*1, which is closest to the marker 112*c* in the second multi-core fiber 112, is connected to the fourth core 111*a*4 in the first multi-core fiber 111.

In each of the connection patterns shown in (a) to (e) of FIG. 2, the first core 112*a*1, which is closest to the marker 112*c* in the second multi-core fiber 112, is connected to, among the cores 111*a*1 to 111*an* in the first multi-core fiber 111, a core that is not the first core Mal, which is closest to the marker 111*c*. Thus, signal light guided through the core 111*a*1 closest to the marker 111*c* in the first multi-core fiber 111 hardly suffers from a deterioration caused by the marker 112*c* in the second multi-core fiber 112. Therefore, it is possible to reduce the possibility of occurrence of an error in communication carried out via the signal light guided through the first core Mal, which is closest to the marker 111*c* in the first multi-core fiber 111.

In the connection pattern shown in (d) of FIG. 2, the first core Mal, which is closest to the marker 111*c* in the first multi-core fiber 111, and the fourth core 112*a*4, which is second farthest from the marker 112*c* next to the third core 112*a*3 in the second multi-core fiber 112, are connected to each other. The second core 111*a*2, which is second closest to the marker 111*c* next to the first core 111*a*1 in the first multi-core fiber 111, and the third core 112*a*3, which is farthest from the marker 112*c* in the second multi-core fiber 112, are connected to each other. With this, deteriorations in beams of signal light guided through the cores 111*ai* of the first multi-core fiber 111 can be made more uniform. This is because that the first core Mal, which is most likely to be deteriorated in optical characteristics in the first multi-core fiber 111, and the fourth core 112*a*4, which is second most difficult to be deteriorated in optical characteristics in the second multi-core fiber 112, are connected to each other. This is also because that the second core 111*a*2, which is second most likely to be deteriorated in optical characteristics in the first multi-core fiber 111, and the third core 112*a*3, which is most difficult to be deteriorated in optical characteristics in the second multi-core fiber 112, are connected to each other. Consequently, it is possible to further reduce the possibility of occurrence of an error in communication carried out via the beams of signal light guided through the cores 111*ai* in the first multi-core fiber 111.

(Variation)

The fiber connected body 101 shown in FIG. 1 is made of two multi-core fibers 111 and 112. However, this is not limitative. Alternatively, the fiber connected body 101 may be made of three or more multi-core fibers. The following description will discuss, with reference to FIGS. 3 and 4, a fiber connected body 101 made of three multi-core fibers 111 to 113.

Figure 3:
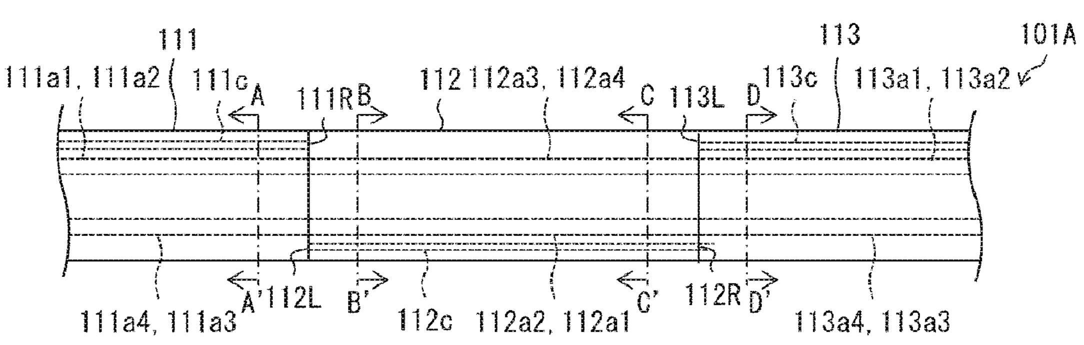
FIG. 3 shows a side view and cross-sectional views illustrating a first variation of the fiber connected body shown in FIG. 1.
Figure 3:
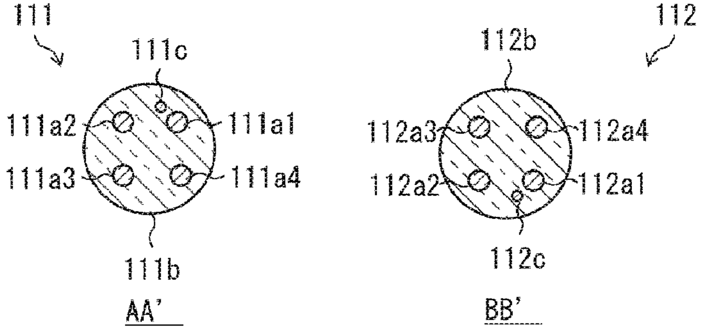
Figure 3:
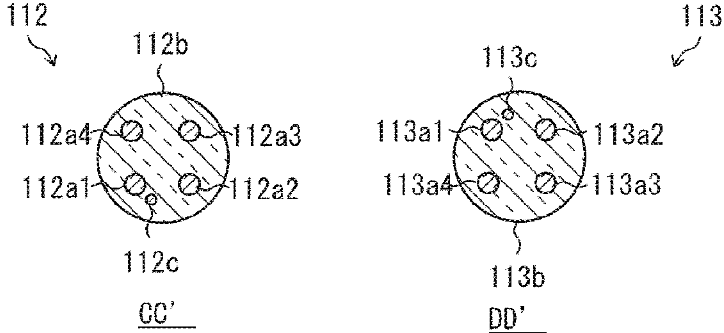

FIG. 3 shows a side view and cross-sectional views of a first variation of the fiber connected body 101 (hereinafter, such a fiber connected body will be referred to as a fiber connected body 101A). An A-A' cross section of a first multi-core fiber 111 shown in FIG. 3 is viewed from the right side in FIG. 3. Meanwhile, a B-B' cross section of a second multi-core fiber 112 shown in FIG. 3 is viewed from the left side in FIG. 3. A C-C' cross section of the second multi-core fiber 111 shown in FIG. 3 is viewed from the right side in FIG. 3. Meanwhile, a D-D' cross section of a third multi-core fiber 113 shown in FIG. 3 is viewed from the left side in FIG. 3.

As shown in FIG. 3, the fiber connected body 101A includes the first multi-core fiber 111, the second multi-core fiber 112, and the third multi-core fiber 113. The first multi-core fiber 111 has one end surface 111R connected to one end surface 112L of the second multi-core fiber 112. The second multi-core fiber 112 has the other end surface 112R connected to one end surface 113L of the third multi-core fiber 113. Configurations of the first multi-core fiber 111 and the second multi-core fiber 112 are identical to those explained above.

The third multi-core fiber 113 includes n cores 113*a*1 to 113*an* and a cladding 113*b*. The cladding 113*b* is a cylindrical member. The cladding 113*b* is made of silica glass, for example. Each core 113*ai* is a cylindrical-shape area that resides inside the cladding 113*b*, that has a higher refractive index than that of the cladding 113*b*, and that extends in a direction in which the cladding 113*b* extends. Each core 113*ai* is made of, for example, silica glass doped with an updopant such as germanium. The number of cores 113*a*1 to 113*n* is identical to the number of cores 111*a*1 to 111*an* in the first multi-core fiber 111. A diameter of each of the cores 113*a*1 to 113*an* is identical to a diameter of each of the cores 111*a*1 to 111*an* in the first multi-core fiber 111. Similarly to the arrangement of the cores 111*a*1 to 111*an* in the first multi-core fiber 111, arrangement of the cores 113*a*1 to 113*an* is defined such that cross sections of the cores 113*a*1 to 113*an* are arranged at equal intervals on a circumference of a circle which has a radius R and which has a center at a center of the cladding 113*b*.

The third multi-core fiber 113 further includes a marker 113*c*. The marker 113*c* is an area that resides inside the cladding 113*b*, that has a different refractive index from that of the cladding 113*b*, and that extends in a direction in which the cladding 113*b* extends. The shape of the marker 113*c* may be any shape, and may be a cylindrical shape or a triangular prism shape, for example. The marker 113*c* is made of, for example, silica glass doped with a downdopant such as fluorine. In this case, the marker 113*c* has a refractive index lower than that of the cladding 113*b*. Alternatively, the marker 113*c* is made of silica glass doped with an updopant such as germanium, aluminum, phosphorus, or chlorine. In this case, the marker 113*c* has a refractive index higher than that of the cladding 113*b*. The marker 113*c* may be formed by, for example, a drilling process or a stack-and-draw process.

Arrangement of the marker 113*c* in the third multi-core fiber 113 is defined in a similar manner to that of the marker 111*c* in the first multi-core fiber 111. Ordinal numbers of the cores 113*a*1 to 113*an* in the third multi-core fiber 113 are defined in a similar manner to the ordinal numbers of the cores 111*a*1 to 111*an* in the first multi-core fiber 111.

In the fiber connected body 101A, the first multi-core fiber 111 and the second multi-core fiber 112 are connected to each other in such a manner as to satisfy the above-described conditions 1, 2, and 3A. In the fiber connected body 101A, the second multi-core fiber 112 and the third multi-core fiber 113 are connected to each other in such a manner as to satisfy the following condition 4.

Condition 4: An i-th core 113*ai* in the third multi-core fiber 113 is connected to, among the cores 112*a*1 to 112*an* in the second multi-core fiber 112, a core connected to an i-th core 111*ai* in the first multi-core fiber 111.

That is, the first core 113*a*1 in the third multi-core fiber 113 is connected to, among the cores 112*a*1 to 112*an* in the second multi-core fiber 112, the third core 112*a*3 connected to the first core 111*a*1 in the first multi-core fiber 111. The second core 113*a*2 in the third multi-core fiber 113 is connected to, among the cores 112*a*1 to 112*an* in the second multi-core fiber 112, the fourth core 112*a*4 connected to the second core 111*a*2 in the first multi-core fiber 111. The third core 113*a*3 in the third multi-core fiber 113 is connected to, among the cores 112*a*1 to 112*an* in the second multi-core fiber 112, the first core 112*a*1 connected to the third core 111*a*3 in the first multi-core fiber 111. The fourth core 113*a*4 in the third multi-core fiber 113 is connected to, among the cores 112*a*1 to 112*an* in the second multi-core fiber 112, the second core 112*a*2 connected to the fourth core 111*a*4 in the first multi-core fiber 111.

With this, an optical signal input through the i-th core 111*ai* in the first multi-core fiber 111 is output through the i-th core 113*ai* in the third multi-core fiber 113. That is, the core number on the optical signal input side is identical to the core number on the optical signal output side. Thus, in a case where each of the first multi-core fiber 111 and the third multi-core fiber 113 is connected to any of a fan-in device, a fan-out device, a transmitter, a receiver, and a relay, miswiring hardly occurs in construction of a network.

Here, the connection pattern between the first multi-core fiber 111 and the second multi-core fiber 112 is the connection pattern shown in FIG. 1. However, this is not limitative. The connection pattern between the first multi-core fiber 111 and the second multi-core fiber 112 may be any of those shown in FIG. 2.

Figure 4:
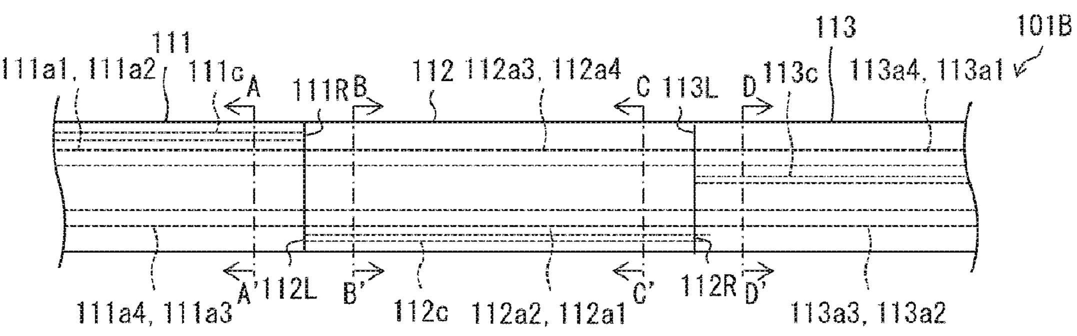
FIG. 4 shows a side view and cross-sectional views illustrating a second variation of the fiber connected body shown in FIG. 1.
Figure 4:
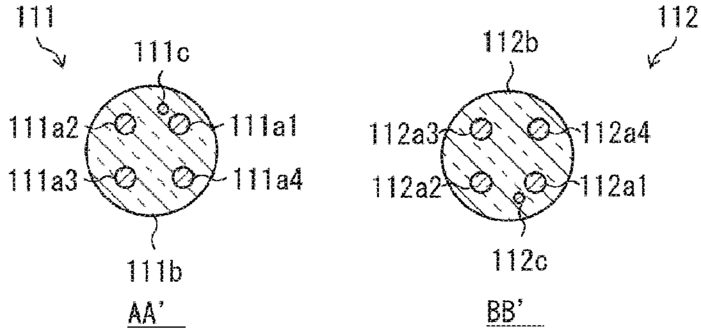
Figure 4:
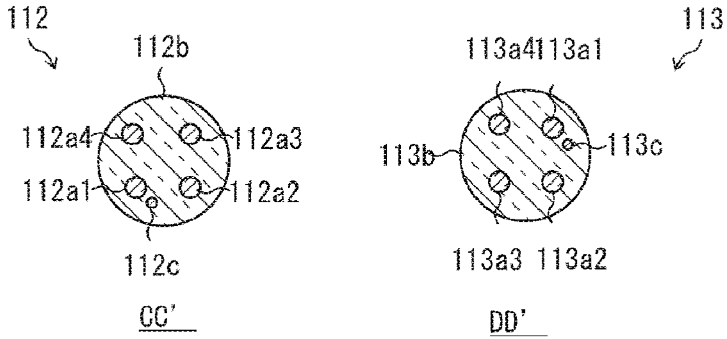

FIG. 4 shows a side view and cross-sectional views of a second variation of the fiber connected body 101 (hereinafter, such a fiber connected body will be referred to as a fiber connected body 101B).

As shown in FIG. 4, the fiber connected body 101B includes a first multi-core fiber 111, a second multi-core fiber 112, and a third multi-core fiber 113. The first multi-core fiber 111 has one end surface 111R connected to one end surface 112L of the second multi-core fiber 112. The second multi-core fiber 112 has the other end surface 112R connected to one end surface 113L of the third multi-core fiber 113. Configurations of the first multi-core fiber 111, the second multi-core fiber 112, and the third multi-core fiber 113 are identical to those explained above.

In the fiber connected body 101B, the first multi-core fiber 111 and the second multi-core fiber 112 are connected to each other in such a manner as to satisfy the above-described conditions 1, 2, and 3A. In the fiber connected body 101B, the second multi-core fiber 112 and the third multi-core fiber 113 are connected to each other in such a manner as to satisfy the following condition 5.

Condition 5: A first core **113*a*1, which is closest to a marker 113*c* in the third multi-core fiber 113, is connected to, among cores 112*a*1 to 112*an* in the second multi-core fiber 112, a core (specifically, the fourth core 112*a*4) that is not (1) a first core 112*a*1, which is closest to a marker 112*c*, or (2) a third core 112*a*3 connected to a first core Mal, which is closest to a marker 111*c* in the first multi-core fiber 111**.

With this, it is possible to reduce a phenomenon that signal light guided through the first core Mal, which is closest to the marker **111*c* in the first multi-core fiber 111, suffers from (i) a deterioration caused by the marker 112*c* in the second multi-core fiber 112 and (ii) a deterioration caused by the marker 113*c* in the third multi-core fiber 113. In addition, it is possible to reduce a phenomenon that signal light guided through the first core 112*a*1, which is closest to the marker 112*c* in the second multi-core fiber 112, suffers from (i) a deterioration caused by the marker 111*c* in the first multi-core fiber 111 and (ii) a deterioration caused by the marker 113*c* in the third multi-core fiber 113**.

Example 2 of First Aspect (Configuration of Fiber Connected Body)

Figure 5:
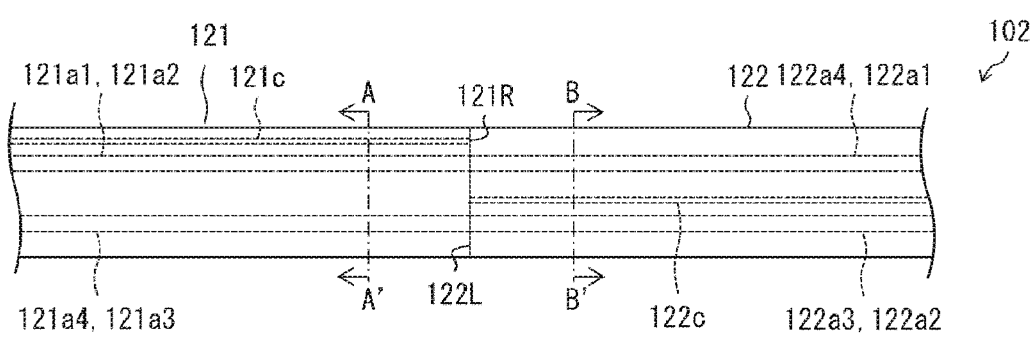
FIG. 5 shows a side view and cross-sectional views illustrating a configuration of a fiber connected body in accordance with one or more embodiments.
Figure 5:
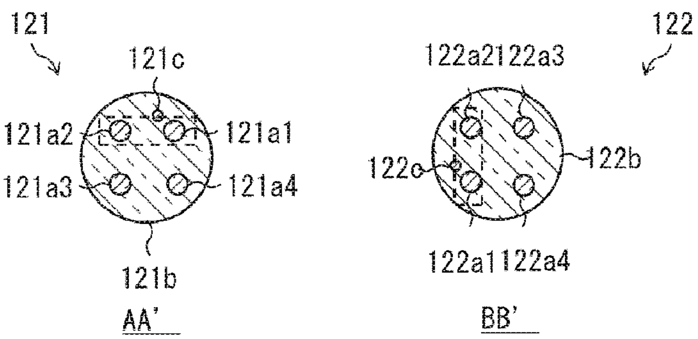

The following description will discuss, with reference to FIG. 5, a configuration of a fiber connected body 102 in accordance with Example 2 of the first aspect of one or more embodiments. FIG. 5 shows a side view and cross-sectional views illustrating a configuration of the fiber connected body 102.

As shown in FIG. 5, the fiber connected body 102 includes a first multi-core fiber 121 and a second multi-core fiber 122. The first multi-core fiber 121 has one end surface 121R connected (in Example 2, fusion-spliced) with one end surface 122L of the second multi-core fiber 122.

The first multi-core fiber 121 includes n (n is a natural number of not less than three) cores **121*a*1 to 121*an* and a cladding 121*b*. The cladding 121*b* is a cylindrical member. The cladding 121*b* is made of silica glass, for example. Each core 121*ai* (i is a natural number of not less than one and not more than n) is a cylindrical-shape area that resides inside the cladding 121*b*, that has a higher refractive index than that of the cladding 121*b*, and that extends in a direction in which the cladding 121*b* extends. Each core 121*ai* is made of, for example, silica glass doped with an updopant such as germanium. Arrangement of the cores 121*a*1 to 121*an* is defined such that cross-sectional centers of the cores 121*a*1 to 121*an* are arranged at equal intervals on a circumference of a circle which has a radius R and which has a center at a center of the cladding 121*b***.

The first multi-core fiber 121 further includes a marker **121*c*. The marker 121*c* is an area that resides inside the cladding 121*b*, that has a different refractive index from that of the cladding 121*b*, and that extends in a direction in which the cladding 121*b* extends. The shape of the marker 121*c* may be any shape, and may be a cylindrical shape or a triangular prism shape, for example. The marker 121*c* is made of, for example, silica glass doped with a downdopant such as fluorine. In this case, the marker 121*c* has a refractive index lower than that of the cladding 121*b*. Alternatively, the marker 121*c* is made of silica glass doped with an updopant such as germanium, aluminum, phosphorus, or chlorine. In this case, the marker 121*c* has a refractive index higher than that of the cladding 121*b*. The marker 121*c*** may be formed by, for example, a drilling process or a stack-and-draw process.

Arrangement of the marker **121*c* in the first multi-core fiber 121 is defined such that d1, d2, . . . , do are all different from one another, where di is a distance from the marker 121*c* to the core 121*ai*. Arrangement of the marker 121*c* is defined in this manner in order to make it possible to easily identify the cores 121*a*1 to 121*an* in accordance with the distances from the marker 121*c* to the cores. This makes it possible to more reliably identify the cores, thereby enabling measurement of properties of a certain core, for example. Ordinal numbers of the cores 121*a*1 to 121*an* in the first multi-core fiber 121 are defined as follows in accordance with positional relations between the cores and the marker 121*c*. That is, among the cores 121*a*1 to 121*an*, a core closest to the marker 121*c* is called a first core 121*a*1. Of two cores adjacent to the first core 121*a* among the cores 121*a*1 to 121*an*, a core closer to the marker 121*c* is called a second core 121*a*2. Ordinal numbers of the remaining cores 121*a*3 to 121*an* are defined in accordance with an arrangement order of these cores on the above-described circumference of the circle having the radius R. For example, of two cores adjacent to the second core 121*a*2, a core that is not the first core 121*a*1 is called a third core 121*a*3. Of the two cores adjacent to the third core 121*a*3, a core that is not the second core 121*a*2 is called a fourth core 121*a*4**.

The second multi-core fiber 122 includes n cores **122*a*1 to 122*an* and a cladding 122*b*. The cladding 122*b* is a cylindrical member. The cladding 122*b* is made of silica glass, for example. Each core 122*ai* is a cylindrical-shape area that resides inside the cladding 122*b*, that has a higher refractive index than that of the cladding 122*b*, and that extends in a direction in which the cladding 122*b* extends. Each core 122*ai* is made of, for example, silica glass doped with an updopant such as germanium. The number of cores 122*a*1 to 122*an* is identical to the number of cores 121*a*1 to 121*an* in the first multi-core fiber 121. A diameter of each of the cores 122*a*1 to 122*an* is identical to a diameter of each of the cores 121*a*1 to 121*an* in the first multi-core fiber 121. Similarly to the arrangement of the cores 121*a*1 to 121*an* in the first multi-core fiber 121, arrangement of the cores 121*a*1 to 121*an* is defined such that cross sections of the cores 122*a*1** to 122*an* are arranged at equal intervals on a circumference of a circle which has a radius R and which has a center at a center of the cladding 122*b*.

The second multi-core fiber 122 further includes a marker 122*c*. The marker 122*c* is an area that resides inside the cladding 122*b*, that has a different refractive index from that of the cladding 122*b*, and that extends in a direction in which the cladding 122*b* extends. The shape of the marker 121*c* may be any shape, and may be a cylindrical shape or a triangular prism shape, for example. The marker 122*c* is made of, for example, silica glass doped with a downdopant such as fluorine. In this case, the marker 122*c* has a refractive index lower than that of the cladding 122*b*. Alternatively, the marker 122*c* is made of silica glass doped with an updopant such as germanium, aluminum, phosphorus, or chlorine. In this case, the marker 122*c* has a refractive index higher than that of the cladding 122*b*. The marker 122*c* may be formed by, for example, a drilling process or a stack-and-draw process.

Arrangement of the marker 122*c* in the second multi-core fiber 122 is defined in a similar manner to that of the marker 121*c* in the first multi-core fiber 121. Ordinal numbers of the cores 122*a*1 to 122*an* in the second multi-core fiber 122 are defined in a similar manner to the ordinal numbers of the cores 121*a*1 to 121*an* in the first multi-core fiber 121.

An A-A' cross section of the first multi-core fiber 121 shown in FIG. 5 is viewed from the right side in FIG. 5. Meanwhile, a B-B' cross section of the second multi-core fiber 122 shown in FIG. 5 is viewed from the left side in FIG. 5. Thus, at a connected part between the one end surface 121R and the one end surface 122L, a right edge of the A-A' cross section of the first multi-core fiber 121 as viewed in FIG. 5 and a left edge of the B-B' cross section of the second multi-core fiber 122 as viewed in FIG. 5 are connected to each other, and a left edge of the A-A' cross section of the first multi-core fiber 121 as viewed in FIG. 5 and a right edge of the B-B' cross section of the second multi-core fiber 122 as viewed in FIG. 5 are connected to each other.

In the fiber connected body 102 in accordance with Example 2, the first multi-core fiber 121 and the second multi-core fiber 122 are connected to each other in such a manner as to satisfy the following conditions.

Condition 1: Each of the cores 122*ai* in the second multi-core fiber 122 is connected to any one of the cores 121*a*1 to 121*an* in the first multi-core fiber 121.

Condition 2: The marker 122*c* in the second multi-core fiber 122 is connected to a part of the first multi-core fiber 121 which part is not the marker 121*c*.

Further, the fiber connected body 102 in accordance with Example 2 satisfies the following condition.

Condition 3B: A pair of the first core 122*a*1, which is closest to the marker 122*c* in the second multi-core fiber 122, and the second core 122*a*2, which is second closest to the marker 122*c* in the second multi-core fiber 122, is connected to a pair (specifically, a pair of the third core 121*a*3 and the second core 121*a*2) that is not a pair of the first core 121*a*1, which is closest to the marker 121*c* in the first multi-core fiber 121, and the second core 121*a*2, which is second closest to the marker 121*c* in the first multi-core fiber 121.

(Effects of Fiber Connected Body)

In a multi-core fiber in which a marker exists between two adjacent cores, leakage of light from one of the two adjacent cores to the other can be reduced. Accordingly, it is possible to reduce crosstalk between a core closest to the marker and a core second closest to the marker.

In a conventional fiber connected body, a pair of a marker closest to a marker and a core second closest to the marker in a first multi-core fiber is connected to a pair of a core closest to a marker and a core second closest to the marker in the second multi-core fiber. As a result, only a single pair of cores can attain the effect of reducing crosstalk.

On the other hand, in the fiber connected body 102 in accordance with Example 2, a pair of the first core 121*a*1, which is closest to the marker 121*c* in the first multi-core fiber 121, and the second core 121*a*2, which is second closest to the marker 121*c* in the first multi-core fiber 121, is connected to a pair (specifically, a pair of the second core 122*a*2 and the third core 122*a*3) that is not a pair of the first core 122*a*1, which is closest to the marker 122*c* in the second multi-core fiber 122, and the second core 122*a*2, which is second closest to the marker 122*c* in the second multi-core fiber 122. Thus, the pair of these cores can attain the effect of reducing crosstalk.

Further, in the fiber connected body 102 in accordance with Example 2, a pair of the first core 122*a*1, which is closest to the marker 122*c* in the second multi-core fiber 122, and the second core 122*a*2, which is second closest to the marker 122*c* in the second multi-core fiber 122, is connected to a pair (specifically, a pair of the third core 121*a*3 and the second core 121*a*2) that is not a pair of the first core 121*a*1, which is closest to the marker 121*c* in the first multi-core fiber 121, and the second core 122*a*2, which is second closest to the marker 121*c* in the first multi-core fiber 121. Thus, the pair of these cores can also attain the effect of reducing crosstalk.

As discussed above, the fiber connected body 102 in accordance with Example 2 can achieve an increased number of pairs of cores that can attain the effect of reducing crosstalk. Here, there may be a case where ordinal numbers of cores in each multi-core fiber are defined in accordance with an arrangement order of the cores such that a core closest to a marker is a first core and a core second closest to the marker is a second core and the number of cores second closest to the marker is two or more. In such a case, either of such pairs is to be selected. With either of the pairs, it is possible to attain a similar effect.

Setting the refractive indexes of the markers 121*c* and 122*c* so as to be lower than those of the claddings 121*b* and 122*b* gives the following advantage to the fiber connected body 102 in accordance with Example 2. That is, it is possible to more effectively reduce (i) light leakage from the first cores 121*a*1 and 122*a*1 to the second cores 121*a*2 and 22*a*2 and (ii) light leakage from the second cores 121*a*2 and 22*a*2 to the first cores 121*a*1 and 122*a*1. Thus, it is possible to further enhance the effect of reducing crosstalk. Conversely, setting the refractive indexes of the markers 121*c* and 122*c* so as to be higher than those of the claddings 121*b* and 122*b* gives the following advantage to the fiber connected body 102 in accordance with Example 2. That is, light trapped by the markers 121*c* and 122*c* propagates through the first multi-core fiber 121 and the second multi-core fiber 122, which is advantageous depending on a propagating distance and/or a fiber parameter. Meanwhile, considering that (i) crosstalk between the first cores 121*a*1 and 122*a*1, each close to close to the marker 121*c*, and (ii) crosstalk between the second cores 121*a*2 and 122*a*2, each close to close to the marker 122*c*, are deteriorated, dispersing the pairs with a poor crosstalk property is advantageous, since this can improve crosstalk in the entire multi-core fiber.

(Variation of Connection Pattern)

Figure 6:
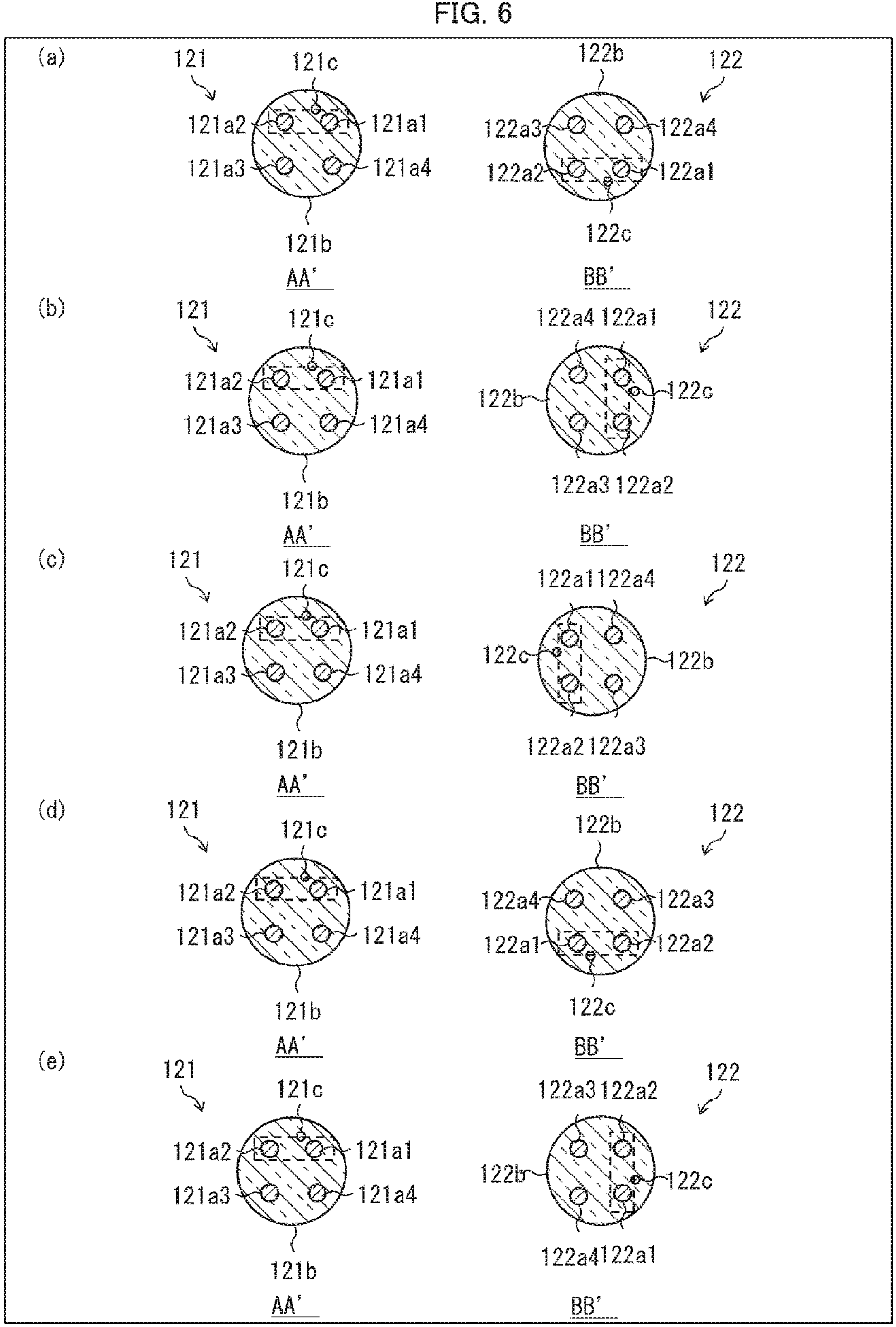
FIG. 6 shows cross-sectional views of the fiber connected body shown in FIG. 5 to indicate variations of a connection pattern.

The connection pattern satisfying the above-described conditions 1, 2, and 3B is not limited to the connection pattern shown in FIG. 5. FIG. 6 illustrates a connection pattern that satisfies the above-described conditions 1, 2, and 3B and that is not the connection pattern shown in FIG. 5.

(a) of FIG. 6 illustrates a connection pattern in which a pair of the first core 121*a*1, which is closest to the marker 121*c* in the first multi-core fiber 121, and the second core 121*a*2, which is second closest to the marker 121*c* in the first multi-core fiber 121, is connected to a pair of the third core 122*a*3 and the fourth core 122*a*4 in the second multi-core fiber 122. A pair of the first core 122*a*1, which is closest to the marker 122*c* in the second multi-core fiber 122, and the second core 122*a*2, which is second closest to the marker 122*c* in the second multi-core fiber 122, is connected to a pair of the third core 121*a*3 and the fourth core 121*a*4 in the first multi-core fiber 121.

(b) of FIG. 6 illustrates a connection pattern in which a pair of the first core 121*a*1, which is closest to the marker 121*c* in the first multi-core fiber 121, and the second core 121*a*2, which is second closest to the marker 121*c* in the first multi-core fiber 121, is connected to a pair of the fourth core 122*a*4 and the first core 122*a*1 in the second multi-core fiber 122. A pair of the first core 122*a*1, which is closest to the marker 122*c* in the second multi-core fiber 122, and the second core 122*a*2, which is second closest to the marker 122*c* in the second multi-core fiber 122, is connected to a pair of the second core 121*a*2 and the third core 121*a*3 in the first multi-core fiber 121.

(c) of FIG. 6 illustrates a connection pattern in which a pair of the first core 121*a*1, which is closest to the marker 121*c* in the first multi-core fiber 121, and the second core 121*a*2, which is second closest to the marker 121*c* in the first multi-core fiber 121, is connected to a pair of the first core 122*a*1 and the fourth core 122*a*4 in the second multi-core fiber 122. A pair of the first core 122*a*1, which is closest to the marker 122*c* in the second multi-core fiber 122, and the second core 122*a*2, which is second closest to the marker 122*c* in the second multi-core fiber 122, is connected to a pair of the first core 121*a*1 and the fourth core 121*a*4 in the first multi-core fiber 121.

(d) of FIG. 6 illustrates a connection pattern in which a pair of the first core 121*a*1, which is closest to the marker 121*c* in the first multi-core fiber 121, and the second core 121*a*2, which is second closest to the marker 121*c* in the first multi-core fiber 121, is connected to a pair of the fourth core 122*a*4 and the third core 122*a*3 in the second multi-core fiber 122. A pair of the first core 122*a*1, which is closest to the marker 122*c* in the second multi-core fiber 122, and the second core 122*a*2, which is second closest to the marker 122*c* in the second multi-core fiber 122, is connected to a pair of the fourth core 121*a*4 and the third core 121*a*3 in the first multi-core fiber 121.

(e) of FIG. 6 illustrates a connection pattern in which a pair of the first core 121*a*1, which is closest to the marker 121*c* in the first multi-core fiber 121, and the second core 121*a*2, which is second closest to the marker 121*c* in the first multi-core fiber 121, is connected to a pair of the third core 122*a*3 and the second core 122*a*2 in the second multi-core fiber 122. A pair of the first core 122*a*1, which is closest to the marker 122*c* in the second multi-core fiber 122, and the second core 122*a*2, which is second closest to the marker 122*c* in the second multi-core fiber 122, is connected to a pair of the third core 121*a*3 and the second core 121*a*2 in the first multi-core fiber 121.

In each of the connection patterns shown in (a) to (e) of FIG. 6, a pair of the first core 121*a*1, which is closest to the marker 121*c* in the first multi-core fiber 121, and the second core 121*a*2, which is second closest to the marker 121*c* in the first multi-core fiber 121, is connected to a pair that is not a pair of the first core 122*a*1, which is closest to the marker 122*c* in the second multi-core fiber 122, and the second core 122*a*2, which is second closest to the marker 122*c* in the second multi-core fiber 122. Thus, these pairs of cores can attain the effect of reducing crosstalk.

In each of the connection patterns shown in (a) to (e) of FIG. 6, a pair of the first core 122*a*1, which is closest to the marker 122*c* in the second multi-core fiber 122, and the second core 122*a*2, which is second closest to the marker 122*c* in the second multi-core fiber 122, is connected to a pair that is not a pair of the first core 121*a*1, which is closest to the marker 121*c* in the first multi-core fiber 121, and the second core 122*a*2, which is second closest to the marker 121*c* in the first multi-core fiber 121. Thus, these pairs of cores can also attain the effect of reducing crosstalk.

As discussed above, in each of the connection patterns illustrated in (a) to (e) of FIG. 6, two pairs of cores that can attain the effect of reducing crosstalk.

(Supplemental Remarks on Arrangement of Markers)

Figure 7:
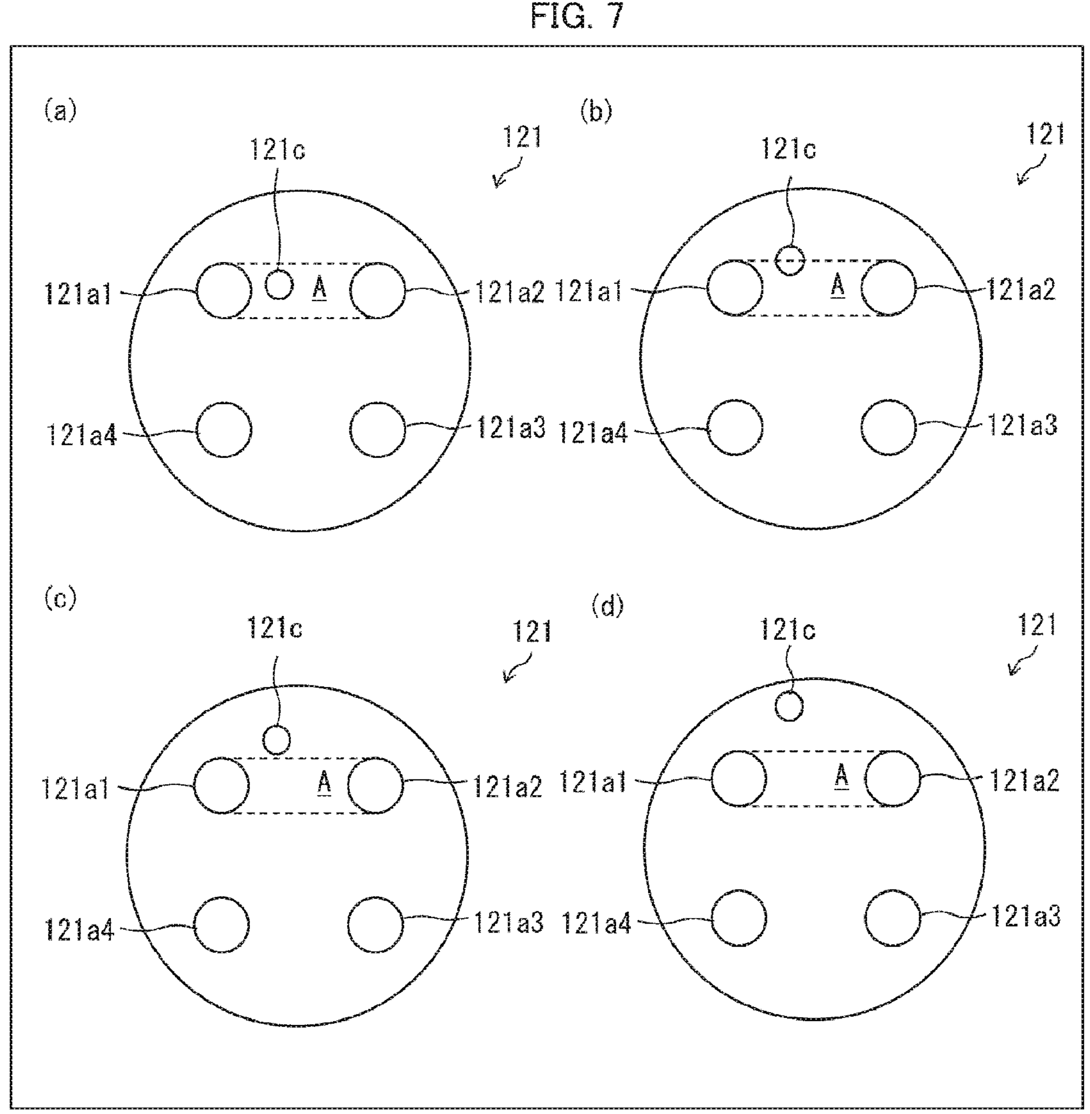
FIG. 7 shows cross-sectional views of the fiber connected body shown in FIG. 5 to indicate variations of positioning of a marker.

As shown in (a) of FIG. 7, the marker 121*c* in the first multi-core fiber 121 is preferably disposed inside an area A interposed between the first core 121*a*1 and the second core 121*a*2. Normally, light leaking from the first core 121*a* has an intensity that is in the form of concentric Gaussian distribution in a cross section of the first multi-core fiber 121. A degree of crosstalk between the first core 121*a*1 and the second core 121*a*2 in the multi-core fiber 121 is determined by an overlap integral of (i) an intensity distribution of light leaking from the first core 121*a*1 and (ii) an intensity distribution of light leaking from the second core 121*a*2. This is because that employing the arrangement shown in (a) of FIG. 7 can reduce light confinement in an area having a relatively high light intensity, thereby reducing the crosstalk in a most effective manner. This is also true for the arrangement of the marker 122*c* in the second multi-core fiber 122.

However, the arrangement of the marker 121*c* in the first multi-core fiber 121 is not limited to this. Alternatively, for example, the marker 121*c* in the first multi-core fiber 121 may be disposed on an outline of the area A interposed between the first core 121*a*1 and the second core 121*a*2, as shown in (b) of FIG. 7. Even with the arrangement shown in (b) of FIG. 7, it is possible to achieve the effect of reducing crosstalk, although the effect is not as high as that achieved when the arrangement shown in (a) of FIG. 7 is employed. Further alternatively, as shown in (c) of FIG. 7, the marker 121*c* in the first multi-core fiber 121 may be disposed in the vicinity of the area A interposed between the first core 121*a*1 and the second core 121*a*2. Even with the arrangement shown in (c) of FIG. 7, it is possible to achieve the effect of reducing crosstalk, although the effect is not as high as that achieved when the arrangement shown in (a) or (b) of FIG. 7 is employed. Still further alternatively, as shown in (d) of FIG. 7, the marker 121*c* in the first multi-core fiber 121 may be disposed at a location separated from the area A interposed between the first core 121*a*1 and the second core 121*a*2. Even with the arrangement shown in (d) of FIG. 7, it is possible to achieve the effect of reducing crosstalk, although the effect is not as high as that achieved when the arrangement shown in (a), (b), or (c) of FIG. 7 is employed. This is also true for the arrangement of the marker 122*c* in the second multi-core fiber 122.

(Variation)

The fiber connected body 102 shown in FIG. 5 may have two opposite ends respectively provided with optical connectors. The following description will discuss, with reference to FIG. 8, the fiber connected body 102 provided with the optical connectors.

Figure 8:
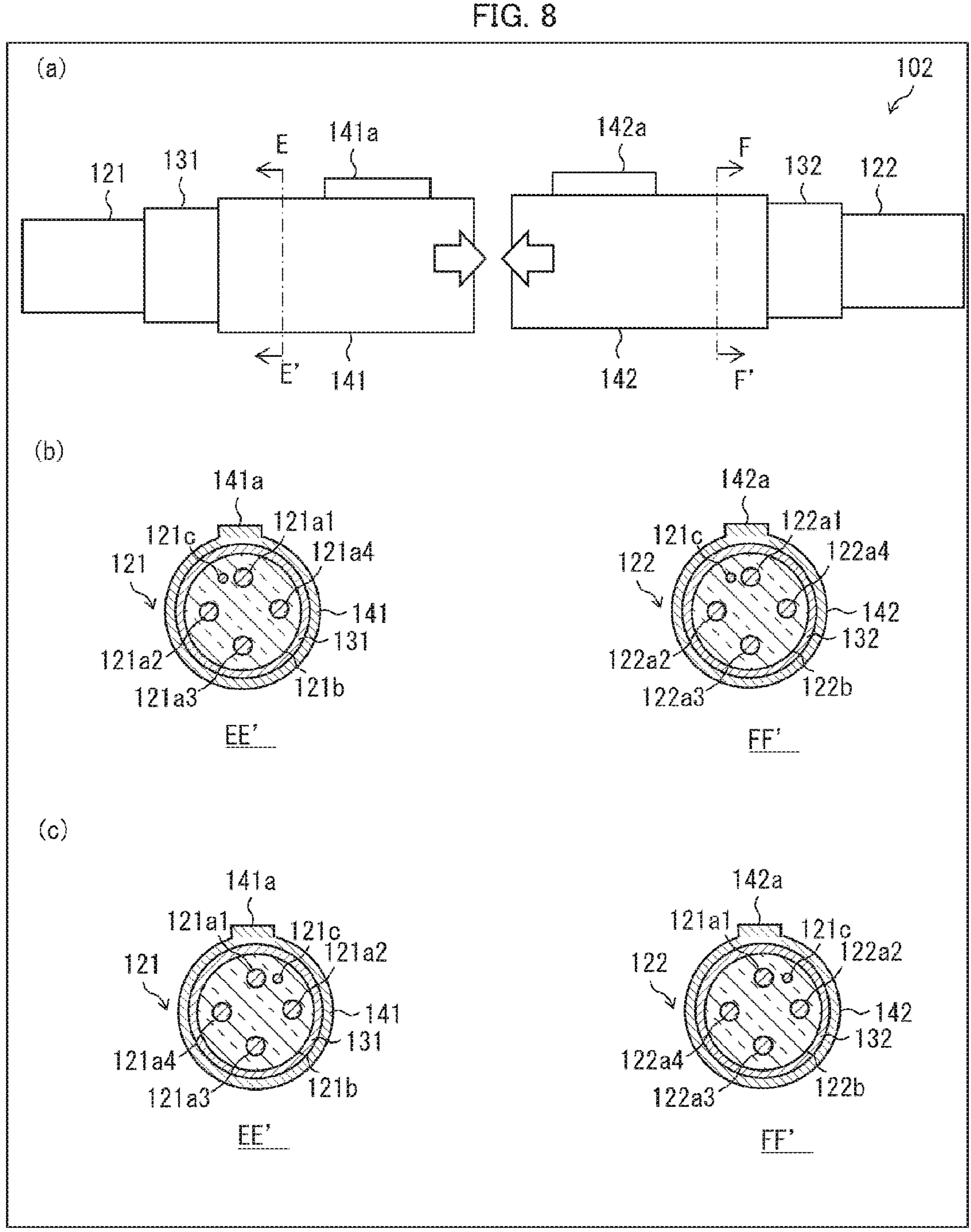
FIG. 8 shows a side view and cross-sectional views illustrating a variation of the fiber connected body shown in FIG. 5.

FIG. 8 shows a side view and cross-sectional views illustrating a variation of the fiber connected body 102. An E-E' cross section of a frame 141 shown in (b) and (c) of FIG. 8 is viewed from the right side in (a) of FIG. 8. Meanwhile, an F-F' cross section of a frame 142 shown in (b) and (c) of FIG. 8 is viewed from the left side in (a) of FIG. 8.

As shown in (a) of FIG. 8, a first multi-core fiber 121 has an end surface that is adjacent to a second multi-core fiber 122 and that is covered with a ferrule 131, and the ferrule 131 is further covered with the frame 141. Meanwhile, the second multi-core fiber 122 has an end surface that is adjacent to the first multi-core fiber 121 and that is covered with a ferrule 132, and the ferrule 132 is further covered with the frame 142. The frames 141 and 142 have outer surfaces provided with protrusions that are called connection keys 141*a* and 142*a*, respectively.

In this case, a fiber connected body is constructed according to the following flow. As shown in (b) or (c) of FIG. 8, the connection key 141*a* on the frame 141 and the connection key 142*a* on the frame 142 are aligned. Next, the connection keys are fitted to connection key grooves on an adapter (not illustrated) for alignment, and then the frames 141 and 142 are connected to each other. Consequently, the first multi-core fiber 121 and the second multi-core fiber 122 are connected to each other. As a result, the fiber connected body is constructed. It can be understood the fiber connected body has the following configuration. That is, the fiber connected body further includes: the frame 141 provided at an end of the first multi-core fiber 121 which end is adjacent to the second multi-core fiber 122; and the frame 142 provided at an end of the second multi-core fiber 122 which end is adjacent to the first multi-core fiber 121, the connection key 141*a* provided on the surface of the frame 141 being aligned to the core 121*a*1, which is closest to the marker 121*c*, the connection key 142*a* provided on the frame 142 being aligned to the core 122*a*1, which is closest to the marker 121*c*. With the above configuration, if the two connection keys are aligned and connected with each other, the first multi-core fiber 121 and the second multi-core fiber 122 are properly connected to each other. That is, it is possible to provide the fiber connected body that can facilitate proper connection of the first multi-core fiber to the second multi-core fiber.

Figure 19:
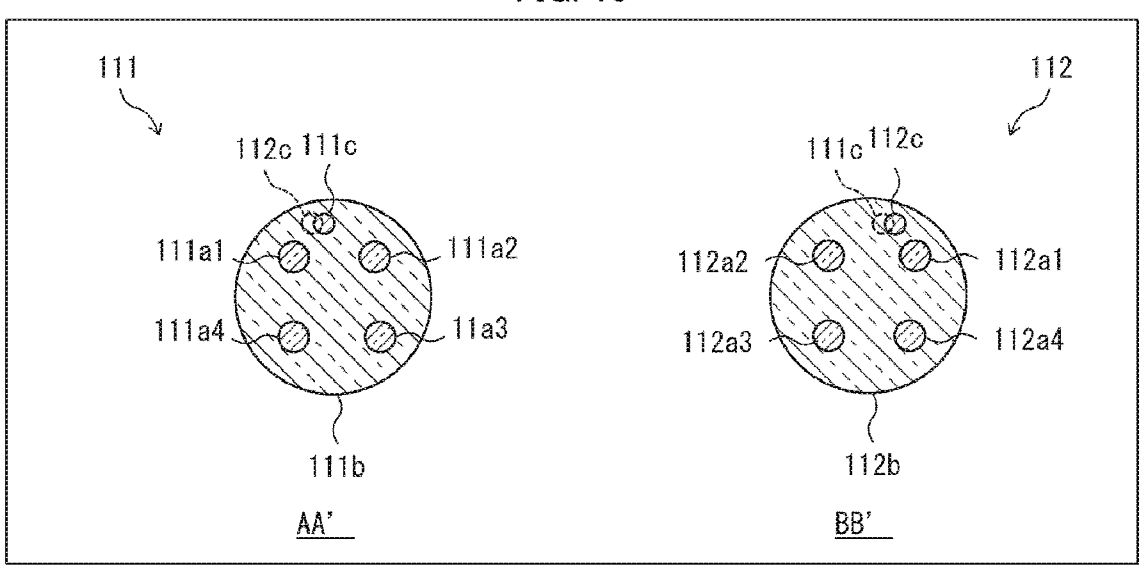
FIG. 19 shows cross-sectional views illustrating a variation of the fiber connected body in accordance with one or more embodiments.

The above-described multi-core fiber connected body 101 may be configured to satisfy the following condition α1 or α2. For example, FIG. 19 illustrates end surfaces of a first multi-core fiber 111 and a second multi-core fiber 112 in the multi-core fiber connected body 101 satisfying both the conditions α1 and α2.

Condition α1: Only a part of the marker 112*c* in the second multi-core fiber 112 is connected to a part (e.g., the cladding 111*b*) of the first multi-core fiber 111 which part is not the marker 111*c*.

Condition α2: Only a part of the marker 111*c* in the first multi-core fiber 111 is connected to a part (e.g., the cladding 111*b*) of the second multi-core fiber 112 which part is not the marker 112*c*.

If the marker 111*c* gets closer at least to the core Mal, which is closest to the marker 111*c*, in the first multi-core fiber 111, the following phenomenon (phenomena) may occur: a gap created between the marker material and the cladding material may be buried in the base material and/or the multi-core fiber 111; and/or, at cooling of the base material of the multi-core fiber 111 after drawing, the glass surrounding the marker 111*c* may be deformed due to a difference in linear expansion coefficient between the marker 111*c* and the cladding 111*b*. Then, the core 111*a*1, which is closest to the marker 111*c*, may be subjected to a stress and/or deformed, whereby a characteristic deterioration problem can occur, specifically, the optical waveguide characteristics of the core 111*a*1, which is closest to the marker 111*c*, can be deteriorated. Examples of the characteristics of the core closest to the marker that can be deteriorated include polarization mode dispersion. This is also true for the second multi-core fiber 112. As compared to a configuration not satisfying the conditions α1 and α2 (i.e., a configuration in which the markers 111*c* and 112*c* do not overlap each other (a configuration satisfying the later-described conditions 61 and 62)), a configuration satisfying the condition α1 or α2 includes the marker 111*c* more separated at least from the core 111*a*1, which is closest to the marker 111*c*, in the first multi-core fiber 111 and the marker 112*c* more separated at least from the core 112*a*1, which is closest to the marker 112*c*, in the second multi-core fiber 112. In this case, it is possible to reduce the characteristic deterioration problem such as those described above (hereinafter, this effect may also be expressed as a "former effect"). In addition, as compared to a configuration in which the separation is made in a radial direction, a configuration satisfying the condition can more reduce a deformation in the cladding 111*b* that may occur due to an increase in thickness of the cladding 111*b*, a production matter, or the like (hereinafter, this effect may also be expressed as a "latter effect"). Also with the condition α2, the second multi-core fiber 112 can attain a similar effect.

Figure 20:
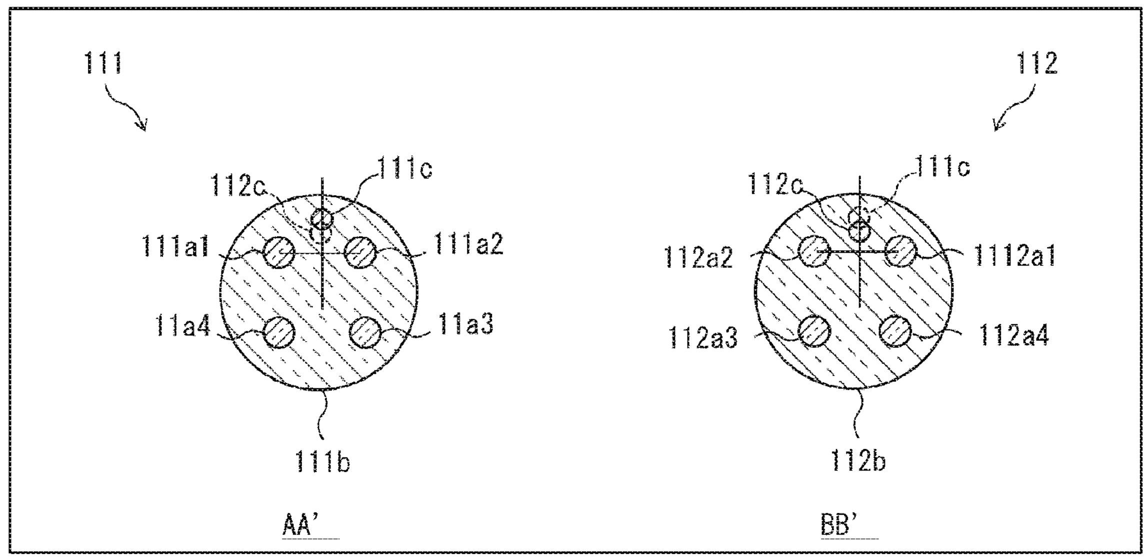
FIG. 20 shows cross-sectional views illustrating a variation of the fiber connected body in accordance with one or more embodiments.
Figure 19:
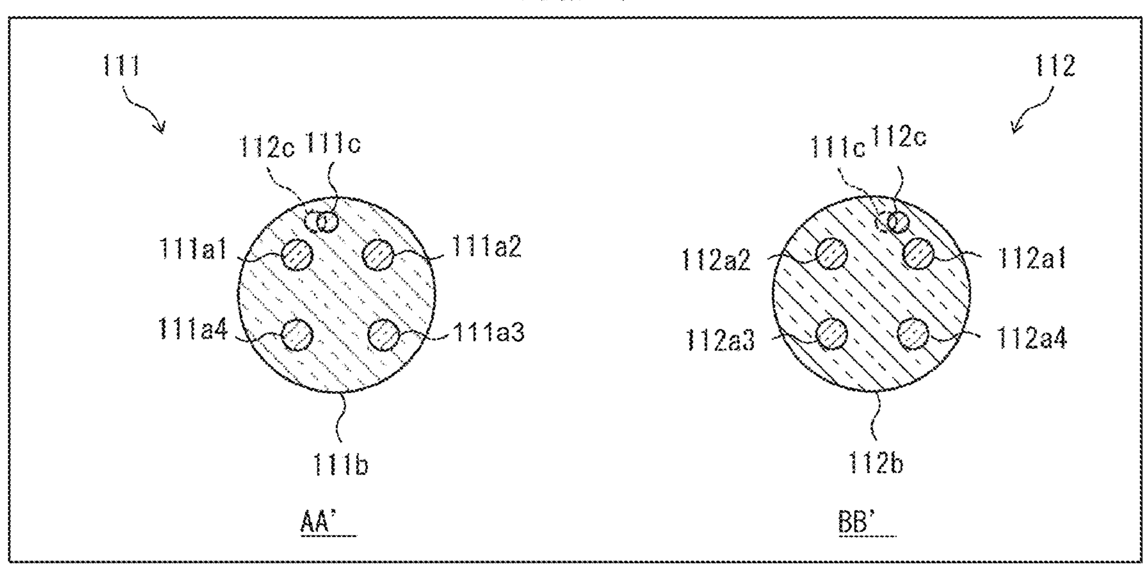
Figure 20:
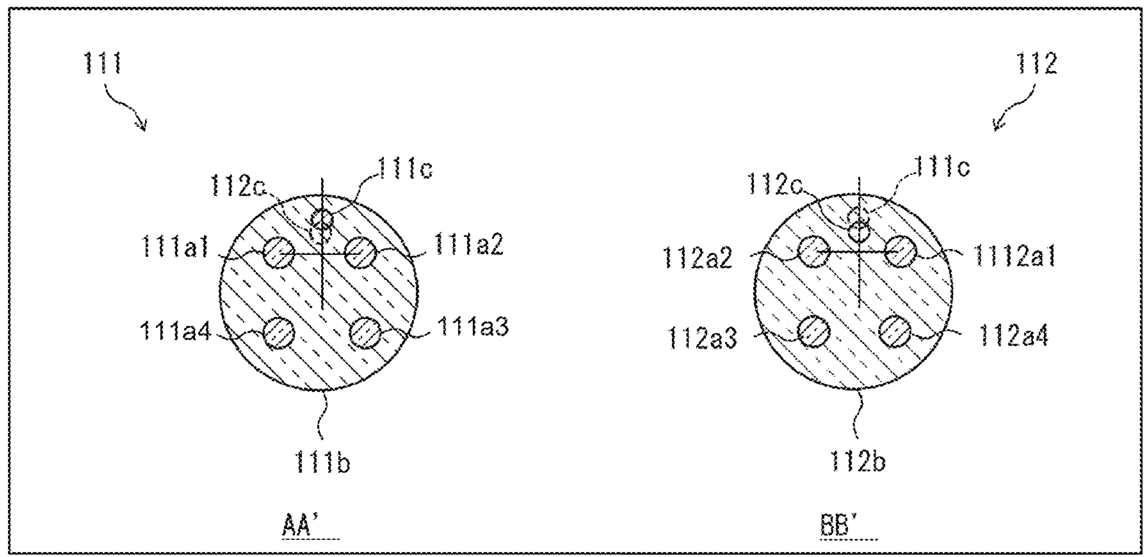

The above-described multi-core fiber connected body 101 may be configured to satisfy the following condition β1 or β2, in addition to the above-described condition α1 or α2. For example, FIG. 20 illustrates end surfaces of a first multi-core fiber 111 and a second multi-core fiber 112 in a multi-core fiber connected body 101 satisfying both the conditions β1 and β2.

Condition β1: In the end surface of the first multi-core fiber 111, a marker 111*c* overlaps an imaginary perpendicular bisector of an imaginary line segment connecting a center of a core 111*a*1, which is closest to the marker 111*c* among the cores 111*a*1 to 111*a*4 in the first multi-core fiber 111, and a center of the core 111*a*2, which is second closest to the marker 111*c* among the cores 111*a*1 to 111*a*4.

Condition β2: In the end surface of the second multi-core fiber 112, a marker 112*c* overlaps an imaginary perpendicular bisector of an imaginary line segment connecting a center of a core 112*a*1, which is closest to the marker 112*c* among the cores 112*a*1 to 112*a*4 in the second multi-core fiber 112, and a center of the core 12*a*2, which is second closest to the marker 112*c* among the cores 112*a*1 to 112*a*4.

If the condition β1 or β2 is satisfied, the marker 111*c* can be more separated at least from the core 111*a*1, which is closest to the marker 111*c*, in the first multi-core fiber 111 and the marker 112*c* can be more separated at least from the core 112*a*1, which is closest to the marker 112*c*, in the second multi-core fiber 112. This can reduce the above-described characteristic deterioration problem that may otherwise occur when the marker 111*c* gets closer at least to the core 111*a*1 and/or the marker 112*c* gets closer at least to the core 112*a*1.

The condition β1 may be replaced with the following condition β1', and the condition β2 may be replaced with the following condition β2'. In this case, the marker 111$c$ can be even more separated from the cores 111$a$1 to 111$a$4 in the first multi-core fiber 111, and the marker 112$c$ can be even more separated from the cores 112$a$1 to 112$a$4 in the second multi-core fiber 112. Thus, it is possible to further reduce the above-described characteristic deterioration problem that may otherwise occur when the marker 111$c$ gets closer to the cores 111$a$1 to 111$a$4 and/or when the marker 112$c$ gets closer to the cores 112$a$1 to 112$a$4.

Condition β1': In the end surface of the first multi-core fiber 111, the center of the marker 111$c$ may overlap the imaginary perpendicular bisector of the imaginary line segment connecting the center of the core 111$a$1, which is closest to the marker 111$c$ among the cores 111$a$1 to 111$a$4 in the first multi-core fiber 111, and the center of the core 111$a$2, which is second closest to the marker 111$c$ among the cores 111$a$1 to 111$a$4.

Condition β2': In the end surface of the second multi-core fiber 112, the center of the marker 112$c$ overlaps the imaginary perpendicular bisector of the imaginary line segment connecting the center of the core 112$a$1, which is closest to the marker 112$c$ among the cores 112$a$1 to 112$a$4 in the second multi-core fiber 112, and the center of the core 12$a$2, which is second closest to the marker 112$c$ among the cores 112$a$1 to 112$a$4.

Figure 21:
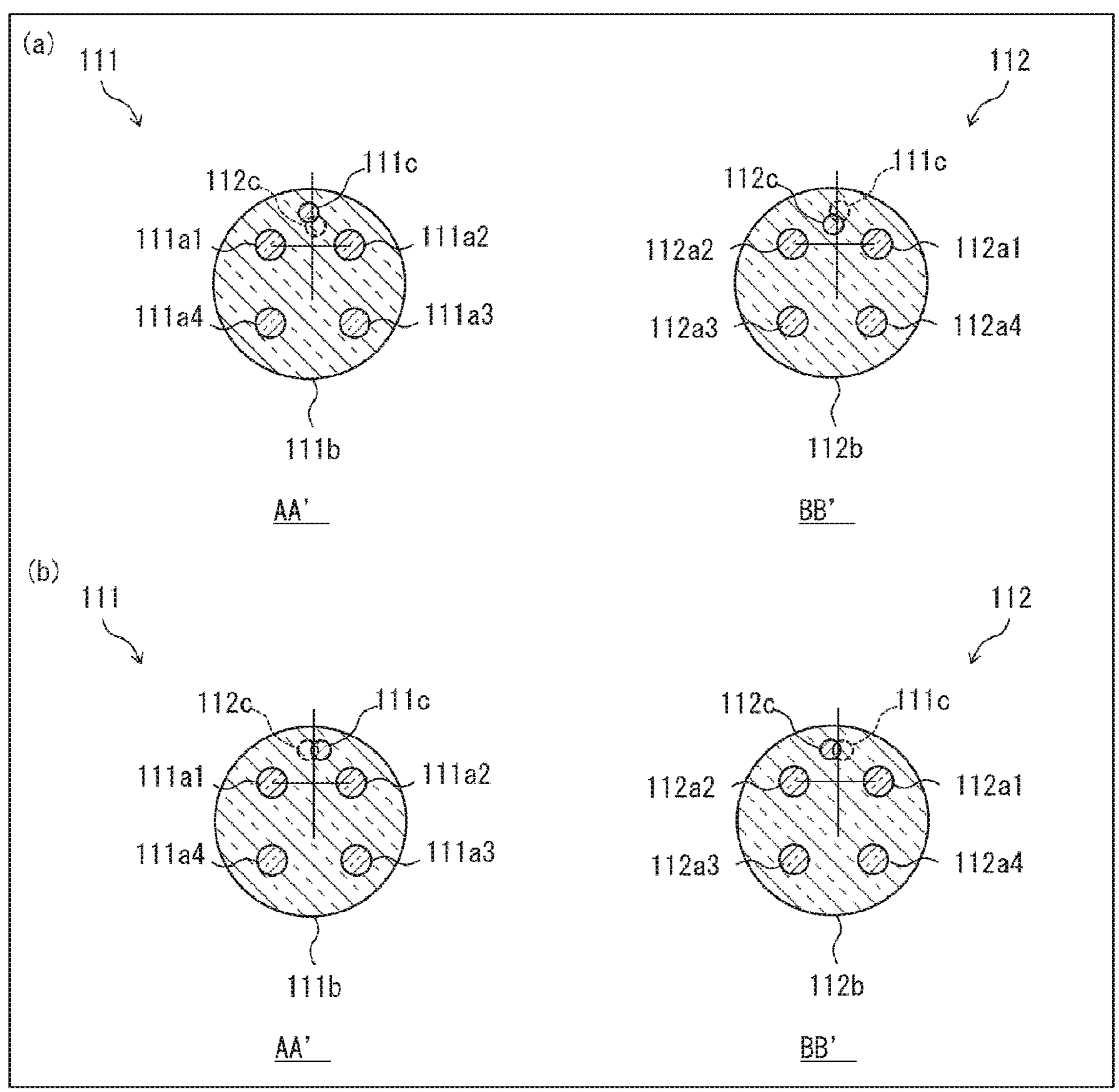
FIG. 21 shows cross-sectional views illustrating a variation of the fiber connected body in accordance with one or more embodiments.

The above-described multi-core fiber connected body 101 may be configured to satisfy the following condition γ1 or γ2. Alternatively, the multi-core fiber connected body 101 may be configured to satisfy the following condition γ1 or γ2, in addition to the condition α1 or α2. Further alternatively, the multi-core fiber connected body 101 may be configured to satisfy the following condition γ1 or γ2, in addition to (i) the condition α1 or α2 and (ii) the condition β1, β1', β2 or β2'. For example, (a) of FIG. 21 illustrates end surfaces of a first multi-core fiber 111 and a second multi-core fiber 112 in a multi-core fiber connected body 101 satisfying both the conditions γ1 and γ2.

Condition γ1: In the end surface of the first multi-core fiber 111, a center of a marker 111$c$ does not overlap an imaginary perpendicular bisector of an imaginary line segment connecting a center of a core 111$a$1, which is closest to the marker 111$c$ among the cores 111$a$1 to 111$a$4 in the first multi-core fiber 111, and a center of the core 111$a$2, which is second closest to the marker 111$c$ among the cores 111$a$1 to 111$a$4.

Condition γ2: In the end surface of the second multi-core fiber 112, a center of a marker 112$c$ does not overlap an imaginary perpendicular bisector of an imaginary line segment connecting a center of a core 112$a$1, which is closest to the marker 112$c$ among the cores 112$a$1 to 112$a$4 in the second multi-core fiber 112, and a center of the core 112$a$2, which is second closest to the marker 112$c$ among the cores 112$a$1 to 112$a$4.

In this case, the center of the marker 111$c$ or the center of the marker 112$c$ is shifted from the above-described imaginary perpendicular bisector. Thus, as compared to a configuration in which the marker 111$c$ in the first multi-core fiber 111 and the marker 112$c$ in the second multi-core fiber 112 completely overlap each other or a configuration in which the center of the marker 111$c$ and the center of the marker 112$c$ overlap the above-described imaginary perpendicular bisectors, it is easier (i) to discriminate the end surface of the first multi-core fiber 111 and the end surface of the second multi-core fiber 112 from each other or (ii) to identify a core number of the first multi-core fiber 111 or a core number of the second multi-core fiber 112. This facilitates connection of (i) the first multi-core fiber 111 or the second multi-core fiber 112 to (ii) external transceivers or external fan-in/fan-out devices.

The above-described multi-core fiber connected body 101 may be configured to satisfy the following condition η. For example, (b) of FIG. 21 illustrates end surfaces of a first multi-core fiber 111 and a second multi-core fiber 112 in a multi-core fiber connected body 101 satisfying both the condition η.

Condition η: In one end surface of the first multi-core fiber 111 or one end surface of the second multi-core fiber 112, an imaginary straight line connecting a center of a marker 111$c$ in the first multi-core fiber 111 and a center of a marker 112$c$ in the second multi-core fiber 112 is in parallel with (i) an imaginary straight line connecting a center of a core 111$a$1, which is closest to the marker 111$c$ in the end surface of the first multi-core fiber 111, and a center of a core 111$a$2, which is second closest to the marker 111$c$ in the end surface of the first multi-core fiber 111, or with (ii) an imaginary straight line connecting a center of a core 112$a$1, which is closest to the marker 112$c$ in the end surface of the second multi-core fiber 112, and a center of a core 112$a$2, which is second closest to the marker 112$c$ in the end surface of the second multi-core fiber 112.

In this case, similarly to the above-described effect, it is easier (i) to discriminate the end surface of the first multi-core fiber 111 and the end surface of the second multi-core fiber 112 from each other or (ii) to identify a core number of the first multi-core fiber 111 or a core number of the second multi-core fiber 112. This can facilitate connection of (i) the first multi-core fiber 111 or the second multi-core fiber 112 to (ii) external transceivers or external fan-in/fan-out devices. Furthermore, as compared to a configuration in which the imaginary straight line connecting the two markers 111$c$ and 112$c$ is not in parallel with the imaginary straight line connecting the centers of the cores, at least one of the two markers 111$c$ and 112$c$ can be more separated from the outer circumference(s) of the cladding 111$b$ and/or 112$b$. This can bring about the effect of reducing (i) an increase in thickness of the cladding 111$b$, 112$b$ or (ii) a deformation of the cladding 111$b$, 112$b$ that may occur in production and/or the like.

Note that, as shown in, e.g., FIG. 1, the above-described multi-core fiber connected body 101 may be configured to satisfy the following condition δ1 or δ2.

Condition δ1: The whole of the marker 112$c$ in the second multi-core fiber 112 is connected to a part (e.g., the cladding 111$b$) of the first multi-core fiber 111 which part is not the marker 111$c$.

Condition δ2: The whole of the marker 111$c$ in the first multi-core fiber 111 is connected to a part (e.g., the cladding 111$b$) of the second multi-core fiber 112 which part is not the marker 112$c$.

As compared to connecting the marker 111$c$, which has a relatively small area, to the marker 112$c$, which has a relatively small area, or connecting the marker 111$c$ to the marker 112$c$ and the cladding 112$b$ so as to lie across the marker 112$c$ and the cladding 112$b$, connecting the marker 111$c$ only to the cladding 111$b$, which has a relatively large area, can more reduce (relieve) a stress applied to the marker 111$c$. This can reduce damage on the marker 111$c$. This is also true for the marker 112$c$.

As shown in (b) or (c) of FIG. 7, the above-described multi-core fiber connected body 101 may be configured to satisfy the following condition ε1 or ε2.

Condition ε1: In the end surface of the first multi-core fiber 111, the center of the marker 111*c* is positioned in an area (hereinafter, also referred to as an "area B") surrounded by (1) an imaginary circumscribed circle that is circumscribed on, among the cores 111*a*1 to 111*a*4 in the first multi-core fiber 111, the core 111*a*1 closest to the marker 111*c* and the core 111*a*2 second closest to the marker 111*c* and that has a center at the center of the cladding 111*b* in the first multi-core fiber 111, (2) an imaginary bisector of an angle made by an imaginary straight line passing through the center of the core 111*a*1 closest to the marker 111*c* and the center of the core 111*a*2 second closest to the marker 111*c* and an imaginary straight line passing through the center of the core 111*a*1 and the center of the cladding 111*b*, and (3) an imaginary bisector of an angle made by an imaginary straight line passing through the center of the core 111*a*1 and the center of the core 111*a*2 and an imaginary straight line connecting the center of the core 111*a*2 and the center of the cladding 111*b*.

Condition ε2: In the end surface of the second multi-core fiber 112, the center of the marker 112*c* is positioned in an area (hereinafter, also referred to as an "area C") surrounded by (1) an imaginary circumscribed circle that is circumscribed on, among the cores 112*a*1 to 112*a*4 in the second multi-core fiber 112, the core 112*a*1 closest to the marker 112*c* and the core 112*a*2 second closest to the marker 112*c* and that has a center at the center of the cladding 112*b* in the second multi-core fiber 112, (2) an imaginary bisector of an angle made by an imaginary straight line passing through the center of the core 112*a*1 closest to the marker 112*c* and the center of the core 112*a*2 second closest to the marker 112*c* and an imaginary straight line passing through the center of the core 112*a*1 and the center of the cladding 112*b*, and (3) an imaginary bisector of an angle made by an imaginary straight line passing through the center of the core 112*a*1 and the center of the core 112*a*2 and an imaginary straight line connecting the center of the core 112*a*2 and the center of the cladding 112*b*.

In this case, the first multi-core fiber 111 can bring about both the former effect and the latter effect discussed above. Particularly, as compared to a configuration satisfying the later-described condition ζ1 or ζ2, the marker 111*c* is disposed at a location more separated from the outer circumference of the cladding 111*b*. This makes it possible to reduce (i) an increase in thickness of the cladding 111*b*, 112*b* or (ii) a deformation of the cladding 111*b* that may occur in production and/or the like. This can further increase, particularly, the latter effect. This is also true for the second multi-core fiber 112.

The above-described multi-core fiber connected body 101 may be configured to satisfy the following condition ζ1 or ζ2.

Condition ζ1: In the end surface of the first multi-core fiber 111, the center of the marker 111*c* is positioned in an area (hereinafter, also referred to as an "area D") surrounded by (1) an imaginary circumscribed circle that is circumscribed on, among the cores 111*a*1 to 111*a*4 in the first multi-core fiber 111, the core 111*a*1 closest to the marker 111*c* and the core 111*a*2 second closest to the marker 111*c* and that has a center at the center of the cladding 111*b* in the first multi-core fiber 111, (2) an imaginary bisector of an angle made by an imaginary straight line passing through the center of the core 111*a*1 closest to the marker 111*c* and the center of the core 111*a*2 second closest to the marker 111*c* and an imaginary straight line passing the center of the core 111*a*1 and the center of the cladding 111*b*, (3) an imaginary bisector of an angle made by an imaginary straight line passing through the center of the core 111*a*1 and the center of the core 111*a*2 and an imaginary straight line connecting the center of the core 111*a*2 and the center of the cladding 111*b*, and (4) the outer circumference of the cladding.

Condition ζ2: In the end surface of the second multi-core fiber 112, the center of the marker 112*c* is positioned in an area (hereinafter, also referred to as an "area E") surrounded by (1) an imaginary circumscribed circle that is circumscribed on, among the cores 112*a*1 to 112*a*4 in the second multi-core fiber 112, the core 112*a*1 closest to the marker 112*c* and the core 112*a*2 second closest to the marker 112*c* and that has a center at the center of the cladding 112*b* of the second multi-core fiber 112, (2) an imaginary bisector of an angle made by an imaginary straight line passing through the center of the core 112*a*1 closest to the marker 112*c* and the center of the core 112*a*2 second closest to the marker 112*c* and an imaginary straight line passing through the center of the core 112*a*1 and the center of the cladding 112*b*, (3) an imaginary bisector of an angle made by an imaginary straight line passing through the center of the core 112*a*1 and the center of the core 112*a*2 and an imaginary straight line connecting the center of the core 112*a*2 and the center of the cladding 112*b*, and (4) the outer circumference of the cladding.

In this case, the first multi-core fiber 111 can bring about both the former effect and the latter effect discussed above. Particularly, as compared to a configuration satisfying the condition ε1 or ε2, the marker 111*c* is disposed at a location more separated from the core 111*a*1 or 111*a*2. This makes it possible to reduce a deformation of the core 111*a*1 or 111*a*2. This can further increase, particularly, the former effect. This is also true for the second multi-core fiber 112.

With regard to the condition ε1, ε2, ζ1, or ζ2, any of the following configurations can be employed for the end surface of the first multi-core fiber 111: a configuration (hereinafter, also referred to as a "configuration 1") in which at least a part of the marker 111*c* is disposed in the area B or D; a configuration (hereinafter, also referred to as a "configuration 2") in which the whole of the marker 111*c* is disposed in the area B or D; and a configuration (hereinafter, also referred to as a "configuration 3") in which at least a part of the marker 111*c* is disposed so as to lie across a boundary between the areas B and D. With any of the configurations 1 to 3, it is possible to attain the former and latter effects. However, a configuration 2 in which the whole of the marker 111*c* is disposed in the area B can increase, particularly, the latter effect. This is because that, in such a configuration 2, the marker 111*c* is disposed more separated from the outer circumference of the cladding 111*c*, as compared to a configuration 2 in which the whole of the marker 111*c* is disposed in the area D or the configuration 3. Meanwhile, the configuration 2 in which the whole of the marker 111*c* is disposed in the area D can increase, particularly, the former effect. This is because that, in such a configuration 2, the marker 111*c* is disposed at a location more separated from the core 111*a*1 or 111*a*2, as compared to the configuration 2 in which the whole of the marker 111*c* is disposed in the area B or the configuration 3. Meanwhile, the configuration 3 can bring about the former and latter effects in a balanced manner. This is because that, in the configuration 3, the marker 111*c* is disposed at a location more separated from the outer circumference of the cladding 111*b* and the core 111*a*1 or 111*a*2, as compared to the configuration 2. Similarly, any of the following configurations can be employed for the end surface of the second multi-core fiber 112: a configuration in which at least a part of the marker 112*c* is disposed in the area C or E; a configuration in which the whole of the marker 112*c* is disposed in the area C or E; or a configuration in which at least a part of the marker 112*c* is disposed so as to lie across a boundary between the areas C and E. The effects obtained in these configurations are similar to those for the first multi-core fiber 111.

Supplementary Remarks 1

The first aspect of one or more embodiments is not limited to any of the above-described embodiments and variations, but can be altered by a skilled person in the art within the scope of the specification. The first aspect of one or more embodiments also encompasses, in its technical scope, any embodiment derived by combining technical means disclosed in differing embodiments and variations.

For example, the number of the cores in the multi-core fibers constituting the fiber connected body is not limited to 4. The number of the cores but may be selected arbitrarily, provided that it can provide the effects. For example, the number of the cores in the multi-core fibers constituting the fiber connected body may be 5, 6, 7, 8, or 9.

Example 2 employs the configuration in which (i) the number of the cores in the first multi-core fiber is equal to the number of the cores in the second multi-core fiber, (ii) each of the cores in the first multi-core fiber is connected to any one of the cores in the second multi-core fiber, and (iii) the cores in the second multi-core fiber are connected to the cores in the first multi-core fiber. However, this is not limitative. For example, in a case where the number of the cores in the first multi-core fiber is greater than the number of the cores in the second multi-core fiber, each of the cores in the second multi-core fiber may be connected to any one of the cores in the first multi-core fiber. For another example, in a case where the number of the cores in the second multi-core fiber is greater than the number of the cores in the first multi-core fiber, each of the cores in the first multi-core fiber may be connected to any one of the cores in the second multi-core fiber.

The number of the markers in the multi-core fibers constituting the fiber connected body is not limited to 1. The number of the markers may be selected arbitrarily, provided that it can provide the effects. For example, the number of the markers in the multi-core fibers constituting the fiber connected body may be 2, 3, 4, 5, or 6. In a case where the number of the markers is two or more, at least one of the markers in the second multi-core fiber may be connected to a part of the first multi-core fiber which part is not the markers of the first multi-core fiber or at least one of the markers in the first multi-core fiber may be connected to a part of the second multi-core fiber which part is not the markers of the second multi-core fiber.

The configuration in which the marker in the second multi-core fiber is connected to a part of the first multi-core fiber which part is not the marker in the first multi-core fiber also encompasses a configuration in which a part of the marker in the second multi-core fiber is connected to a part of the first multi-core fiber which part is not the marker in the first multi-core fiber (except for a configuration in which the marker in the second multi-core fiber is larger than the marker in the first multi-core fiber and the marker in the second multi-core fiber truly covers the marker in the first multi-core fiber). Similarly, the configuration in which the marker in the first multi-core fiber is connected to a part of the second multi-core fiber which part is not the marker in the second multi-core fiber also encompasses a configuration in which a part of the marker in the first multi-core fiber is connected to a part of the second multi-core fiber which part is not the marker in the second multi-core fiber (except for a configuration in which the marker in the first multi-core fiber is larger than the marker in the second multi-core fiber and the marker in the first multi-core fiber truly covers the marker in the second multi-core fiber).

The cross-sectional shape of each of the markers in the multi-core fibers constituting the fiber connected body is not limited to a circle, but may be selected arbitrarily. For example, the cross-sectional shape of each of the markers in the multi-core fibers constituting the fiber connected body may be a triangular shape, a quadrangular shape, a pentagonal shape, or a hexagonal shape.

The material of each of the markers in the multi-core fibers constituting the fiber connected body is not limited to silica glass, but may be selected arbitrarily. For example, each of the markers in the multi-core fibers constituting the fiber connected body may be a void. In this case, a refractive index of each marker (i.e., a refractive index of the air) is lower than a refractive index of silica glass doped with fluorine. Therefore, in this case, it is possible to more effectively reduce crosstalk.

A method for connecting the multi-core fibers constituting the fiber connected body is not limited to fusion-splicing, but may be selected arbitrarily. For example, the method for connecting the multi-core fibers constituting the fiber connected body may be connection via a connector or connection via an adhesive.

Second Aspect

Example of Second Aspect

Fiber Connected Body

The following description will discuss, with reference to the drawings, a fiber connected body in accordance with one or more embodiments. The fiber connected body in accordance with one or more embodiments is obtained by connecting a plurality of multi-core fibers. The following description will deal with the multi-core fibers and two modes of a connected part of the multi-core fibers and then the multi-core fiber in accordance with one or more embodiments.

(Multi-Core Fiber)

Figure 9:
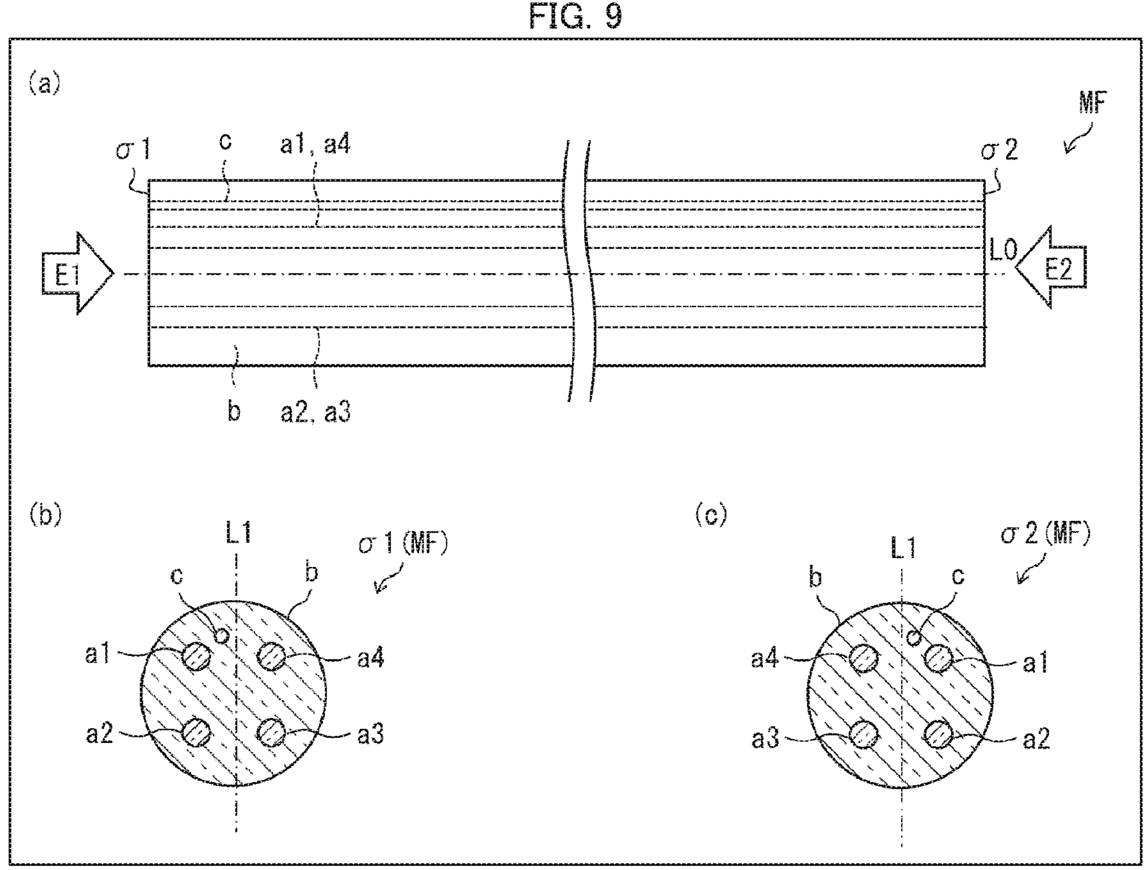
FIG. 9 illustrates a multi-core fiber included in a fiber connected body in accordance with one or more embodiments.

A multi-core fiber MF will be explained with reference to FIG. 9. In FIG. 9, (a) is a side view of the multi-core fiber MF, (b) is a front view of one end surface σ1 of the multi-core fiber MF viewed in a direction of a sight line E1, and (c) is a front view of the other end surface σ2 of the multi-core fiber MF viewed in a direction of a sight line E2.

The multi-core fiber MF includes n (n is a natural number of not less than two) cores a1 to an and a cladding b. The cladding b is a cylindrical member. The cladding b is made of silica glass, for example. Each core ai (i is a natural number of not less than one and not more than n) is a cylindrical-shape area that resides inside the cladding b, that has a higher refractive index than that of the cladding b, and that extends in a direction in which the cladding b extends. Each core ai is made of, for example, silica glass doped with an updopant such as germanium. The cladding b only needs to be a columnar shape, and may have any cross-sectional shape. The cross-sectional shape of the cladding b may be a polygonal shape such as a quadrangular shape or a hexagonal shape or may be a barrel shape. The cross-sectional shape of the cladding b is not limited to any particular one. Preferably, the cladding b has a symmetric cross-sectional shape with respect to the later-described axis L1. The cladding b having a symmetric cross-sectional shape is preferable for the following reason. That is, at the time of fusion-splicing of two multi-core fibers, the claddings of the two multi-core fibers MF facing each other are substantially identical, which can reduce a deformation in the cladding(s) even while the multi-core fibers MF are melted.

In each of the end surfaces σ1 and σ2, the cores a1 to an are arranged so as to be axisymmetric to each other with respect to the axis L1, which is orthogonal to a central axis L0 of the multi-core fiber MF. Further, in each of the end surfaces σ1 and σ2, the cores a1 to an are arranged so as to avoid the axis L1. In other words, in each of the end surfaces σ1 and σ2, the cores a1 to an are arranged at a location that does not overlap the axis L1.

The multi-core fiber MF further includes a marker c. The marker c is an area that resides inside the cladding b, that has a different refractive index from that of the cladding b, and that extends in a direction in which the cladding b extends. The cross-sectional shape of the marker c may be any shape. For example, the cross-sectional shape of the marker c may be a circular shape, a triangular shape, or a quadrangular shape. The marker c is made of, for example, silica glass doped with a downdopant such as fluorine or boron. In this case, the marker c has a refractive index lower than that of the cladding b. Alternatively, the marker c is made of silica glass doped with an updopant such as germanium, aluminum, phosphorus, or chlorine. In this case, the marker c has a refractive index higher than that of the cladding b. The marker c may be formed by, for example, a drilling process or a stack-and-draw process.

In each of the end surfaces σ1 and σ2, a center of the marker c is positioned so as to avoid the axis L1. In other words, in each of the end surfaces σ1 and σ2, the center (geometric center) of the marker c is positioned at a location that does not overlap the axis L1. Note that the position of the marker c only needs to be defined so that the center of the marker c can avoid the axis L1. The marker c may partially overlap the axis L1.

(Variation of Cross-Sectional Structure)

Figure 10:
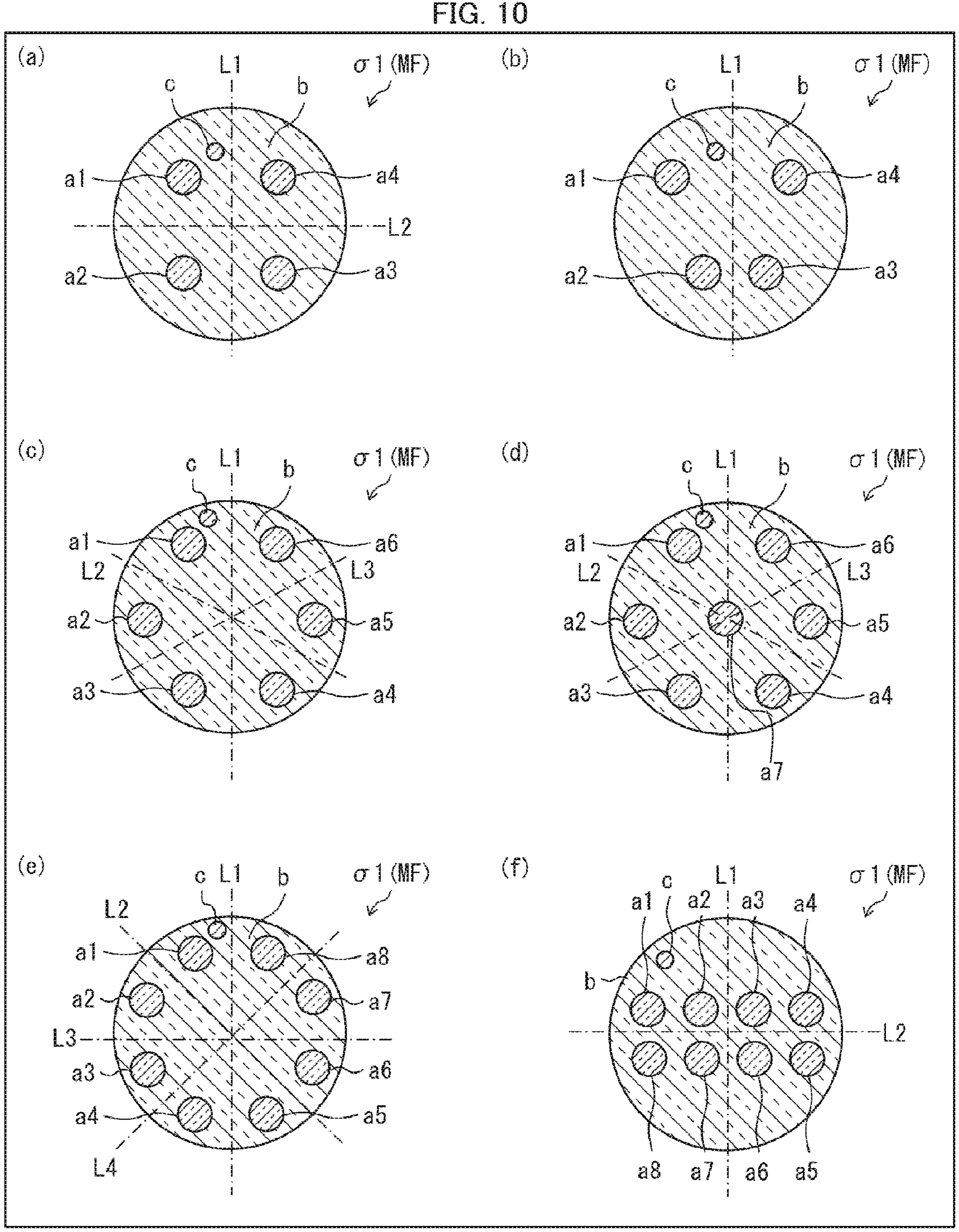
FIG. 10 shows variations of a cross-sectional structure of the multi-core fiber shown in FIG. 9.

The following description will discuss, with reference to FIG. 10, variations of the cross-sectional structure of the multi-core fiber MF.

(a) of FIG. 10 is a front view of an end surface σ1 of a multi-core fiber MF in accordance with a first specific example (a specific example shown in FIG. 9). The multi-core fiber MF in accordance with this specific example includes four cores a1 to a4 respectively disposed at the apexes of a square. It can be said that these four cores a1 to a4 are arranged (1) so as to be axisymmetric to each other with respect to the above-described axis L1 or (2) so as to be axisymmetric to each other with respect to an axis L2. Here, the axis L2 is an axis orthogonal to the axis L1 in the end surface σ1 of the multi-core fiber MF. These four cores a1 to a4 are arranged so as to avoid the axes L1 and L2. In other words, the cores a1 to a4 are disposed at locations that do not overlap the axis L1 or L2. If a configuration in which the cores a1 to a4 are arranged on the symmetry axes is allowed, there would exist two more axes (not illustrated) making an angle of 45° with respect to the axes L1 and L2.

(b) of FIG. 10 is a front view of an end surface σ1 of a multi-core fiber MF in accordance with a second specific example. The multi-core fiber MF in accordance with this specific example includes four cores a1 to a4 respectively disposed at the apexes of an isosceles trapezoid. It can be said that these four cores a1 to a4 are arranged so as to be axisymmetric to each other with respect to an axis L1. Here, the axis L1 is an axis orthogonal to a central axis of the multi-core fiber MF. These four cores a1 to a4 are arranged so as to avoid the axis L1. In other words, the cores a1 to a4 are disposed at locations that do not overlap the axis L1.

(c) of FIG. 10 is a front view of an end surface σ1 of a multi-core fiber MF in accordance with a third specific example. The multi-core fiber MF in accordance with this specific example includes six cores a1 to a6 respectively disposed at the apexes of a regular hexagon. It can be said that these six cores a1 to a6 are arranged (1) so as to be axisymmetric to each other with respect to an axis L1, (2) so as to be axisymmetric to each other with respect to an axis L2, or (3) so as to be axisymmetric to each other with respect to an axis L3. Here, the axis L1 is an axis orthogonal to a central axis of the multi-core fiber MF. The axis L2 is an axis that makes an angle of 60° with respect to the axis L1 in the end surface σ1 of the multi-core fiber MF. The axis L3 is an axis that makes an angle of 60° with respect to each of the axes L1 and L2 in the end surface σ1 of the multi-core fiber MF. These six cores a1 to a6 are arranged so as to avoid the axes L1, L2, and L3. In other words, the cores a1 to a6 are disposed at locations that do not overlap the axis L1, L2, or L3. If a configuration in which the cores a1 to a6 are arranged on the symmetry axes is allowed, there would exist three more axes (not illustrated) making an angle of 30° with respect to the axes L1, L2, and L3.

(d) of FIG. 10 is a front view of an end surface σ1 of a multi-core fiber MF in accordance with a fourth specific example. The multi-core fiber MF in accordance with this specific example includes six cores a1 to a6 respectively disposed at the apexes of a regular hexagon and one core a7 disposed at a center of the regular hexagon. It can be said that these seven cores a1 to a7 are arranged (1) so as to be axisymmetric to each other with respect to an axis L1, (2) so as to be axisymmetric to each other with respect to an axis L2, or (3) so as to be axisymmetric to each other with respect to an axis L3. Here, the axis L1 is an axis orthogonal to a central axis of the multi-core fiber MF. The axis L2 is an axis that makes an angle of 60° with respect to the axis L1 in the end surface σ1 of the multi-core fiber MF. The axis L3 is an axis that makes an angle of 60° with respect to the axes L1 and L2 in the end surface σ1 of the multi-core fiber MF. Among these seven cores a1 to a7, the six cores a1 to a6 respectively disposed at the apexes of the regular hexagon are arranged so as to avoid the axes L1, L2, and L3. In other words, the cores a1 to a6 are disposed at locations that do not overlap the axis L1, L2, or L3. As will be described later, these cores a1 to a6 are suitable for use in input or output of an optical signal. The single core a7 disposed at the center of the regular hexagon is disposed on the axes L1, L2, and L3. The core a7 may be used for input or output of an optical signal, or may be used as a dummy core which is not used for input or output. Needless to say, if the core a7 is used for input of an optical signal in one end surface 211 of the later-described fiber connected body 201, the core a7 would be used for output of an optical signal in the other end surface 212. Meanwhile, if the core a7 is used for output of an optical signal in the one end surface 211 of the later-described fiber connected body 201, the core a7 would be used for input of an optical signal in the other end surface 212. If a configuration in which the cores a1 to a6 are arranged on the symmetry axes is allowed, there would exist three more axes (not illustrated) making an angle of 30° with respect to the axes L1, L2, and L3.

(e) of FIG. 10 is a front view of an end surface σ1 of a multi-core fiber MF in accordance with a fifth specific example. The multi-core fiber MF in accordance with this specific example includes eight cores a1 to a8 respectively disposed at the apexes of a regular octagon. It can be said that these eight cores a1 to a8 are arranged (1) so as to be axisymmetric to each other with respect to an axis L1, (2) so as to be axisymmetric to each other with respect to an axis L2, (3) so as to be axisymmetric to each other with respect to an axis L3, or (4) so as to be axisymmetric to each other with respect to an axis L4. Here, the axis L1 is an axis orthogonal to a central axis of the multi-core fiber MF. The axis L2 is an axis that makes an angle of 45° with respect to the axis L1 in the end surface σ1 of the multi-core fiber MF. The axis L3 is an axis that makes an angle of 45° with respect to the axis L2 in the end surface σ1 of the multi-core fiber MF. The axis L4 is an axis that makes an angle of 45° with respect to the axes L3 and L1 in the end surface σ1 of the multi-core fiber MF. These eight cores a1 to a8 are arranged so as to avoid the axes L1, L2, L3, and L4. In other words, the cores a1 to a8 are disposed at locations that do not overlap the axis L1, L2, L3, or L4. If a configuration in which the cores a1 to a8 are arranged on the symmetry axes is allowed, there would exist four more axes (not illustrated) making an angle of 22.5° with respect to the axes L1, L2, L3, and L4.

(f) of FIG. 10 is a front view of an end surface σ1 of a multi-core fiber MF in accordance with a sixth specific example. The multi-core fiber MF in accordance with this specific example includes eight cores a1 to a8 arranged in a matrix of two rows and four columns. It can be said that these eight cores a1 to a8 are arranged (1) so as to be axisymmetric to each other with respect to an axis L1 or (2) so as to be axisymmetric to each other with respect to an axis L2. Here, the axis L1 is an axis that is orthogonal to a central axis of the multi-core fiber MF and that is in parallel with a direction of the columns of the cores a1 to a8, whereas the axis L2 is an axis that is orthogonal to the central axis of the multi-core fiber MF and that is in parallel with a direction of the rows of the cores a1 to a8. These eight cores a1 to a8 are arranged so as to avoid the axes L1 and L2. In other words, the cores a1 to a8 are disposed at locations that do not overlap the axis L1 or L2.

(Connected Part of Multi-Core Fibers)

Figure 11:
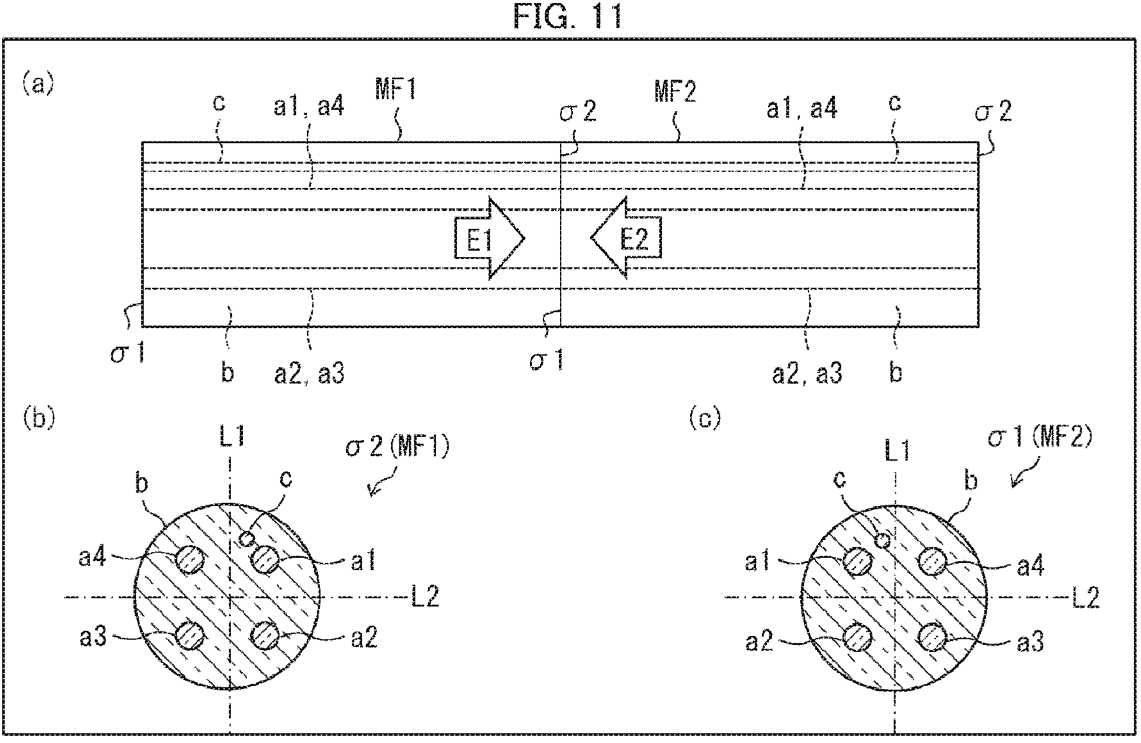
FIG. 11 shows two multi-core fibers connected via normal connection.
Figure 12:
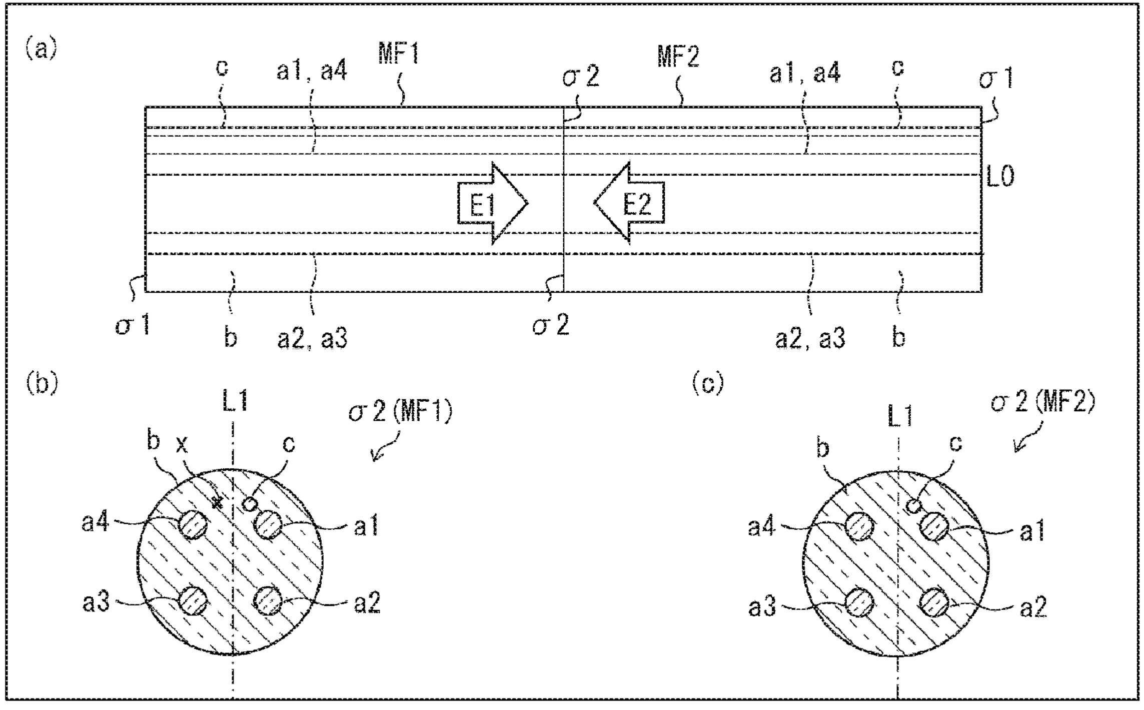
FIG. 12 shows two multi-core fibers connected via inverted connection.
Figure 13:
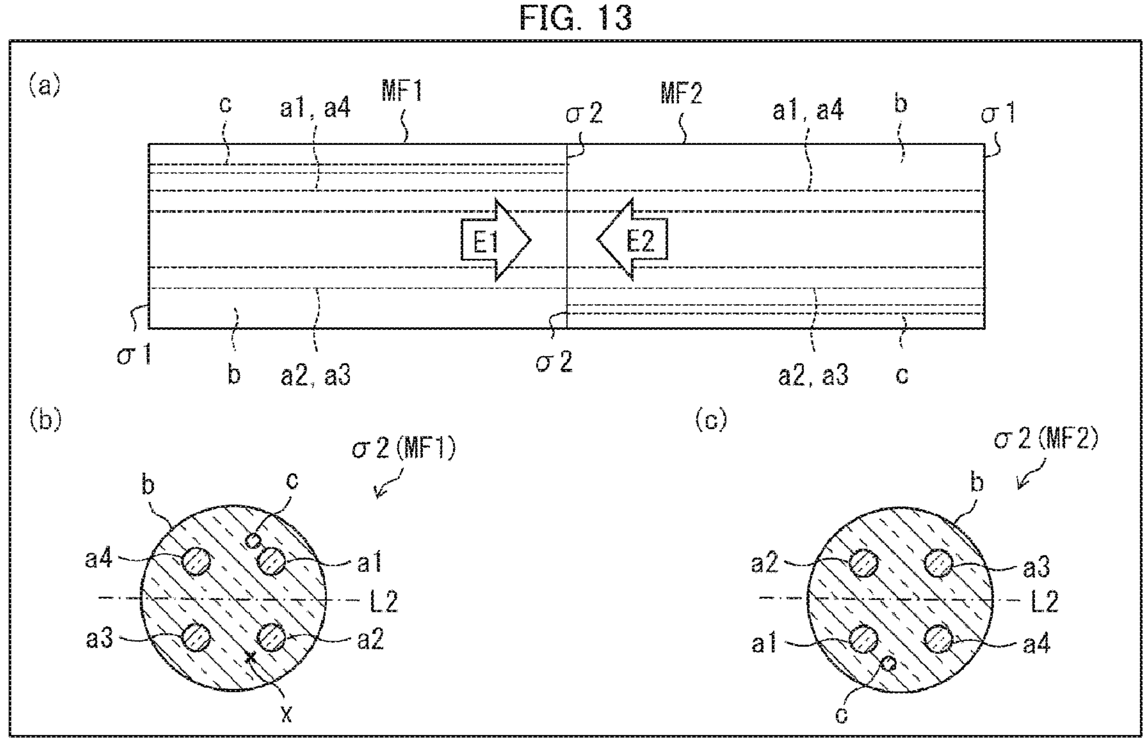
FIG. 13 shows two multi-core fibers connected via inverted connection.

The following description with discuss, with reference to FIGS. 11 to 13, a connected part of two multi-core fibers MF. In the following description, one of the two multi-core fibers MF connected to each other will be referred to as a multi-core fiber MF1, and the other will be referred to as a multi-core fiber MF2. The multi-core fibers MF1 and MF2 have the same cross-sectional structures. The multi-core fibers MF1 and MF2 may be connected with each other via fusion-splicing, via a connector, or via an adhesive.

The connected part of the multi-core fibers MF1 and MF2 is either normal connection or inverted connection.

FIG. 11 is a view illustrating a connected part of normal connection. In FIG. 11, (a) is a side view of the multi-core fibers MF1 and MF2, (b) is a front view of an end surface σ2 of the multi-core fiber MF1 viewed in a direction of a sight line E2, and (c) is a front view of an end surface σ1 of the multi-core fiber MF2 viewed in a direction of a sight line E1. The connected part of the normal connection is (i) a connected part in which the end surface σ2 of the multi-core fiber MF1 and the end surface σ1 of the multi-core fiber MF2 are connected to each other or (ii) a connected part in which an end surface σ1 of the multi-core fiber MF1 and an end surface σ2 of the multi-core fiber MF2 are connected to each other (FIG. 1 shows the former). The connected part of the normal connection satisfies the following conditions.

Condition 1: Cores a1 to an in the end surface σ1 of the multi-core fiber MF2 overlap cores a1 to an in the end surface σ2 of the multi-core fiber MF1. Specifically, (1) the core a1 in the end surface σ1 of the multi-core fiber MF2 overlaps the core a1 in the end surface σ2 of the multi-core fiber MF1, (2) the core a2 in the end surface σ1 of the multi-core fiber MF2 overlaps the core a2 in the end surface σ2 of the multi-core fiber MF1, (3) the core a3 in the end surface σ1 of the multi-core fiber MF2 overlaps the core a3 in the end surface σ2 of the multi-core fiber MF1, and (4) the core a4 in the end surface σ1 of the multi-core fiber MF2 overlaps the core a4 in the end surface σ2 of the multi-core fiber MF1.

Condition 2a: A marker c in the end surface σ1 of the multi-core fiber MF2 overlaps a marker c in the end surface σ2 of the multi-core fiber MF1.

In short, the normal connection is a connection mode in which (i) the cores a1 to an are optically coupled and (ii) the markers c are connected to each other.

FIG. 12 is a view illustrating a connected part of inverted connection. In FIG. 12, (a) is a side view of the multi-core fibers MF1 and MF2, (b) is a front view of an end surface σ2 of the multi-core fiber MF1 viewed in a direction of a sight line E2, and (c) is a front view of an end surface σ2 of the multi-core fiber MF2 viewed in a direction of a sight line E1. The connected part of the inverted connection is (i) a connected part in which the end surface σ2 of the multi-core fiber MF1 and the end surface σ2 of the multi-core fiber MF2 are connected to each other or (ii) a connected part in which the end surface σ1 of the multi-core fiber MF1 and the end surface σ1 of the multi-core fiber MF2 are connected to each other (FIG. 12 shows the former). The connected part of the inverted connection satisfies the following conditions.

Condition 1: Cores a1 to an in the end surface σ2 of the multi-core fiber MF2 respectively overlap cores a1 to an in the end surface σ2 of the multi-core fiber MF1. Specifically, (1) the core a1 in the end surface σ2 of the multi-core fiber MF2 overlaps the core a4 in the end surface σ2 of the multi-core fiber MF1, (2) the core a2 in the end surface σ2 of the multi-core fiber MF2 overlaps the core a3 in the end surface σ2 of the multi-core fiber MF1, (3) the core a3 in the end surface σ2 of the multi-core fiber MF2 overlaps the core a2 in the end surface σ2 of the multi-core fiber MF1, and (4) the core a4 in the end surface σ2 of the multi-core fiber MF2 overlaps the core a1 in the end surface σ2 of the multi-core fiber MF1.

Condition 2b: A marker c in the end surface σ2 of the multi-core fiber MF2 overlaps a position x, which is axisymmetric to a marker c in the multi-core fiber MF1 with respect to an axis L1 in the end surface σ2 of the multi-core fiber MF1.

In short, the inverted connection is a connection mode in which (i) the cores a1 to an are optically coupled to the cores a1 to an and (ii) the markers c are not connected to each other.

Note that the inverted connection is defined for each axis with respect to which the cores a1 to an are axisymmetric to each other. For example, in each of the multi-core fibers MF1 and MF2 having the cross-sectional structure shown in (a) of FIG. 10, the cores a1 to a4 are axisymmetric to each other with respect to the axis L1, and are also axisymmetric to each other with respect to the axis L2. Thus, the multi-core fibers MF1 and MF2 can be connected via the inverted connection with respect to the axis L1 shown in FIG. 12 or via the inverted connection with respect to the axis L2 shown in FIG. 13.

FIG. 13 is a view illustrating a connected part of inverted connection. In FIG. 13, (a) is a side view of the multi-core fibers MF1 and MF2, (b) is a front view of an end surface σ2 of the multi-core fiber MF1 viewed in the direction of the sight line E2, and (c) is a front view of an end surface σ2 of the multi-core fiber MF2 viewed in the direction of the sight line E1. The connected part of the inverted connection is (i) a connected part in which the end surface σ2 of the multi-core fiber MF1 and the end surface σ2 of the multi-core fiber MF2 are connected to each other or (ii) a connected part in which the end surface σ1 of the multi-core fiber MF1 and the end surface σ1 of the multi-core fiber MF2 are connected to each other (FIG. 13 shows the former). The connected part of the inverted connection satisfies the following conditions.

Condition 1: Cores a1 to an in the end surface σ1 of the multi-core fiber MF2 overlap cores a1 to an in the end surface σ2 of the multi-core fiber MF1. Specifically, (1) the core a1 in the end surface σ2 of the multi-core fiber MF2 overlaps the core a2 in the end surface σ2 of the multi-core fiber MF1, (2) the core a2 in the end surface σ2 of the multi-core fiber MF2 overlaps the core a1 in the end surface σ2 of the multi-core fiber MF1, (3) the core a3 in the end surface σ2 of the multi-core fiber MF2 overlaps the core a4 in the end surface σ2 of the multi-core fiber MF1, and (4) the core a4 in the end surface σ2 of the multi-core fiber MF2 overlaps the core a3 in the end surface σ2 of the multi-core fiber MF1.

Condition 2b: A marker c in the end surface σ2 of the multi-core fiber MF2 overlaps a position x, which is axisymmetric to a marker c in the multi-core fiber MF1 with respect to an axis L2 in the end surface σ2 of the multi-core fiber MF1.

(Fiber Connected Body)

Figure 14:
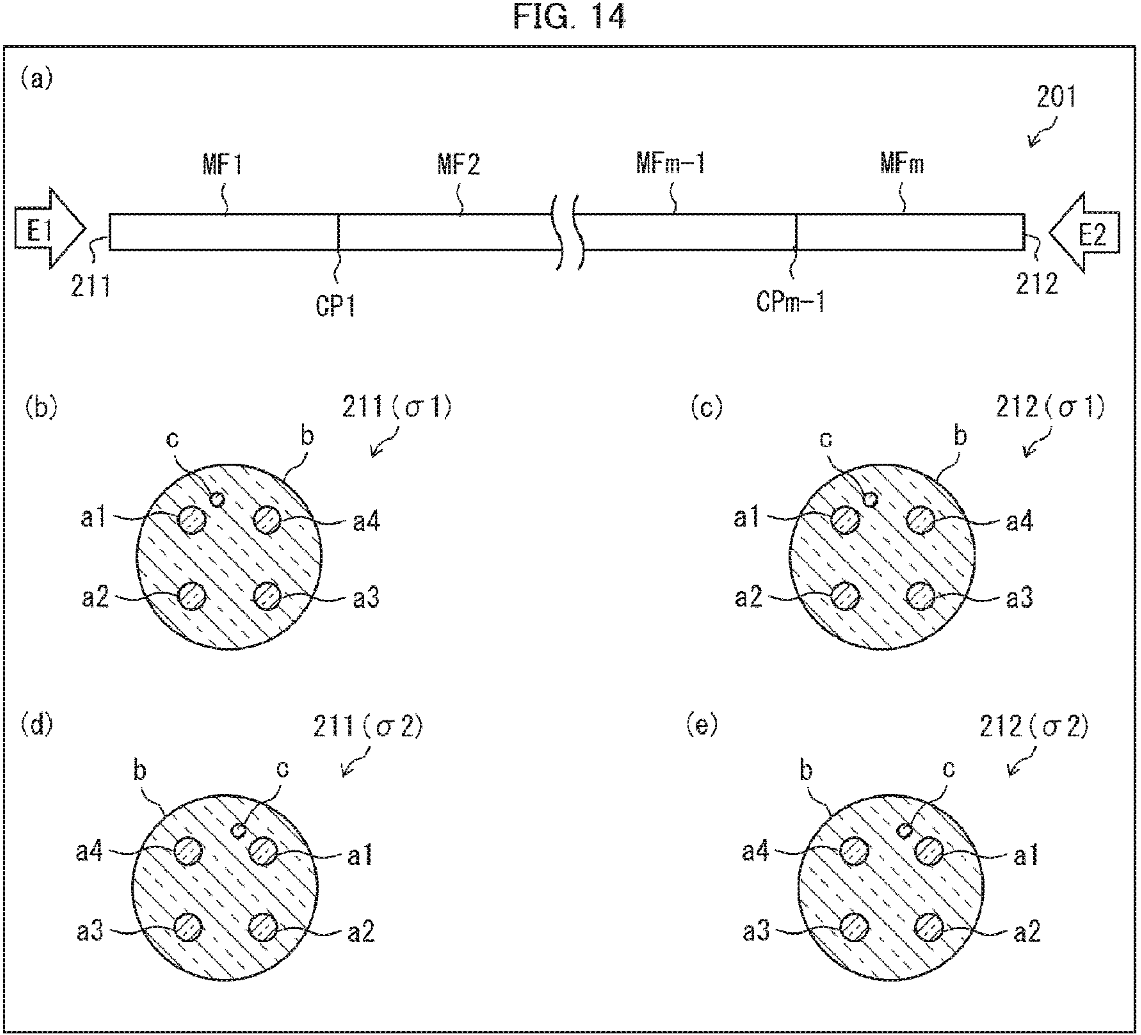
FIG. 14 shows a fiber connected body in accordance with one or more embodiments.

The following description will discuss, with reference to FIG. 14, the fiber connected body 201 in accordance with Example 2.

(a) of FIG. 14 is a side view of the fiber connected body 201 in accordance with Example 2. The fiber connected body 201 is a fiber connected body obtained by connecting m (m is a natural number of not less than two) multi-core fibers MF to each other. Hereinafter, the multi-core fibers MF constituting the fiber connected body 201 may also be referred to as a multi-core fiber MF1, a multi-core fiber MF2, . . . a multi-core fiber MFm. The multi-core fibers MF1 and MFm have the same cross-sectional structure. The multi-core fibers MF1 to MFm may be connected with each other via fusion-splicing, via a connector, or via an adhesive.

The fiber connected body 201 is constituted by m multi-core fibers MF1 to MFm. Thus, the fiber connected body 201 includes m−1 connected parts CP1 to CPm−1. The connected part CPi (i is a natural number not less than one and not more than m−1) is a connected part achieved by connecting a multi-core fiber MFi to a multi-core fiber MFi+1. The fiber connected body 201 is characterized in that, among the m−1 connected parts CP1 to CPm−1, an odd number of connected parts are of inverted connection with respect to a certain axis. In Example 2, all of the other connected parts are of normal connection. Note that the other connected parts may include an even number of connected parts of inverted connection with respect to certain another axis.

With this feature, both end surfaces 211 and 212 of the fiber connected body 201 serve as the end surfaces σ1 of the multi-core fibers MF or as the end surfaces σ2 of the multi-core fibers MF.

(b) and (c) of FIG. 14 each relate to a case where both the end surfaces 211 and 212 of the fiber connected body 201 serve as the end surfaces σ1 of the multi-core fibers MF. (b) of FIG. 14 is a front view of the one end surface 211 of the fiber connected body 201 viewed in a direction of a sight line E1, and (c) of FIG. 14 is a front view of the other end surface 212 of the fiber connected body 201 viewed in a direction of a sight line E2.

In this case, (1) a core a1 of a preceding multi-core fiber (e.g., the multi-core fiber MF1) is optically coupled to a core a4 of a following multi-core fiber (e.g., the multi-core fiber MF2), (2) a core a2 of the preceding multi-core fiber (e.g., the multi-core fiber MF1) is optically coupled to a core a3 of the following multi-core fiber (e.g., the multi-core fiber MF2), (3) the core a3 of the preceding multi-core fiber (e.g., the multi-core fiber MF1) is optically coupled to the core a2 of the following multi-core fiber (e.g., the multi-core fiber MF2), and (4) the core a4 of the preceding multi-core fiber (e.g., the multi-core fiber MF1) is optically coupled to the core a1 of the following multi-core fiber (e.g., the multi-core fiber MF2).

(d) and (e) of FIG. 14 relate to a case where both the end surfaces 211 and 212 of the fiber connected body 201 serve as the end surfaces σ2 of the multi-core fiber MF. (d) of FIG. 14 is a front view of the one end surface 211 of the fiber connected body 201 viewed in the direction of the sight line E1, and (e) of FIG. 14 is a front view of the other end surface 212 of the fiber connected body 201 viewed in the direction of the sight line E2.

In this case, (1) the core a1 in the multi-core fiber MF1 is optically coupled to a core a4 in a multi-core fiber MFm, (2) the core a2 in the multi-core fiber MF1 is optically coupled to a core a3 in the multi-core fiber MFm, (3) the core a3 in the multi-core fiber MF1 is optically coupled to a core a2 in the multi-core fiber MFm, and (4) the core a4 in the multi-core fiber MF1 is optically coupled to a core a1 in the multi-core fiber MFm.

(Effects of Fiber Connected Body)

Figure 15:
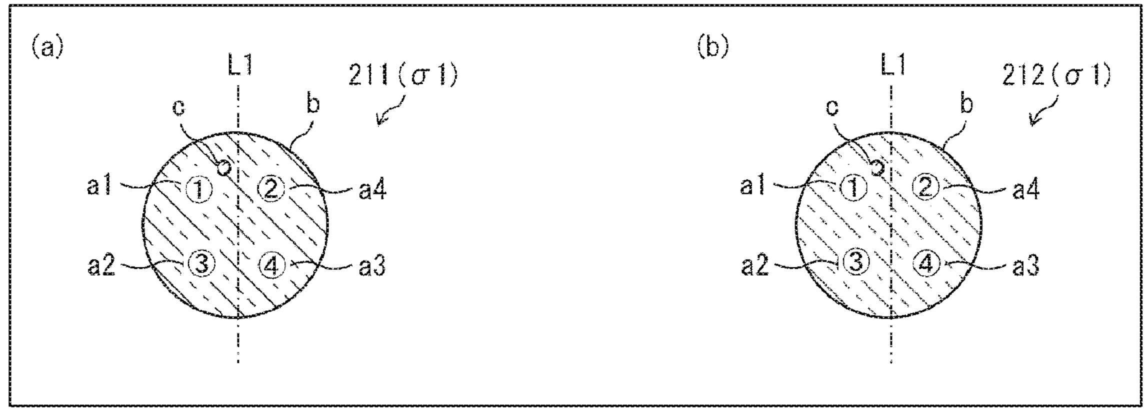
FIG. 15 is a view for explaining an effect of the fiber connected body shown in FIG. 14.

The following description will discuss, with reference to FIG. 15, effects given by the fiber connected body 201. Similarly to (b) and (c) of FIG. 14, (a) and (b) of FIG. 15 each relate to a case where both the end surfaces 211 and 212 of the fiber connected body 201 serve as the end surfaces σ1 of the multi-core fibers MF. (a) of FIG. is a front view of the one end surface 211 of the fiber connected body 201 viewed in the direction of the sight line E1, and (b) of FIG. 15 is a front view of the other end surface 212 of the fiber connected body 201 viewed in the direction of the sight line E2.

The following will study identifying the cores a1 to a4 in both the end surfaces 211 and 212 of the fiber connected body 201 in accordance with the distances from the marker c to the cores a1 to a4. As shown in FIG. 15, the core a1, which is closest to the marker c, is assigned an identifier "1", the core a4, which is second closest to the marker c, is assigned an identifier "2", the core a2, which is third closest to the marker c, is assigned an identifier "3", and the core a3, which is farthest from the marker c, is assigned an identifier "4". That is, in a case where the cores arranged so as to avoid the above-described axisymmetric axis are identified in accordance with the distances from the identifiers in both the end surfaces 211 and 212 of the fiber connected body 201, cores that are axisymmetric to each other are assigned the same identifier.

Then, the core a1 that is assigned the identifier "1" in the one end surface 211 of the fiber connected body 201 is optically coupled to the core a4 that is assigned the identifier "2" in the other end surface 212 of the fiber connected body 201. The core a4 that is assigned the identifier "2" in the one end surface 211 of the fiber connected body 201 is optically coupled to the core a1 that is assigned the identifier "1" in the other end surface 212 of the fiber connected body 201. The core a2 that is assigned the identifier "3" in the one end surface 211 of the fiber connected body 201 is optically coupled to the core a3 that is assigned the identifier "4" in the other end surface 212 of the fiber connected body 201. The core a3 that is assigned the identifier "4" in the one end surface 211 of the fiber connected body 201 is optically coupled to the core a2 that is assigned the identifier "3" in the other end surface 212 of the fiber connected body 201.

As discussed above, in both the end surfaces 211 and 212 of the fiber connected body 201, cores assigned the same identifier are not optically coupled to each other. Rather, cores assigned identifiers (1<-->2, 3<-->4) that are interchangeable with each other are optically coupled to each other. Thus, in a case where the cores a1 to a4 are used for two complemental purposes (e.g., an optical input and an optical output), the cores assigned the same identifier may be used for the same purpose, whereby the cores used for complemental purposes can be optically coupled to each other. This can avoid a situation in which the ends of the cores communicating to each other are both used for input or output. Therefore, with the above configuration, it is possible to provide the fiber connected body 201 that is easier to be handled than conventional ones. Note that this effect is attained in, among the cores a1 to an, cores arranged so as to avoid the symmetry axis L1 (i.e., if all the cores a1 to an are arranged so as to avoid the symmetry axis, this effect is attained in all the cores). By employing the configuration in which all the cores a1 to an are arranged so as to avoid the symmetry axis, it is possible to provide the fiber connected body 201 that is far easier to be handled than conventional ones, as compared with a case of employing the configuration in which all the cores a1 to an are arranged so as to avoid the symmetry axis.

For example, assume that, in both the end surfaces 211 and 212, the core assigned the identifier "1" is used for input of a first optical signal, the core assigned the identifier "2" is used for output of the first optical signal, the core assigned the identifier "3" is used for output of a second optical signal, and the core assigned the identifier "4" is used for input of the second optical signal.

Then, in the fiber connected body 201, the core a1 that is assigned the identifier "1" in the one end surface 211 and that is used for input of the first optical signal is optically coupled to the core a4 that is assigned the identifier "2" in the other end surface 212 and that is used for output of the first optical signal. Thus, communication is established therebetween. Similarly, the core a4 that is assigned the identifier "2" in the one end surface 211 and that is used for output of the first optical signal is optically coupled to the core a1 that is assigned the identifier "1" in the other end surface 212 and that is used for input of the first optical signal. Thus, communication is established therebetween.

Similarly, the core a2 that is assigned the identifier "3" in the one end surface 211 and that is used for output of the second optical signal is optically coupled to the core a3 that is assigned the identifier "4" in the other end surface 212 and that is used for input of the second optical signal. Thus, communication is established therebetween. Similarly, the core a3 that is assigned the identifier "4" in the one end surface 211 and that is used for input of the second optical signal is optically coupled to the core a2 that is assigned the identifier "3" in the other end surface 212 and that is used for output of the second optical signal. Thus, communication is established therebetween. Note that, the cores a1 to a4 are preferably arranged, in both the end surfaces 211 and 212, such that the core for input of the first optical signal and the core for input of the second optical signal are disposed so as to be diagonal to be each other and the core for output of the first optical signal and the core for output of the second optical signal are disposed so as to be diagonal to each other. This can increase a distance between (i) a core through which the first optical signal propagates from one end surface toward the other end surface and (ii) a core through which the second optical signal propagates from the one end surface toward the other end surface. With this, in a case where the first optical signal or the second optical signal propagates from the end surface 211 toward the end surface 212 or from the end surface 212 toward the end surface 211, it is possible to reduce a phenomenon that the first optical signal or the second optical signal propagating through a certain core propagates to a core which is not the certain core and which allows an optical signal of the same type as the first optical signal or the second optical signal to propagate therethrough. Consequently, it is possible to reduce crosstalk between the first optical signal and the second optical signal.

The above description has dealt with the effects attained by the fiber connected body 201 in which both the end surfaces 211 and 212 of the multi-core fiber 201 serve as the end surfaces $\sigma$1 of the multi-core fibers MF. Similar effects can also be attained by a fiber connected body 201 in which both end surfaces 211 and 212 thereof serve as end surfaces $\sigma$2 of multi-core fibers MF. Further, the above description has dealt with the effects attained by the fiber connected body 201 including an odd number of connected parts of inverted connection with respect to the axis L1. Similar effects can also be attained by a fiber connected body including an odd number of connected parts of inverted connection with respect to an axis L2.

Further, in a case where fan-in/fan-out devices or transceivers are connected to both the ends of the fiber connected body 201, the following effects can be achieved. Specifically, in a case where fan-in/fan-out devices or transceivers are connected to both the ends of a conventional fiber connected body in which all connected parts are of normal connection, it is necessary to prepare (i) fan-in/fan-out devices or transceivers having different in port arrangement structures or (ii) fan-in/fan-out devices or transceivers in which the purposes of use of the ports can be easily switched from one to another. The former case involves the problem of an increase in the number of parts. Meanwhile, the latter case involves the problem of an increase in complexity of the structure. On the other hand, in a case where fan-in/fan-out devices are connected to both the ends of the fiber connected body 201 in which an odd number of connected parts are of inverted connection, the fan-in/fan-out devices having the same port arrangement structure can be employed, which eliminates the need for preparing (i) fan-in/fan-out devices or transceivers having different in port arrangement structures or (ii) fan-in/fan-out devices or transceivers in which the purposes of use of the ports can be easily switched from one to another. This is because that, as will be described later, a transmitting port of one of the fan-in/fan-out devices is connected to a receiving port of the other of the fan-in/fan-out devices. Thus, with the fiber connected body 201, it is possible to provide a communication system with a fewer parts or a simpler configuration as compared to the conventional ones. Similar effects can also be attained by a configuration in which both the ends of the fiber connected body 201 are connected to transceivers. The above-described port arrangement structure will be described in detail later.

(Variation of Fiber Connected Body)

Figure 16:
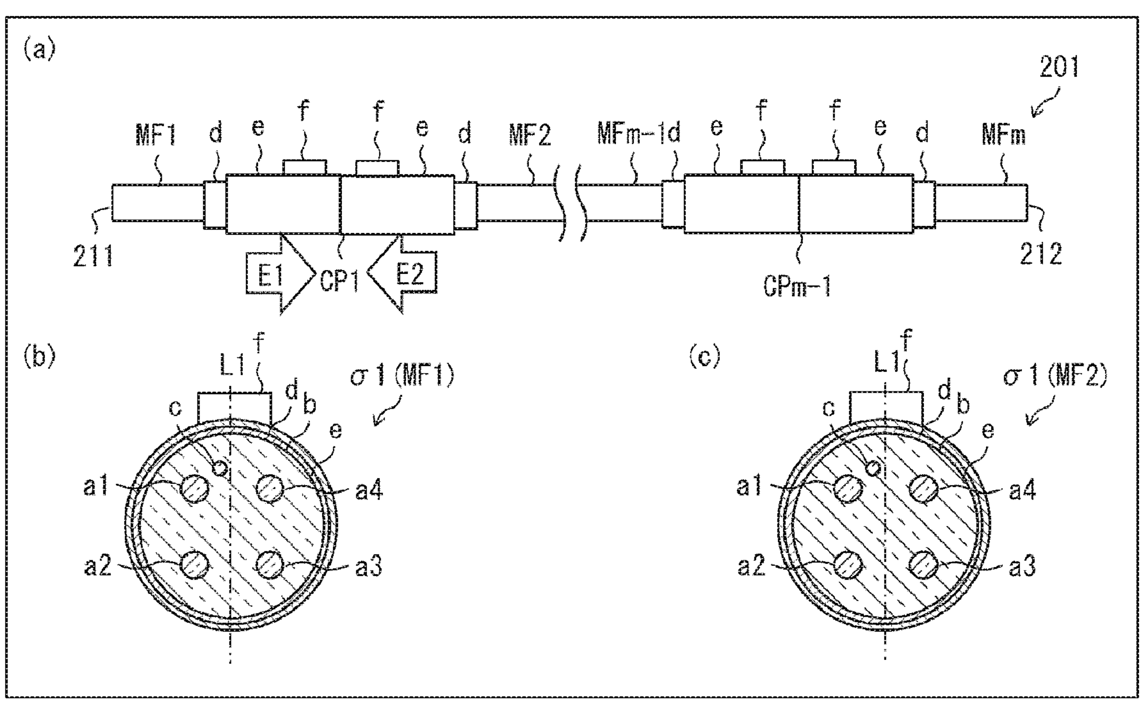
FIG. 16 is a view illustrating a variation of the fiber connected body shown in FIG. 14.

The following description will discuss, with reference to FIG. 16, a first variation of the fiber connected body 201 (hereinafter, referred to as a fiber connected body 201A). In FIG. 16, (a) is a side view of the multi-core fiber 201A, (b) is a front view, viewed in a direction of a sight line E2, of an end surface (σ1) of a multi-core fiber MF1 which end surface is adjacent to a multi-core fiber MF2, and (c) is a front view, viewed in a direction of a sight line E1, of an end surface (σ1) of the multi-core fiber MF2 which end surface is adjacent to the multi-core fiber MF1.

In the fiber connected body 201A, each of the multi-core fibers MF has a ferrule d and a frame e provided to both ends of the each of the multi-core fibers MF. On this point, the fiber connected body 201A differs from the fiber connected body 201. The ferrule d is a cylindrical structure covering an outer surface of the cladding b, and the frame e is a cylindrical structure covering an outer surface of the ferrule d. The frame e is provided with a key f. The key f is a protruded structure provided on an outer surface of the frame e. The ferrule d and the frame e are examples of jackets covering the multi-core fiber MF1, MFm.

As shown in (b) and (c) of FIG. 14, the key f is disposed on the axisymmetric axis L1 of the cores a1 to an. With this, it is possible to easily achieve normal connection or inverted connection (in FIG. 16, inverted connection) by connecting the multi-core fibers MF1 and MF2 to each other such that their respective keys f are aligned with each other. The connection of the multi-core fibers MF1 and MF2 is carried out, for example, in the following manner. First, the key f of the frame e of the multi-core fiber MF1 is aligned with the key f of the frame e of the multi-core fiber MF2. Then, the keys f are fitted to connection key grooves on an adapter (not illustrated) for alignment, and then the frame e of the multi-core fiber MF1 and the frame of the multi-core fiber MF2 are connected to each other.

The above description has dealt with the configuration in which all connected parts CPi (i is a natural number of not less than one and not more than m−1) are configured such that the keys f are respectively provided to (i) a location close to an end surface of a multi-core fiber MFi which end surface is adjacent to a multi-core fiber MFi+1 and (ii) a location close to an end surface of the multi-core fiber MFi+1 which end surface is adjacent to the multi-core fiber MFi. However, this is not limitative. Provided that at least one connected part CPi is configured such that keys f are respectively provided to (i) a location close to an end surface of a multi-core fiber MFi which end surface is adjacent to a multi-core fiber MFi+1 and (ii) a location close to an end surface of the multi-core fiber MFi+1 which end surface is adjacent to the multi-core fiber MFi, it is possible to easily achieve normal connection or inverted connection of the multi-core fibers MFi and MF. Alternatively, a key(s) f may be provided to a location close to the end surface 211 of the multi-core fiber MF1 and/or a location close to the end surface 212 of the multi-core fiber m.

Optical Communication System

Figure 17:
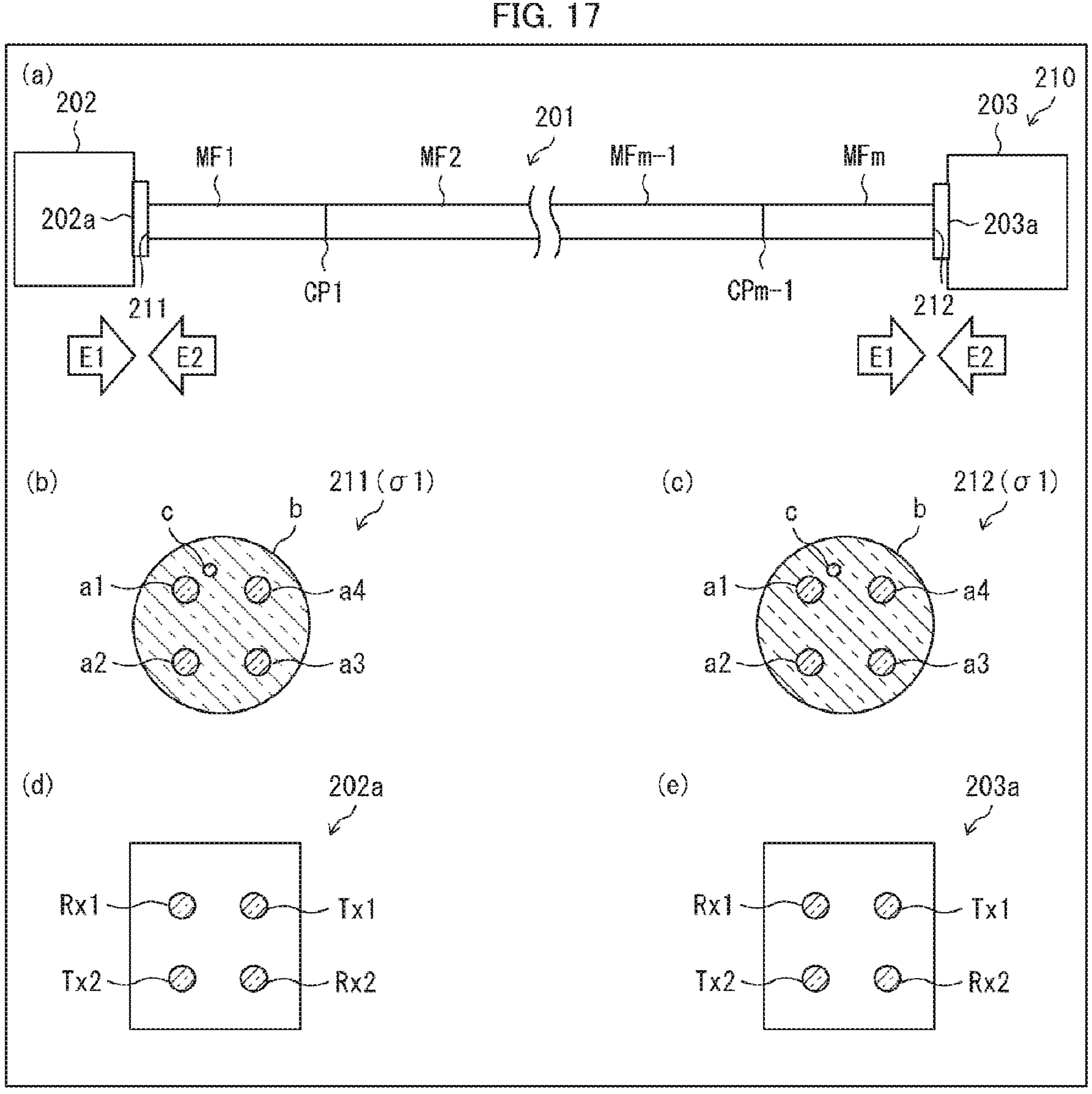
FIG. 17 is a view illustrating an optical communication system including the fiber connected body shown in FIG. 14 and two transceivers.

The following description will discuss, with reference to FIG. 17, an optical communication system 210 including the fiber connected body 201.

(a) of FIG. 17 is a side view of the optical communication system 210. The optical communication system 210 includes the fiber connected body 201, a first transceiver 202 connected to the one end surface 211 of the fiber connected body 201, and a second transceiver connected to the other end surface of the fiber connected body 201. The first transceiver 202 includes an optical input-output element 202*a*, and the second transceiver 203 includes an optical input-output element 203*a*.

(b) of FIG. 17 is a front view of the end surface 211 of the fiber connected body 201 viewed in a direction of a sight line E1, and (c) of FIG. 17 is a front view of the end surface 212 of the fiber connected body 201 viewed in a direction of a sight line E2. (d) of FIG. 17 is a front view of the optical input-output element 202*a* of the first transceiver 202 viewed in the direction of the sight line E2, and (e) of FIG. 17 is a front view of the optical input-output element 203*a* of the second transceiver 203 viewed in the direction of the sight line E1. Each of the optical input-output elements 202*a* and 203*a* includes a transmitting port Tx1 that transmits a first optical signal, a receiving port Rx1 that receives the first optical signal, a transmitting port Tx2 that transmits a second optical signal, and a receiving port Rx2 that receives the second optical signal. The transmitting port Tx1 and the receiving port Rx1 constitute a first pair, and the transmitting port Tx2 and the receiving port Rx2 constitute a second pair. The same port arrangement structure including the transmitting port Tx1, the receiving port Rx1, the transmitting port Tx2, and the receiving port Rx2 is employed in the end surfaces of the optical input-output elements 202*a* and 203*a*.

With the fiber connected body 201, it is possible to provide the optical communication system 210 in which the port arrangement structure of the optical input-output element 202*a* of the first transceiver 202 and the port arrangement structure of the optical input-output element 203*a* of the second transceiver 203 are the same. Thus, the identical parts can be supplied as the optical input-output element 202*a* of the first transceiver 202 and the optical input-output element 203*a* of the second transceiver 203. Consequently, it is possible to provide the optical communication system 210 that is constituted by a fewer parts or that has a simpler configuration. Here, the expression that the port arrangement structures are the same means, for example, that the optical input-output elements are given the same label or tag indicating identification numbers.

Indeed, (1) the core a1 in the end surface 211 is optically coupled to the core a4 in the end surface 212, (2) the core a4 in the end surface 211 is optically coupled to the core a1 in the end surface 212, (3) the core a2 in the end surface 211 is optically coupled to the core a3 in the end surface 212, and (4) the core a3 in the end surface 211 is optically coupled to the core a2 in the end surface 212. Thus, even in a case where the optical input-output elements 202*a* and 203*a* employ the same arrangement of the transmitting port Tx1, the receiving port Rx1, the transmitting port Tx2, and the receiving port Rx2, communication can be established therebetween.

The reason for this is as follows: (1) the core a1 that is connected to the transmitting port Tx1 of the optical input-output element 202*a* in the one end surface 211 of the fiber connected body 201 is optically connected to the core a4 that is connected to the receiving port Rx1 of the optical input-output element 203*a* in the other end surface 212 of the fiber connected body 201, (2) the core a4 that is connected to the receiving port Rx1 of the optical input-output element 202*a* in the one end surface 211 of the fiber connected body 201 is optically connected to the core a1 that is connected to the transmitting port Tx1 of the optical input-output element 203*a* in the other end surface 212 of the fiber connected body 201, (3) the core a2 that is connected to the receiving port Rx2 of the optical input-output element 202*a* in the one end surface 211 of the fiber connected body 201 is optically connected to the core a3 that is connected to the transmitting port Tx2 of the optical input-output element 203*a* in the other end surface 212 of the fiber connected body 201, and (4) the core a3 that is connected to the transmitting port Tx2 of the optical input-output element 202*a* in the one end surface 211 of the fiber connected body 201 is optically connected to the core a2 that is connected to the receiving port Rx2 of the optical input-output element 203*a* in the other end surface 212 of the fiber connected body 201. This is an effect given by the above-described features of the fiber connected body 201.

Optical Device

Figure 18:
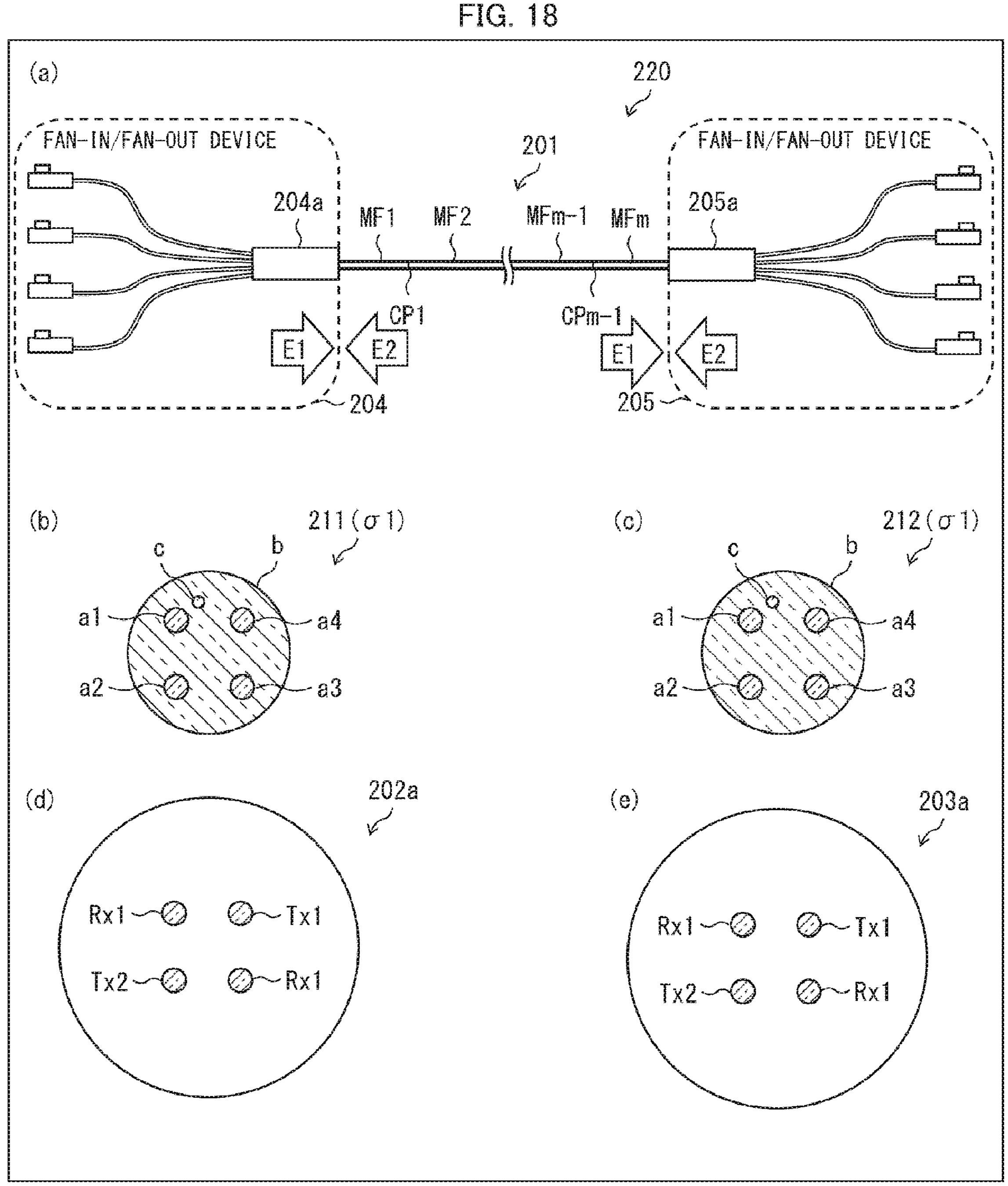
FIG. 18 is a block diagram of an optical communication system including the fiber connected body shown in FIG. 14 and two fan-in/fan-out devices.

The following description will discuss, with reference to FIG. 18, an optical device 220 including the fiber connected body 201.

(a) of FIG. 18 is a block diagram of the optical device 220. The optical device 220 includes the fiber connected body 201, a first fan-in/fan-out device 204 connected to the one end surface 211 of the fiber connected body 201, and a second fan-in/fan-out device 205 connected to the other end surface 212 of the fiber connected body 201. Each of the first fan-in/fan-out device 204 and the second fan-in/fan-out device 205 includes an optical path converting part 204*a* or 205*a*, single-core fibers connected to the optical path converting part 204*a* or 205*a*, and four connectors connected to the single-core fibers.

(b) of FIG. 18 is a front view of the end surface 211 of the fiber connected body 201 viewed in a direction of a sight line E1, and (c) of FIG. 18 is a front view of the end surface 212 of the fiber connected body 201 viewed in a direction of a sight line E2. (d) of FIG. 18 is a front view of an end surface of the optical path converting part 204*a* of the first fan-in/fan-out device 204 viewed in the direction of the sight line E2, and (e) of FIG. 18 is a front view of the optical path converting part 205*a* of the second fan-in/fan-out device 205 viewed in the direction of the sight line E1. Each of the optical path converting parts 204*a* and 205*a* includes a transmitting port Tx1 connected to a first transmitting connector that transmits a first optical signal, a receiving port Rx1 connected to a first receiving connector that receives the first optical signal, a transmitting port Tx2 connected to a second transmitting connector that transmits a second optical signal, and a receiving port Rx2 connected to a second receiving connector that receives the second optical signal. Here, the end surfaces of the optical path converting parts 204*a* and 205*a* have the same port arrangement structure including the transmitting port Tx1, the receiving port Rx1, the transmitting port Tx2, and the receiving port Rx2.

With the fiber connected body 201, it is possible to provide the optical device 220 in which the port arrangement structure of the optical path converting part 204*a* of the first fan-in/fan-out device 204 is the same as the port arrangement structure of the optical path converting part 205*a* of the second fan-in/fan-out device 205. The reason for this is the same as the reason why the optical communication system 210 can employ a configuration in which the port arrangement structure of the optical input-output element 202*a* of the first transceiver 202 is the same as the port arrangement structure of the optical input-output element 203*a* of the second transceiver 203. Here, the expression that the port arrangement structures are the same means, for example, that the same label or tag including the same identification number is given to the connectors or that fibers are arranged in the same order in ribbon fibers or multi-core connectors. Consequently, it is possible to provide the optical device 220 that is constituted by a fewer parts or that has a simpler configuration.

The fan-in/fan-out devices 204 and 205 used herein are fan-in/fan-out devices without a pigtail fiber having a multi-core fiber structure. However, this is not limitative. Alternatively, for example, the fan-in/fan-out devices 204 and 205 may be fan-in/fan-out devices each connected to a pigtail fiber having a multi-core fiber structure. In this case, effects similar to those described above can be attained. Use of the fan-in/fan-out devices 204 and 205 each connected to a pigtail fiber in which a core arrangement structure can be identified is more likely to provide the fan-in/fan-out devices 204 and 205 having the same port arrangement structure. Consequently, it is possible to provide the optical device 220 that is constituted by a fewer parts or that has a simpler configuration. Further, merely by checking the core arrangement structure, it is possible to easily identify the port arrangement structures of the fan-in/fan-out devices 204 and 205. Here, the pigtail fiber in which the core arrangement structure can be identified is, for example, a pigtail fiber having an end surface provided with a marker, a pigtail fiber having an outer surface covered with a jacket provided with a key, or a pigtail fiber having an outer surface with identification information. The type of each of the fan-in/fan-out devices 204 and 205 is not limited to any particular one, and may be, for example, a melt-stretching type, a spatially-coupling type, a fiber bundle type, or a planar waveguide type.

Supplementary Remarks 2

The second aspect of one or more embodiments is not limited to any of the above-described embodiments and variations, but can be altered by a skilled person in the art within the scope of the specification. The second aspect of one or more embodiments also encompasses, in its technical scope, any embodiment derived by combining technical means disclosed in differing embodiments and variations.

Summary 1

A fiber connected body in accordance with aspect 1 of the first aspect of one or more embodiments includes: a first multi-core fiber including (i) a cladding and (ii) cores and at least one first marker disposed inside the cladding; and a second multi-core fiber including (i) a cladding and (ii) cores and at least one second marker disposed inside the cladding, the second multi-core fiber having one end surface connected to one end surface of the first multi-core fiber, each of the cores in the second multi-core fiber being connected to any one of the cores in the first multi-core fiber or each of the cores in the first multi-core fiber being connected to any one of the cores in the second multi-core fiber, at least one of the at least one second marker in the second multi-core fiber being connected to a part of the first multi-core fiber which part is not the at least one first marker or at least one of the at least one first marker in the first multi-core fiber being connected to a part of the second multi-core fiber which part is not the at least one second marker.

A fiber connected body in accordance with aspect 2 of the first aspect of one or more embodiments adopts, in addition to the feature of aspect 1, a feature wherein (i) the number of the cores in each of the first and second multi-core fibers is at least two and (ii) a core closest to the second marker in the second multi-core fiber is connected to, among the cores in the first multi-core fiber, a core that is not a core closest to the first marker in the first multi-core fiber.

A fiber connected body in accordance with aspect 3 of the first aspect of one or more embodiments adopts, in addition to the feature of aspect 1, a feature wherein (i) the number of the cores in each of the first and second multi-core fibers is at least three and (ii), among pairs of the cores in the second multi-core fiber, a pair of a core closest to the second marker and a core second closest to the second marker or a pair of two cores closest to the second marker is connected to, among pairs of the cores in the first multi-core fiber, a pair that is not (i) a pair of a core closest to the first marker and a core second closest to the first marker or (ii) a pair of two cores closest to the first marker.

A fiber connected body in accordance with aspect 4 of the first aspect of one or more embodiments adopts, in addition to the feature of aspect 3, a feature wherein a refractive index of the first marker is lower than a refractive index of the cladding in the first multi-core fiber and a refractive index of the second marker is lower than a refractive index of the cladding in the second multi-core fiber.

A fiber connected body in accordance with aspect 5 of the first aspect of one or more embodiments adopts, in addition to the feature of any of aspects 1 to 4, a feature wherein: the fiber connected body further includes a third multi-core fiber including (i) a cladding and (ii) cores and a third marker disposed inside the cladding, the third multi-core fiber having one end surface connected to the other end surface of the second multi-core fiber; the number of the cores in each of the first and third multi-core fibers is n, where n is a natural number of not less than two; in a case where ordinal numbers of the cores in each of the multi-core fibers are defined in an arrangement order of the cores such that a core closest to the marker is a first core and a core second closest to the marker is a second core, an i-th core in the third multi-core fiber is connected to, among the cores in the second multi-core fiber, a core connected to an i-th core in the first multi-core fiber, where i is a natural number of not less than one and not more than n.

A fiber connected body in accordance with aspect 6 of the first aspect of one or more embodiments adopts, in addition to the feature of any of aspects 1 to 4, a feature wherein: the fiber connected body further includes a third multi-core fiber including (i) a cladding and (ii) cores and a third marker disposed inside the cladding, the third multi-core fiber having one end surface connected to the other end surface of the second multi-core fiber; a core closest to the third multi-core fiber in the third multi-core fiber is connected to, among the cores in the second multi-core fiber, a core that is not (1) a core closest to the second marker or (2) a core connected to a core closest to the first marker in the first multi-core fiber.

A fiber connected body in accordance with aspect 7 of the first aspect of one or more embodiments adopts, in addition to the feature of any of aspects 1 to 6, a feature wherein: in the first multi-core fiber, the first marker is disposed such that distances from the first marker to the cores are all different from each other; and, in the second multi-core fiber, the second marker is disposed such that distances from the second marker to the cores are all different from each other.

A fiber connected body in accordance with aspect 8 of the first aspect of one or more embodiments adopts, in addition to the feature of any of aspects 1 to 7, a feature wherein: the fiber connected body further includes a first frame provided at an end of the first multi-core fiber which end is adjacent to the second multi-core fiber and a second frame provided at an end of the second multi-core fiber which end is adjacent to the first multi-core fiber; and a connection key provided on a surface of the first frame is aligned with a core closest to the first marker and a connection key provided on a surface of the second frame is aligned with a core closest to the second marker.

A method in accordance with aspect 9 of the first aspect of one or more embodiments for producing a fiber connected body is a method for producing a fiber connected body that includes: a first multi-core fiber including (i) a cladding and (ii) cores and at least one first marker disposed inside the cladding; and a second multi-core fiber including (i) a cladding and (ii) cores and at least one second marker disposed inside the cladding, the method including connecting one end surface of the second multi-core fiber to one end surface of the first multi-core fiber so that each of the cores in the second multi-core fiber is connected to any one of the cores in the first multi-core fiber or each of the cores in the first multi-core fiber is connected to any one of the cores in the second multi-core fiber and at least one of the at least one second marker in the second multi-core fiber is connected to a part of the first multi-core fiber which part is not the at least one first marker or at least one of the at least one first marker in the first multi-core fiber is connected to a part of the second multi-core fiber which part is not the at least one second marker.

Summary 2

A fiber connected body in accordance with aspect 1 of the second aspect of one or more embodiments is a fiber connected body including a plurality of multi-core fibers connected to each other, the plurality of multi-core fibers having the same core arrangement, each of the plurality of multi-core fibers having an end surface including a cladding, cores disposed inside the cladding so as to be axisymmetric to each other, and a marker, a center of the marker being positioned at a location that does not overlap a symmetry axis of the cores, the number of connected parts satisfying the following conditions (1) and (2) being an odd number, where an end surface of one of adjacent ones of the plurality of multi-core fibers is a first end surface and an end surface of the other is a second end surface: (1) cores in the first end surface overlap cores in the second end surface; and (2) a marker in the first end surface overlaps a position in the second end surface which position is axisymmetric with a marker in the second end surface with respect to the symmetry axis.

A fiber connected body in accordance with aspect 2 of the second aspect of one or more embodiments adopts, in addition to the feature of aspect 1, a feature wherein the cores are all disposed at locations that do not overlap the symmetry axis.

A fiber connected body in accordance with aspect 3 of the second aspect of one or more embodiments adopts, in addition to the feature of aspect 1 or 2, a feature wherein: one of the adjacent ones of the plurality of multi-core fibers is a first multi-core fiber and the other is a second multi-core fiber; and a key is provided on an outer side of a jacket covering a side surface of the first multi-core fiber and a key is provided on an outer side of a jacket covering a side surface of the second multi-core fiber.

A fiber connected body in accordance with aspect 4 of the second aspect of one or more embodiments adopts, in addition to the feature of any of aspects 1 to 3, a feature wherein: in both end surfaces of the fiber connected body, purposes of use of the cores are defined such that cores used for input of an optical signal are disposed so as to be diagonal to each other and cores used for output of an optical signal are disposed so as to be diagonal to each other.

An optical communication system in accordance with aspect of the second aspect of one or more embodiments includes: a fiber connected body of any of aspects 1 to 4; a first transceiver provided at one end of the fiber connected body; and a second transceiver provided at the other end of the fiber connected body, a port arrangement structure of the first transceiver being identical to a port arrangement structure of the second transceiver.

An optical device in accordance with aspect 6 of the second aspect of one or more embodiments includes: a fiber connected body of any of aspects 1 to 4; a first fan-in/fan-out device provided at one end of the fiber connected body; and a second fan-in/fan-out device provided at the other end of the fiber connected body, a port arrangement structure of the first fan-in/fan-out device being identical to a port arrangement structure of the second fan-in/fan-out device.

A method in accordance with aspect 7 of the second aspect of one or more embodiments for producing a fiber connected body is a method for producing a fiber connected body that includes a plurality of multi-core fibers connected to each other, the plurality of multi-core fibers having the same core arrangement, each of the plurality of multi-core fibers having an end surface including a cladding, cores disposed inside the cladding so as to be axisymmetric to each other, and a marker disposed at a location that does not overlap a symmetry axis of the cores, the method including connecting the plurality of multi-core fibers to each other so that the number of connected parts satisfying the following conditions (1) and (2) is an odd number, where an end surface of one of adjacent ones of the plurality of multi-core fibers is a first end surface and an end surface of the other is a second end surface: (1) cores in the first end surface overlap cores in the second end surface; and (2) a marker in the first end surface overlaps a position in the second end surface which position is axisymmetric with a marker in the second end surface with respect to the symmetry axis.

Supplementary Remarks 3

The first and second aspects of one or more embodiments are not limited to any of the above-described embodiments and variations, but can be altered by a skilled person in the art within the scope of the specification. The present invention also encompasses, in its technical scope, any embodiment derived by combining technical means disclosed in differing embodiments and variations of the first aspect and technical means disclosed in differing embodiments and variations of the second aspect.

As confirmation, the technical scope of one or more embodiments can encompass any of the following features (1) to (6), provided that a technical contradiction is not caused.

(1) A feature in accordance with any one of aspects 1 to 9 of the first aspect.

(2) A feature in accordance with a combination of two or more of aspects 1 to 9 of the first aspect.

(3) A feature in accordance with any one of aspects 1 to 7 of the second aspect.

(4) A feature in accordance with a combination of two or more of aspects 1 to 7 of the second aspect.

(5) A feature in accordance with a combination of two or more of the above-described features (1) to (4).

(6) A feature in accordance with a combination of any of the above-described features (1) to (5) and the above-described technical means.

Summary 3

A fiber connected body in accordance with aspect 1 of one or more embodiments includes: a first multi-core fiber including (i) a cladding and (ii) cores and a first marker disposed inside the cladding; and a second multi-core fiber including (i) a cladding and (ii) cores and a second marker disposed inside the cladding, the second multi-core fiber having one end surface connected to one end surface of the first multi-core fiber, each of the cores in the second multi-core fiber being connected to any one of the cores in the first multi-core fiber or each of the cores in the first multi-core fiber being connected to any one of the cores in the second multi-core fiber.

A fiber connected body in accordance with aspect 2 of one or more embodiments adopts, in addition to the feature of aspect 1, a feature wherein at least a part of the second marker in the second multi-core fiber is connected to a part of the first multi-core fiber which part is not the first marker of the first multi-core fiber or at least a part of the first marker of the first multi-core fiber is connected to a part of the second multi-core fiber which part is not the second marker of the second multi-core fiber.

A fiber connected body in accordance with aspect 3 of one or more embodiments adopts, in addition to the feature of aspect 2, a feature wherein each of the number of the cores in the first multi-core fiber and the number of the cores in the second multi-core fiber is at least two, and among the cores in the second multi-core fiber, a core closest to the second marker is connected to, among the cores in the first multi-core fiber, a core that is not a core closest to the first marker.

A fiber connected body in accordance with aspect 4 of one or more embodiments adopts, in addition to the feature of aspect 2, a feature wherein: each of the number of the cores in the first multi-core fiber and the number of the cores in the second multi-core fiber is at least three; and among pairs of two cores selected from the cores in the second multi-core fiber, a pair of a core closest to the second marker and a core second closest to the second marker or a pair of two cores closest to the second marker is connected to, among pairs of two cores selected from the cores in the first multi-core fiber, a pair that is not (i) a pair of a core closest to the first marker and a core second closest to the first marker or (ii) a pair of two cores closest to the first marker.

A fiber connected body in accordance with aspect 5 of one or more embodiments adopts, in addition to the feature of aspect 4, a feature wherein a refractive index of the first marker is lower than a refractive index of the cladding in the first multi-core fiber, and a refractive index of the second marker is lower than a refractive index of the cladding in the second multi-core fiber.

A fiber connected body in accordance with aspect 6 of one or more embodiments adopts, in addition to the feature of any of aspects 2 to 5, a feature wherein: the fiber connected body further includes a third multi-core fiber including (i) a cladding and (ii) cores and a third marker disposed inside the cladding, the third multi-core fiber having one end surface connected to the other end surface of the second multi-core fiber; each of the number of the cores in the first multi-core fiber and the number of the cores in the third multi-core fiber is n, where n is a natural number of not less than two; and in a case where ordinal numbers of the cores in the first multi-core fiber are defined in an arrangement order of the cores such that a core closest to the first marker is a first core and a core second closest to the first marker is a second core, ordinal numbers of the cores in the second multi-core fiber are defined in an arrangement order of the cores such that a core closest to the second marker is a first core and a core second closest to the first marker is a second core, and ordinal numbers of the cores in the third multi-core fiber are defined in an arrangement order of the cores such that a core closest to the third marker is a first core and a core second closest to the first marker is a second core, an i-th core in the third multi-core fiber is connected to, among the cores in the second multi-core fiber, a core connected to an i-th core in the first multi-core fiber, where i is a natural number of not less than one and not more than n. In this aspect, it is preferable that the number of inverted connections be an even number.

A fiber connected body in accordance with aspect 7 of one or more embodiments adopts, in addition to the feature of any of aspects 2 to 5, a feature wherein: the fiber connected body further includes a third multi-core fiber including (i) a cladding and (ii) cores and a third marker disposed inside the cladding, the third multi-core fiber having one end surface connected to the other end surface of the second multi-core fiber; and among the cores in the third multi-core fiber, a core closest to the third marker is connected to, among the cores in the second multi-core fiber, a core that is not (1) a core closest to the second marker or (2) a core connected to, among the cores in the first multi-core fiber, a core closest to the first marker.

A fiber connected body in accordance with aspect 8 of one or more embodiments adopts, in addition to the feature of any of aspects 2 to 7, a feature wherein: the first marker is disposed in the first multi-core fiber such that distances from the first marker to the cores are all different from each other; and the second marker is disposed in the second multi-core fiber such that distances from the second marker to the cores are all different from each other.

A fiber connected body in accordance with aspect 9 of one or more embodiments adopts, in addition to the feature of any of aspects 2 to 8, a feature wherein a whole of the second marker in the second multi-core fiber is connected to a part of the first multi-core fiber which part is not the first marker of the first multi-core fiber or a whole of the first marker in the first multi-core fiber is connected to a part of the second multi-core fiber which part is not the second marker of the second multi-core fiber.

A fiber connected body in accordance with aspect 10 of one or more embodiments adopts, in addition to the feature of any of aspects 2 to 8, a feature wherein only a part of the second marker in the second multi-core fiber is connected to a part of the first multi-core fiber which part is not the first marker of the first multi-core fiber or only a part of the first marker in the first multi-core fiber is connected to a part of the second multi-core fiber which part is not the second marker of the second multi-core fiber.

A fiber connected body in accordance with aspect 11 of one or more embodiments adopts, in addition to the feature of any of aspects 2 to 10, a feature wherein: in the one end surface of the first multi-core fiber, the first marker overlaps an imaginary perpendicular bisector of an imaginary line segment connecting a center of a core closest to the first marker among the cores in the first multi-core fiber and a center of a core second closest to the first marker among the cores in the first multi-core fiber; or in the one end surface of the second multi-core fiber, the second marker overlaps an imaginary perpendicular bisector of an imaginary line segment connecting a center of a core closest to the second marker among the cores in the second multi-core fiber and a center of a core second closest to the second marker among the cores in the second multi-core fiber.

A fiber connected body in accordance with aspect 12 of one or more embodiments adopts, in addition to the feature of any of aspects 2 to 11, a feature wherein: in the one end surface of the first multi-core fiber, a center of the first marker does not overlap an imaginary perpendicular bisector of an imaginary line segment connecting a center of a core closest to the first marker among the cores in the first multi-core fiber and a center of a core second closest to the first marker among the cores in the first multi-core fiber; or in the one end surface of the second multi-core fiber, a center of the second marker does not overlap an imaginary perpendicular bisector of an imaginary line segment connecting a center of a core closest to the second marker among the cores in the second multi-core fiber and a center of a core second closest to the second marker among the cores in the second multi-core fiber.

A fiber connected body in accordance with aspect 13 of one or more embodiments adopts, in addition to the feature of any of aspects 2 to 12, a feature wherein: in the one end surface of the first multi-core fiber or the one end surface of the second multi-core fiber, an imaginary straight line connecting a center of the first marker and a center of the second marker is in parallel with an imaginary straight line connecting a center of a core closest to the first marker and a center of a core second closest to the first marker or with an imaginary straight line connecting a center of a core closest to the second marker and a center of a core second closest to the second marker.

A fiber connected body in accordance with aspect 14 of one or more embodiments adopts, in addition to the feature of any of aspects 2 to 13, a feature wherein: in the one end surface of the first multi-core fiber, a center of the first marker is positioned in an area surrounded by (1) an imaginary circumscribed circle that is circumscribed on, among the cores in the first multi-core fiber, a core closest to the first marker and a core second closest to the first marker and that has a center at a center of the cladding in the first multi-core fiber, (2) an imaginary bisector of an angle made by an imaginary straight line passing through the center of the core closest to the first marker and the center of the core second closest to the first marker and an imaginary straight line connecting the center of the core closest to the first marker and the center of the cladding, and (3) an imaginary bisector of an angle made by the imaginary straight line passing through the center of the core closest to the first marker and the center of the core second closest to the first marker and an imaginary straight line connecting the center of the core second closest to the first marker and the center of the cladding; or in the one end surface of the second multi-core fiber, a center of the second marker is positioned in an area surrounded by (1) an imaginary circumscribed circle that is circumscribed on, among the cores in the second multi-core fiber, a core closest to the second marker and a core second closest to the second marker and that has a center at a center of the cladding in the second multi-core fiber, (2) an imaginary bisector of an angle made by an imaginary straight line passing through the center of the core closest to the second marker and the center of the core second closest to the second marker and an imaginary straight line connecting the center of the core closest to the second marker and the center of the cladding, and (3) an imaginary bisector of an angle made by the imaginary straight line passing through the center of the core closest to the second marker and the center of the core second closest to the second marker and an imaginary straight line connecting the center of the core second closest to the second marker and the center of the cladding. In this aspect, the center of the first marker may be the whole of the first marker or the center of the second marker may be the whole of the second marker.

A fiber connected body in accordance with aspect 15 of one or more embodiments adopts, in addition to the feature of any of aspects 2 to 13, a feature wherein: in the one end surface of the first multi-core fiber, a center of the first marker is positioned in an area surrounded by (1) an imaginary circumscribed circle that is circumscribed on, among the cores in the first multi-core fiber, a core closest to the first marker and a core second closest to the first marker and that has a center at a center of the cladding in the first multi-core fiber, (2) an imaginary bisector of an angle made by an imaginary straight line passing through the center of the core closest to the first marker and the center of the core second closest to the first marker and an imaginary straight line connecting the center of the core closest to the first marker and the center of the cladding, (3) an imaginary bisector of an angle made by the imaginary straight line passing through the center of the core closest to the first marker and the center of the core second closest to the first marker and an imaginary straight line connecting the center of the core second closest to the first marker and the center of the cladding, and (4) an outer circumference of the cladding; or in the one end surface of the second multi-core fiber, a center of the second marker is positioned in an area surrounded by (1) an imaginary circumscribed circle that is circumscribed on, among the cores in the second multi-core fiber, a core closest to the second marker and a core second closest to the second marker and that has a center at a center of the cladding in the second multi-core fiber, (2) an imaginary bisector of an angle made by an imaginary straight line passing through the center of the core closest to the second marker and the center of the core second closest to the second marker and an imaginary straight line connecting the center of the core closest to the second marker and the center of the cladding, (3) an imaginary bisector of an angle made by the imaginary straight line passing through the center of the core closest to the second marker and the center of the core second closest to the second marker and an imaginary straight line connecting the center of the core second closest to the second marker and the center of the cladding, and (4) an outer circumference of the cladding. In this aspect, the center of the first marker may be the whole of the first marker or the center of the second marker may be the whole of the second marker.

A fiber connected body in accordance with aspect 16 of one or more embodiments adopts, in addition to the feature of any of aspects 1 to 15, a feature wherein: the fiber connected body is constituted by a plurality of multi-core fibers connected to each other, the plurality of multi-core fibers including the first multi-core fiber and the second multi-core fiber; each of the plurality of multi-core fibers has an end surface including a cladding, cores disposed inside the cladding so as to be axisymmetric to each other, and a marker, a center of the marker being positioned at a location that does not overlap an imaginary symmetry axis of the cores; and the number of connected parts between two adjacent ones of the plurality of multi-core fibers which connected parts satisfy the following conditions (1) and (2) is an odd number, where an end surface of one of the two adjacent ones of the plurality of multi-core fibers is a first end surface and an end surface of the other is a second end surface: (1) each of cores in the first end surface overlaps any one of cores in the second end surface; and (2) a marker in the first end surface overlaps a position in the second end surface which position is axisymmetric with a marker in the second end surface with respect to the imaginary symmetry axis of the cores in the second end surface.

A fiber connected body in accordance with aspect 17 of one or more embodiments adopts, in addition to the feature of aspect 16, a feature wherein the cores are all disposed at locations that do not overlap the imaginary symmetry axis.

A fiber connected body in accordance with aspect 18 of one or more embodiments adopts, in addition to the feature of any of aspects 1 to 17, a feature wherein, in both end surfaces of the fiber connected body, cores used for input of an optical signal are disposed so as to be diagonal to each other and cores used for output of an optical signal are disposed so as to be diagonal to each other. Note that the cores used for input of the optical signal or the cores used for output of the optical signal may have the following configuration. That is, the cores used for input of the optical signal are cores that can be optically coupled to an input port of an external transceiver, and the cores used for output of the optical signal are cores that can be optically coupled to an output port of an external transceiver.

An optical communication system in accordance with aspect 19 of one or more embodiments includes: a fiber connected body of any of aspects 1 to 18; a first transceiver provided at one end of the fiber connected body; and a second transceiver provided at the other end of the fiber connected body, (i) a port arrangement structure of ports of the first transceiver which ports are connected to cores that are in a multi-core fiber disposed at the one end, connected to the first transceiver, of the fiber connected body and that allow signal light to be guided therethrough or a port arrangement structure of ports of the first transceiver which ports are connected to cores that are in a multi-core fiber connected to the first transceiver and the one end of the fiber connected body at a location interposed therebetween and that allow signal light to be guided therethrough being identical to (ii) a port arrangement structure of ports of the second transceiver which ports are connected to cores that are in a multi-core fiber disposed at the other end, connected to the second transceiver, of the fiber connected body and that allow signal light to be guided therethrough or a port arrangement structure of ports of the second transceiver which ports are connected to cores that are in a multi-core fiber connected to the second transceiver and the other end of the fiber connected body at a location interposed therebetween and that allow signal light to be guided therethrough.

An optical device in accordance with aspect 20 of one or more embodiments includes: a fiber connected body of any of aspects 1 to 18; a first fan-in/fan-out device provided at one end of the fiber connected body; and a second fan-in/fan-out device provided at the other end of the fiber connected body, (i) a port arrangement structure of ports of the first fan-in/fan-out device which ports are connected to cores that are in a multi-core fiber disposed at the one end, connected to the first fan-in/fan-out device, of the fiber connected body and that allow signal light to be guided therethrough or a port arrangement structure of ports of the first fan-in/fan-out device which ports are connected to cores that are in a multi-core fiber connected to the first fan-in/fan-out device and the one end of the fiber connected body at a location interposed therebetween and that allow signal light to be guided therethrough being identical to (ii) a port arrangement structure of ports of the second fan-in/fan-out device which ports are connected to cores that are in a multi-core fiber disposed at the other end, connected to the second fan-in/fan-out device, of the fiber connected body and that allow signal light to be guided therethrough or a port arrangement structure of ports of the second fan-in/fan-out device which ports are connected to cores that are in a multi-core fiber connected to the second fan-in/fan-out device and the other end of the fiber connected body at a location interposed therebetween and that allow signal light to be guided therethrough.

A method in accordance with aspect 21 of one or more embodiments for producing a fiber connected body is a method for producing a fiber connected body of any of aspects 2 to 15, the method including the step of: connecting the one end surface of the second multi-core fiber to the one end surface of the first multi-core fiber so that (i) each of the cores in the second multi-core fiber is connected to any one of the cores in the first multi-core fiber or each of the cores in the first multi-core fiber is connected to any one of the cores in the second multi-core fiber and (ii) at least a part of the second marker in the second multi-core fiber is connected to a part of the first multi-core fiber which part is not the first marker of the first multi-core fiber or at least a part of the first marker in the first multi-core fiber is connected to a part of the second multi-core fiber which part is not the second marker of the second multi-core fiber.

A method in accordance with aspect 22 of one or more embodiments for producing a fiber connected body is a method for producing a fiber connected body of any of aspects 16 to 18, the method including: connecting the plurality of multi-core fibers to each other so that the number of connected parts satisfying the following conditions (1) and (2) is an odd number, where an end surface of one of adjacent ones of the plurality of multi-core fibers is a first end surface and an end surface of the other is a second end surface: (1) each of cores in the first end surface overlaps any of the cores in the second end surface; and (2) a marker in the first end surface overlaps a position in the second end surface which position is axisymmetric with a marker in the second end surface with respect to the imaginary symmetry axis of the cores in the second end surface.

A fiber connected body in accordance with aspect 23 of one or more embodiments adopts, in addition to the feature of any of aspects 2 to 12 and 15, a feature wherein: in the one end surface of the first multi-core fiber, a center of the first marker is positioned in an area (hereinafter, this area may also be referred to as an "area F") surrounded by (1) an imaginary circumscribed circle that is circumscribed on, among the cores in the first multi-core fiber, a core closest to the first marker and a core second closest to the first marker and that has a center at a center of the cladding in the first multi-core fiber, (2) an imaginary bisector of an angle made by an imaginary straight line passing through the center of the core closest to the first marker and the center of the core second closest to the first marker and an imaginary straight line connecting the center of the core closest to the first marker and the center of the cladding, and (3) the imaginary straight line connecting the center of the core closest to the first marker and the center of the cladding; or in the one end surface of the second multi-core fiber, a center of the second marker is positioned in an area (hereinafter, this area may also be referred to as an "area G") surrounded by (1) an imaginary circumscribed circle that is circumscribed on, among the cores in the second multi-core fiber, a core closest to the second marker and a core second closest to the second marker and that has a center at a center of the cladding in the second multi-core fiber, (2) an imaginary bisector of an angle made by an imaginary straight line passing through the center of the core closest to the second marker and the center of the core second closest to the second marker and an imaginary straight line connecting the center of the core closest to the second marker and the center of the cladding, and (3) the imaginary straight line connecting the center of the core closest to the second marker and the center of the cladding. This aspect can adopt, in addition to the above-described features (1) to (3), a feature of (4) the outer circumference of the cladding 111*b* or the outer circumference of the cladding 112*b*. In this case, the center of the first marker or the center of the second marker is positioned in an area surrounded by (1) to (4) described above (hereinafter, such areas may also be referred to as an "area H" and an "area I"). Alternatively, the center of the first marker may be positioned to lie across a boundary between the areas F and H or the center of the second marker may be positioned to lie across a boundary between the areas G and I. The center of the first marker may be the whole of the first marker or the center of the second marker may be the whole of the second marker.

A fiber connected body in accordance with aspect 24 of one or more embodiments adopts, in addition to the feature of any of aspects 2 to 12, 14, 15, and 23, a feature wherein: in the one end surface of the first multi-core fiber, a center of the first marker overlaps an imaginary perpendicular bisector of an imaginary line segment connecting a center of a core closest to the first marker among the cores in the first multi-core fiber and a center of a core second closest to the first marker among the cores in the first multi-core fiber; in the one end surface of the second multi-core fiber, a center of the second marker overlaps an imaginary perpendicular bisector of an imaginary line segment connecting a center of a core closest to the second marker among the cores in the second multi-core fiber and a center of a core second closest to the second marker among the cores in the second multi-core fiber; and a distance from the center of the first marker to the center of the core closest to the first marker is substantially identical to a distance from the center of the second marker to the center of the core closest to the second marker and a distance from the center of the first marker to the center of the core second closest to the first marker is substantially identical to a distance from the center of the second marker to the center of the core second closest to the second marker. This aspect may adopt the feature wherein only a part of the second marker in the second multi-core fiber is connected to a part of the first multi-core fiber which part is not the first marker or only a part of the first marker in the first multi-core fiber is connected to a part of the second multi-core fiber which part is not the second marker. Alternatively, this aspect may adopt the feature wherein a whole of the second marker in the second multi-core fiber is connected to a part of the first multi-core fiber which part is not the first marker or a whole of the first marker in the first multi-core fiber is connected to a part of the second multi-core fiber which part is not the second marker.

With the above feature, the distances from the first marker to the two cores are substantially identical to the distances from the second marker to the two cores. Consequently, deteriorations in beams of signal light guided through the two cores 111 in the first multi-core fiber 111 or deteriorations in beams of signal light guided through the two cores 112 in the second multi-core fiber 112 can be made more uniform. Consequently, it is possible to further reduce the possibility of occurrence of an error in communication carried out with use of beams of signal light guided through the two cores 111 in the first multi-core fiber 111 or beams of signal light guided through the two cores 112 in the second multi-core fiber 112. In addition, it is possible to provide the above-described effect of reducing crosstalk. Crosstalk between the two cores close to the first marker and crosstalk between the two cores close to the second marker are apt to be deteriorated. In consideration of this, the pairs of the cores having poor crosstalk characteristics can be disposed dispersedly. With this, the deterioration in crosstalk can be made more uniform. Consequently, it is possible to provide the effect of reducing crosstalk between two multi-core fibers.

Supplementary Remarks 4

The first and second aspects of one or more embodiments are not limited to any of the above-described embodiments and variations, but can be altered by a skilled person in the art within the scope of the specification. The present invention also encompasses, in its technical scope, any embodiment derived by combining technical means disclosed in differing embodiments and variations of the first aspect and technical means disclosed in differing embodiments and variations of the second aspect.

As confirmation, the technical scope of one or more embodiments can encompass the following features (1) to (10), provided that a technical contradiction is not caused.

(1) A feature in accordance with any one of aspects 1 to 15, 21, 23, and 24.

(2) A feature in accordance with a combination of two or more of aspects 1 to 15, 21, 23, and 24.

(3) A feature in accordance with a combination of (i) at least one of aspects 1 to 15, 21, 23, and 24 or two or more of aspects 1 to 15, 21, 23, and 24 and (ii) at least one of aspects 1 to 9 of the first aspect or two or more of aspects 1 to 9 of the first aspect.

(4) A feature in accordance with a combination of (i) at least one of aspects 1 to 15, 21, 23, and 24 or two or more of aspects 1 to 15, 21, 23, and 24 and (ii) at least one of aspects 1 to 7 of the second aspect or two or more of aspects 1 to 7 of the second aspect.

(5) A feature in accordance with any one of aspects 1, 16 to 20, and 22.

(6) A feature in accordance with a combination of two or more of aspects 1, 16 to 20, and 22.

(7) A feature in accordance with a combination of (i) at least one of aspects 1, 16 to 20, and 22 or two or more of aspects 1, 16 to 20, and 22 and (ii) at least one of aspects 1 to 9 of the first aspect or two or more of aspects 1 to 9 of the first aspect.

(8) A feature in accordance with a combination of (i) at least one of aspects 1, 16 to 20, and 22 or two or more of aspects 1, 16 to 20, and 22 and (ii) at least one of aspects 1 to 7 of the second aspect or two or more of aspects 1 to 7 of the second aspect.

(9) A feature in accordance with a combination of two or more of the above-described features (1) to (8).

(10) A feature in accordance with a combination of any of the above-described features (1) to (9) and each technical means described above.

As confirmation, the technical scope of one or more embodiments can encompass the following features (1) to (18), provided that a technical contradiction is not caused.

(1) A feature derived by combining (i) the feature of the fiber connected body in accordance with aspect 1 or 2 with (ii) the feature of the fiber connected body in accordance with aspect 1, 2, or 3 of the first aspect.

(2) A feature derived by combining (i) the feature of the fiber connected body in accordance with aspect 1 or 4 with (ii) the feature of the fiber connected body in accordance with aspect 4 of the first aspect.

(3) A feature derived by combining (i) the feature of the fiber connected body in accordance with any of aspects 1 to 5 with (ii) the feature of the fiber connected body in accordance with aspect 5 or 6 of the first aspect.

(4) A feature derived by combining (i) the feature of the fiber connected body in accordance with any of aspects 1 to 7 with (ii) the feature of the fiber connected body in accordance with aspect 7 of the first aspect.

(5) A feature derived by combining (i) the feature of the fiber connected body in accordance with any of aspects 1 to 18 with (ii) the feature of the fiber connected body in accordance with aspect 8 of the first aspect.

(6) A feature derived by combining (i) the feature of a method for producing a fiber connected body including the feature of the fiber connected body in accordance with any of aspects 1 to 15, 23, and 24 with (ii) the feature of the method in accordance with aspect 9 of the first aspect for producing the fiber connected body; or a feature derived by combining (iii) the feature of the method in accordance with aspect 21 for producing the fiber connected body with (iv) the feature of aspect 9 of the first aspect.

(7) A feature derived by combining (i) the feature of the fiber connected body in accordance with any of aspects 1 to 15, 23, and 24 with (ii) the feature of the fiber connected body in accordance with aspect 1 of the second aspect.

(8) A feature derived by combining (i) the feature of the fiber connected body in accordance with any of aspects 1 to 16, 23, and 24 with (ii) the feature of the fiber connected body in accordance with aspect 2 of the second aspect.

(9) A feature derived by combining (i) the feature of the fiber connected body in accordance with any of aspects 1 to 17, 23, and 24 with (ii) the feature of the fiber connected body in accordance with aspect 3 of the second aspect.

(10) A feature derived by combining (i) the feature of the fiber connected body in accordance with any of aspects 1 to 18, 23, and 24 with (ii) the feature of the fiber connected body in accordance with aspect 4 of the second aspect.

(11) A feature of the optical communication system in accordance with aspect 5 of the second aspect that includes the feature of the fiber connected body in accordance with any of aspects 1 to 18, 23, and 24; or a feature derived by combining the feature of the optical communication system in accordance with aspect 19 with the feature of the optical communication system in accordance with aspect 5 of the second aspect.

(12) A feature of the optical device in accordance with aspect 6 of the second aspect that includes the feature of the fiber connected body in accordance with any of aspects 1 to 18, 23, and 24; or a feature derived by combining the feature of the optical device in accordance with aspect 20 with the feature of the optical device in accordance with aspect 6 of the second aspect.

(13) A feature derived by combining (i) the feature of a method for producing a fiber connected body including the feature of the fiber connected body in accordance with any of aspects 16 to 18 with (ii) the feature of the method in accordance with aspect 7 of the second aspect for producing the fiber connected body; or a feature derived by combining (iii) the feature of the method in accordance with aspect 22 for producing the fiber connected body with the feature of aspect 7 of the second aspect.

(14) A feature derived by combining (i) the feature of the fiber connected body in accordance with any of aspects 1 to 8 of the first aspect with (ii) the feature of the fiber connected body in accordance with any of aspects 9, 10, 12, 13, 14, 15, 23, and 24.

(15) A feature derived by combining (i) aspect 10 that includes the feature of the fiber connected body in accordance with any of aspects 1 to 8 of the first aspect with (ii) the feature of the fiber connected body in accordance with aspect 11.

(16) A feature of the optical communication system in accordance with aspect 19 that includes the feature of the fiber connected body in accordance with any of aspect 8 of the first aspect, aspect 3 of the second aspect, and aspects 23 and 24.

(17) A feature of the optical device in accordance with aspect that includes the feature of the fiber connected body in accordance with any of aspect 8 of the first aspect, aspect 3 of the second aspect, and aspects 23 and 24.

(18) A feature derived by combining (i) any of the above-described features (1) to (17) with (ii) at least one of the technical means disclosed in the embodiments and variations of the first aspect and the technical means disclosed in the embodiments and variations of the second aspect.

As confirmation, it can be understood that the features of the fiber connected bodies in accordance with aspects 2 to 4 are respectively superordinate concepts of the features of the fiber connected bodies in accordance with aspects 1 to 3 of the first aspect. It can be understood that the features of the fiber connected bodies in accordance with aspects 6 to 8 are respectively superordinate concepts of the features of the fiber connected bodies in accordance with aspects 5 to 7 of the first aspect. It can be understood that the feature of the fiber connected body in accordance with aspect 16 is a superordinate concept of the feature of the fiber connected body in accordance with aspect 1 of the second aspect. It can be understood that the feature of the optical communication system in accordance with aspect 19 is a superordinate concept of the feature of the optical communication system in accordance with aspect 5 of the second aspect. It can be understood that the feature of the optical device in accordance with aspect 20 is a superordinate concept of the feature of the optical device in accordance with aspect 6 of the second aspect. It can be understood that the feature of the method in accordance with aspect 21 for producing the fiber connected body is a superordinate concept of the feature of the method in accordance with aspect 9 of the first aspect for producing the fiber connected body. It can be understood that the feature of the method in accordance with aspect 22 for producing the fiber connected body is a superordinate concept of the feature of the method in accordance with aspect 7 of the second aspect for producing the fiber connected body.

As confirmation, the fiber connected body in accordance with the first or second aspect may be constituted by two multi-core fibers connected to each other. As confirmation, the position of the first or second marker in the fiber connected body in accordance with the first aspect is not limited to any particular one, provided that it satisfies at least one of aspects 1 and 2. For example, the following configuration may be adopted. That is, (i) the first marker disposed, in the one end surface of the first multi-core fiber, relative to an imaginary perpendicular bisector of an imaginary line segment connecting a center of a core closest to the first marker among the cores in the first multi-core fiber and a center of a core second closest to the first marker among the cores in the first multi-core fiber and (ii) the second marker disposed, in the one end surface of the second multi-core fiber, relative to an imaginary perpendicular bisector of an imaginary line segment connecting a center of a core closest to the second marker among the cores in the second multi-core fiber and a center of a core second closest to the second marker among the cores in the second multi-core fiber may be axisymmetric, rotationally symmetric, or asymmetric to each other with respect to any of the above-described perpendicular bisectors.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

101: fiber connected body
111: first multi-core fiber
**111*a*1 to 111*an***: core
**111*b***: cladding
**111*c***: marker
112: second multi-core fiber
**112*a*1 to 112*an***: core
**112*b***: cladding
**112*c***: marker
113: third multi-core fiber
**113*a*1 to 113*an***: core
**113*b***: cladding
**113*c***: marker
102: fiber connected body
121: first multi-core fiber
**121*a*1 to 121*an***: core
**121*b***: cladding
**121*c***: marker
122: second multi-core fiber
**122*a*1 to 122*an***: core
**122*b***: cladding
**122*c***: marker
201: fiber connected body
MF, MF1 to MFm: multi-core fiber
a1 to an: core
b: cladding
c: marker
210: optical communication system
202, 203: transceiver
220: optical device
204, 205: fan-in/fan-out device

The invention claimed is:

1. A fiber connected body comprising:

a plurality of multi-core fibers including a first multi-core fiber, a second multi-core fiber, and a third-multi-core fiber, each of which comprises:

a cladding;

a marker disposed in the cladding; and cores disposed in the cladding at different distances from the marker, wherein in a coupling state of the fiber connected body, one end surface of the second multi-core fiber is connected to one end surface of the first multi-core fiber such that:

each of the cores in the second multi-core fiber is connected to a respective one of the cores in the first multi-core fiber, and the marker of the second multi-core fiber is connected to a part of the first multi-core fiber other than the marker thereof, or the marker of the first multi-core fiber is connected to a part of the second multi-core fiber other than the marker thereof, in the coupling state, one end surface of the third multi-core fiber is connected to the other end surface of the second multi-core fiber such that:

each of the cores in the third multi-core fiber is connected to a respective one of the cores in the second multi-core fiber, and the marker of the third multi-core fiber is connected to a part of the second multi-core fiber other than the marker thereof, or the marker of the second multi-core fiber is connected to a part of the third multi-core fiber other than the marker thereof, the fiber connected body is configured such that, in a state where the second multi-core fiber is rotated about its axis:

the one end surface of the rotated second multi-core fiber is connected to the one end surface of the first multi-core fiber, the other end surface of the rotated second multi-core fiber is connected to the one end surface of the third multi-core fiber, each of the cores in the rotated second multi-core fiber is connected to a respective one of the cores in the first multi-core fiber, the marker in the rotated second multi-core fiber is connected to a part of the marker in the first multi-core fiber, or the marker in the first multi-core fiber is connected to a part of the marker in the rotated second multi-core fiber, each of the cores in the third multi-core fiber is connected to a respective one of the cores in the rotated second multi-core fiber, and the marker in the third multi-core fiber is connected to a part of the marker in the rotated second multi-core fiber, or the marker in the rotated second multi-core fiber is connected to a part of the marker in the third multi-core fiber, a total number of the cores in the first multi-core fiber and a total number of the cores in the third multi-core fiber are both n, where the n is a natural number greater than or equal to three, in each of the first multi-core fiber, the second multi-core fiber, and the third-multi-core fiber, the cores are arranged in order from closest to farthest from the marker, and in the coupling state, an i-th core arranged in order in the third multi-core fiber is connected to one of the cores in the second multi-core fiber that is connected to an i-th core arranged in order in the first multi-core fiber, where i is a natural number greater than or equal to one and less than or equal to n.

2. The fiber connected body as set forth in claim 1, wherein in both end surfaces of the fiber connected body, cores used for input of an optical signal are disposed to be diagonal to each other and cores used for output of an optical signal are disposed to be diagonal to each other.

3. A fiber connected body comprising:

four or more multi-core fibers connected to each other, each comprising:

a cladding;

cores disposed in the cladding to be axisymmetric with respect to imaginary symmetry axes in a cross section of each of the four or more multi-core fibers; and a marker disposed in the cladding different distances from respective ones of the cores; and junctions at which two adjacent multi-core fibers of the four or more multi-core fibers are connected to each other such that a first end surface of one of the two adjacent multi-core fibers is connected to a second end surface of the other of the two adjacent multi-core fibers, wherein the imaginary symmetry axes in the cross section of each of the four or more multi-core fibers include a specific imaginary symmetry axis, wherein the specific imaginary symmetry axis has a common positional relationship with the cores and the marker among the four or more multi-core fibers, in an odd number of three or more junctions among the junctions:

each of the cores in the first end surface overlaps a respective one of the cores in the second end surface, a first core closest to the marker in the first end surface overlaps a second core in the second end surface that is axisymmetric, with respect to the specific imaginary symmetry axis in the other of the two adjacent multi-core fibers, to a third core closest to the marker in the second end surface, and a fourth core in the first end surface that is axisymmetric, with respect to the specific imaginary symmetry axis in the one of the two adjacent multi-core fibers, to the first core overlaps the third core.

4. The fiber connected body as set forth in claim 3, wherein the cores are disposed at locations that do not overlap the specific imaginary symmetry axis.

5. The fiber connected body as set forth in claim 3, wherein in both end surfaces of the fiber connected body, cores used for input of an optical signal are disposed to be diagonal to each other and cores used for output of an optical signal are disposed to be diagonal to each other.

6. The fiber connected body as set forth in claim 3, wherein the four or more multi-core fibers include:

a first multi-core fiber disposed at one end of the fiber connected body; and a second multi-core fiber disposed at the other end of the fiber connected body, a total number of the cores in the first multi-core fiber and a total number of the cores in the second multi-core fiber are both n, where the n is a natural number greater than or equal to two, in each of the first multi-core fiber and the second multi-core fiber, the cores are arranged in order from closest to farthest from the marker, and an i-th core arranged in order in the first multi-core fiber is optically coupled to a core in the second multi-core fiber that is axisymmetric, with respect to the specific imaginary symmetry axis in the second multi-core fiber, to an i-th core arranged in order in the second multi-core fiber, where i is a natural number greater than or equal to one and less than or equal to n.

* * * * *